(12) United States Patent  
Gates et al.

(10) Patent No.: US 11,006,159 B2  
(45) Date of Patent: May 11, 2021

(54) HYBRID VIDEO TIME-BANDWIDTH PRODUCT IMPROVEMENT (HVTBPI) TRANSMISSION

(71) Applicant: Edge2020 LLC, Herndon, VA (US)

(72) Inventors: Tell Allen Gates, Great Falls, VA (US); Ronald Hirsch, Herndon, VA (US)

(73) Assignee: Edge2020 LLC, Herndon, VA (US)

( * ) Notice: Subject to any disclaimer, the term of this patent is extended or adjusted under 35 U.S.C. 154(b) by 0 days.

(21) Appl. No.: 16/416,500

(22) Filed: May 20, 2019

(65) Prior Publication Data

US 2019/0289350 A1    Sep. 19, 2019

Related U.S. Application Data

(63) Continuation-in-part of application No. 15/134,831, filed on Apr. 21, 2016, now Pat. No. 10,298,980.

(Continued)

(51) Int. Cl.
*H04N 21/254* (2011.01)
*H04N 21/2385* (2011.01)
(Continued)

(52) U.S. Cl.
CPC ..... *H04N 21/2541* (2013.01); *H04L 12/1492* (2013.01); *H04L 29/08954* (2013.01);
(Continued)

(58) Field of Classification Search
CPC ........... H04N 21/2541; H04N 21/2385; H04N 21/2543; H04N 21/25841;
(Continued)

(56) References Cited

U.S. PATENT DOCUMENTS 6,909,726 B1*  6/2005  Sheeran ........... H04N 21/23608
                                                370/395.41
8,136,136 B2*  3/2012  Steele ................ H04N 21/4147
                                                725/55

(Continued)

*Primary Examiner* — Randy A Flynn
(74) *Attorney, Agent, or Firm* — The Watson IP Group, PLC; Dan Fiul

(57) ABSTRACT

A video aggregator can multiplex multimedia content, the multiplexed multimedia content being directed to a plurality of customer premises equipment, and aggregate the multiplexed multimedia content into a reduced number of broadcast channels to release at least one of bandwidth and radio frequency spectrum, not included in the reduced number of broadcast channels, for other applications. A system controller can electronically control delivery of the aggregated and multiplexed multimedia content to the plurality of customer premises equipment within the reduced number of broadcast channels, receive a request for unavailable other content, and electronically control delivery of the unavailable other content. A system processor can determine whether other content, the other content being at least one of not currently being broadcast via the aggregated and multiplexed multimedia content into a reduced number of broadcast channels and not stored by a particular customer premises equipment, is unavailable to the particular customer premises equipment to determine the unavailable other content, and formulate the request for the unavailable other content if the other content is determined to be unavailable.

38 Claims, 20 Drawing Sheets

Related U.S. Application Data

(60) Provisional application No. 62/150,829, filed on Apr. 21, 2015.

(51) Int. Cl.

| | | |
|---|---|---|
| *H04N 21/2543* | (2011.01) | |
| *H04N 21/258* | (2011.01) | |
| *H04N 21/262* | (2011.01) | |
| *H04N 21/2665* | (2011.01) | |
| *H04N 21/2668* | (2011.01) | |
| *H04N 21/426* | (2011.01) | |
| *H04N 21/44* | (2011.01) | |
| *H04N 21/4408* | (2011.01) | |
| *H04N 21/458* | (2011.01) | |
| *H04N 21/4627* | (2011.01) | |
| *H04N 21/61* | (2011.01) | |
| *H04N 21/81* | (2011.01) | |
| *H04L 12/14* | (2006.01) | |
| *H04L 29/06* | (2006.01) | |
| *H04L 29/08* | (2006.01) | |
| *H04M 15/00* | (2006.01) | |
| *H04N 7/16* | (2011.01) | |

(52) U.S. Cl.
CPC ...... *H04L 65/1089* (2013.01); *H04L 65/4084* (2013.01); *H04L 65/604* (2013.01); *H04L 67/325* (2013.01); *H04M 15/57* (2013.01); *H04M 15/8044* (2013.01); *H04N 7/162* (2013.01); *H04N 21/2385* (2013.01); *H04N 21/2543* (2013.01); *H04N 21/25841* (2013.01); *H04N 21/2665* (2013.01); *H04N 21/2668* (2013.01); *H04N 21/26216* (2013.01); *H04N 21/26225* (2013.01); *H04N 21/42623* (2013.01); *H04N 21/4408* (2013.01); *H04N 21/44016* (2013.01); *H04N 21/458* (2013.01); *H04N 21/4627* (2013.01); *H04N 21/6125* (2013.01); *H04N 21/812* (2013.01)

(58) Field of Classification Search
CPC ....... H04N 21/26216; H04N 21/26225; H04N 21/2665; H04N 21/2668; H04N 21/42623; H04N 21/44016; H04N 21/4408; H04N 21/458; H04N 21/4627; H04N 21/6125; H04N 21/812; H04N 7/162; H04L 12/1492; H04L 29/08954; H04L 65/1089; H04L 65/4084; H04L 65/604; H04L 67/325; H04M 15/57; H04M 15/8044

See application file for complete search history.

(56) References Cited

U.S. PATENT DOCUMENTS

| | | | | |
|---|---|---|---|---|
| 9,794,979 | B2* | 10/2017 | Roethig | H04L 5/0005 |
| 2002/0059619 | A1* | 5/2002 | Lebar | H04N 21/238 |
| | | | | 725/87 |
| 2003/0069964 | A1* | 4/2003 | Shteyn | H04N 21/25808 |
| | | | | 709/225 |
| 2013/0169574 | A1* | 7/2013 | Suh | H04N 21/42224 |
| | | | | 345/173 |
| 2015/0326899 | A1* | 11/2015 | Setos | H04N 21/25841 |
| | | | | 725/25 |
| 2016/0156945 | A1* | 6/2016 | Romrell | H04N 21/23424 |
| | | | | 725/36 |

* cited by examiner

HYBRID VIDEO TIME-BANDWIDTH PRODUCT IMPROVEMENT (HVTBPI) TRANSMISSION

This application claims priority to U.S. patent application Ser. No. 15/134,831, entitled "PRICE DRIVEN MULTIMEDIA CONTENT VIDEO TIME-BANDWIDTH PRODUCT IMPROVEMENT (VTBPI) TRANSMISSION", filed on Apr. 21, 2016, to Hirsch et al., which claims benefit to U.S. Provisional patent application Ser. No. 62/150,829, entitled "Enhanced Video and Advertising Aggregation and Distribution", filed on Apr. 21, 2015, to Hirsch et al., the entireties of both of which are expressly incorporated herein by reference.

BACKGROUND

1. Field

The present disclosure is directed to a method and apparatus for electronic delivery of multimedia content, and in at least one embodiment advertisements, targeted to customer premises equipment. The present disclosure is also directed to a method and apparatus for transmitting multimedia content and advertisements over a reduced number of broadcast channels, along with formulating a request for other content that is determined to be unavailable within the reduced number of broadcast channels.

2. Introduction

Traditional television viewing is linear. With linear television viewing, a viewer must watch scheduled television programs at a particular time and on a particular channel. However, the entertainment industry is in transition and content consumers are moving to personalized programming or nonlinear television. Personalized programming allows the content consumer to control content selection and viewing time. True personalized programming allows content customers to view whatever they want, whenever they want, as often as they want, and in an order that the content consumers desire. However, present technology offers content consumers a limited personalized programming experience with restricted selection and/or high prices. Such present technology includes streaming, Internet Protocol Television (IPTV), and Video on Demand (VOD) capability.

Streaming is delivered over the Internet, but is unmanaged. Content delivery is plagued by "last mile" congestion. This problem is encountered with non-Quality of Service (QoS) streaming. As streaming has increased, especially during periods of peak demand or prime time, congestion impact has become worse. Such congestion occurs with any over utilized, unmanaged, data rate limited, network system. IPTV are multimedia services, such as television or video, delivered over managed IP based networks which provide the required level of Quality of Service (QoS) and experience, security, interactivity and reliability. From the consumer's viewpoint, IPTV has limited selection and is expensive.

Demand for content distribution with respect to available transport varies as a function of time, consisting of peaks and valleys. Traditionally, supply and demand issues have been addressed by applying the principles of microeconomics based on supply and demand pricing theory. However, applying such microeconomics has not solved problems associated with content delivery. Stand Definition (SD), High Definition (HD) and Ultra High Definition (UHD or 4K), or higher resolution formats and/or increasing quality present increasingly significant problems for existing network infrastructure and significantly higher price to content consumers. Such high resolution formats are limited because of data rate constraints and subscriber aggregate data limits. Even with the current relatively low percentage of streaming, peak time network congestion is causing video disruption, such as video pixilation, synchronization problems, freeze frames, etc. This video disruption will be furthered exacerbated as more households move to content streaming, higher resolution video, and as additional real-time applications and/or services are further deployed.

Advertising can be used as a subsidized approach to both linear and personalized programming. However, with current advertising/content ratios, bandwidth required to additionally transmit advertising content is substantial. Other challenges that effect high impact advertising exist for both linear and personalized programming. Currently, advertisers have traditionally subsidized content production and distribution through advertisements (for example, commercials). This approach has a limited capability to target an audience segment. Advertisers are unable to target advertisements to individuals or cluster groups except by relying on associated program content. Currently, commercial selection and insertion is dependent on the targeted audience of the content rather than the targeted audience of the commercial. True, direct measures of advertisement effectiveness do not exist. Changing commercials on-the-fly to reflect changes in consumer content viewing habits is difficult. Also, it is extremely difficult to measure the impact of on-the-fly advertising on individual subscribers, cluster groups, and/or geographic areas based on selected advertising profiles.

SUMMARY OF THE DISCLOSURE

The disclosure is directed to a method and apparatus that can include a video aggregator, a system controller, and a system processor. The video aggregator can multiplex multimedia content, the multimedia content being directed to a plurality of customer premises equipment, and aggregate the multiplexed multimedia content into a reduced number of broadcast channels to release at least one of bandwidth and Radio Frequency (RF) spectrum, not included in the reduced number of broadcast channels, for other applications. The system controller can electronically control delivery of the aggregated and multiplexed multimedia content to the plurality of customer premises equipment within the reduced number of broadcast channels, receive a request for unavailable other content, and electronically control delivery of the unavailable other content. The system processor can determine whether other content, the other content being at least one of not currently being broadcast via the aggregated and multiplexed multimedia content into a reduced number of broadcast channels and not stored by a particular customer premises equipment, is unavailable to the particular customer premises equipment to determine the unavailable other content, and formulate the request for the unavailable other content if the other content is determined to be unavailable.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Figure 1:
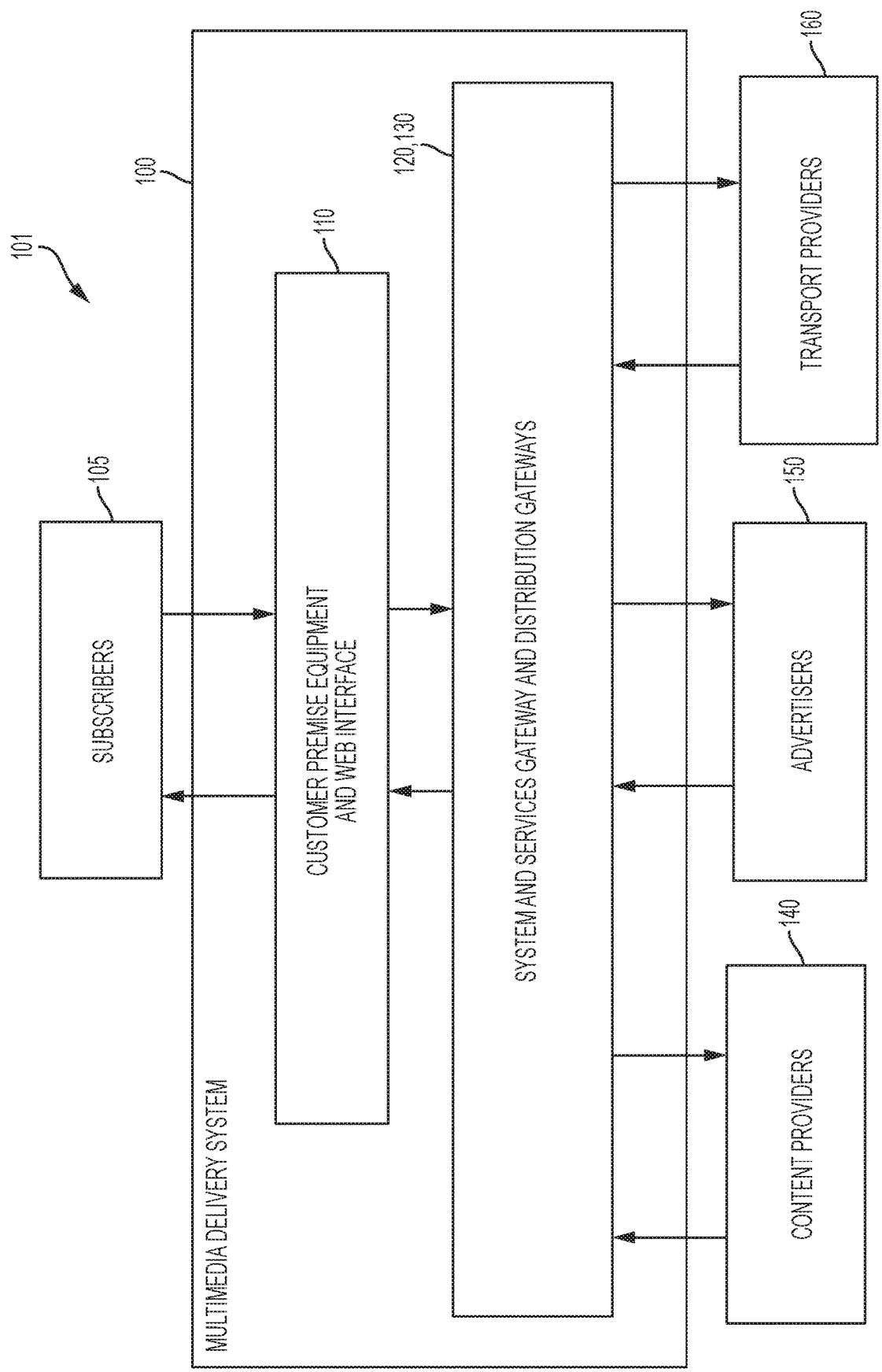
FIG. 1 illustrates an example multimedia system, in accordance with one or more possible embodiments.

A need exists for supplementing content, such as the VTBPI content disclosed below, with the unavailable other content. VTBPI can be limited to content that has been previously stored or currently being broadcast. To supplement content that a subscriber may want to view that was not stored or is not currently being broadcast to their customer premises equipment 110, that is unavailable to a subscriber, the HVTBPI delivery disclosed below can include a system that can determine what content is unavailable from storage, and can formulate a request for this unavailable other content.

A need exists for an efficient and effective use of transport resources to smooth out subscriber demand for multimedia content. A need also exists to subsidize the subscriber's multimedia content with on demand, changeable, subscriber-preferred targeted, non-targeted and/or requested advertisements without exacerbating bandwidth demands to deliver effective targeted and requested advertisements. And a need exists to allow the viewer to control not only the type but the amount of advertising presented to them.

A need exists for the advertiser to control 1) cost of advertising present to the viewer, 2) the target audience to which the advertising is presented, and/or 3) where and when the advertising is presented. A need exists for content providers to be compensated for the content they produce that can ensure a continuing revenue stream for all content.

The embodiments described herein overcome the limitations discussed above, as well as expanding on capabilities of existing content distribution systems. The embodiments provide for apparatuses, systems, and methods that can establish one or more pricing models for advertising and subscriber selected video content driven by 1) subscriber preferences, 2) content provider pricing, 3) advertiser pricing and cluster selection, and 4) transport pricing (broadcast and network and streaming) based on cost driven by the use of predicted excess capacity as determined by one or more pricing models of transport systems. The terms price and cost are used interchangeably herein throughout.

The embodiments can optimize bandwidth/data rate constrained transport systems, with 1) multimedia content selection and scheduled viewing time, 2) accepted amount of advertising, and 3) price under a subscriber's control. The computer-based methods, systems, and apparatuses can be used to construct a real-time pricing model for the optimal use of transport resources.

The computer-based methods, systems and apparatuses disclosed herein can provide for personalized multimedia programming that includes the consumer's selected multimedia content, specified resolution and/or quality, viewing time, lead-time, and an accepted number and type of embedded advertisements. Advertisers' preferences can be incorporated for targeting selected individuals, cluster groups of individuals, and geographic areas. Traditional advertising can be targeted at specific multimedia content. The embodiments disclosed herein provide for advertising that can be targeted to a cluster of the subscriber and/or to a specific subscriber or group of subscribers. The embodiments can analyze subscriber behavior and reward the subscriber for either existing or changing behavior that can result in lower operational costs.

The embodiments can limit a subscriber's specified maximum billing period cost (for example, a not-to-exceed price) based on the subscriber's desired multimedia content for viewing and can automatically adjust various subscriber parameters with respect to content providers', advertisers' and transporter(s)'s constraint(s).

The embodiments can further allow the subscriber to manually adjust their selected control preferences or parameters, including cost as an independent parameter, to the cost of viewing over a billing period through a web interface on a computer, the customer premises equipment (CPE), or other Internet accessible devices. The subscriber can also manually adjust their control parameters, including price, for individual content, content series, or selected subset of their desired personalized programming.

The computer-based methods, systems and apparatuses disclosed herein can also provide for the selection of cost-effective and resource-efficient methods of content distribution based on the use (in total or in part) of multiple broadcast and/or multiple network infrastructures (e.g., Internet, etc.). These can include over-the-air (OTA) broadcast, satellite, cellular, wireless (Wi-Fi, optical, microwave, etc.), wired (cable, fiber optics, copper lines, etc.), and/or point-to-point, including, multicast, peer-to-peer and mesh architectures. Such content distribution can be used for the HVTBPI that includes the described unavailable other content, disclosed in more detail below. A company implementing one or more of the embodiments disclosed herein can purchase, in bulk from an Internet Service Provider (ISP), blocks of data to supplement against the subscriber's data cap. This can be either in concert with the subscriber's existing data cap or executed as a completely separate transaction.

FIG. 1 illustrates an example multimedia system 101, in accordance with one or more possible embodiments. The multimedia system 101 can include a multimedia delivery system 100 to electronically delivery multimedia content to subscribers 105. The multimedia delivery system 100 can include customer premises equipment (CPE) 110, a system and services gateway 120, and one or more distribution gateways 130. The customer premises equipment (CPE) 110 can be coupled to the system and services gateway 120 and the distribution gateways 130. The system and services gateway 120 and distribution gateways 130 can be coupled to content providers 140, advertisers 150, and transport providers 160. Subscribers 105 can interact with the customer premises equipment 110.

The computer-based methods, systems and apparatuses disclosed herein can use all available subscriber 105, content provider 140, content delivery pricing from transport providers 160, and advertiser 150 cluster information to automatically price multimedia content. The computer-based methods, systems and apparatuses disclosed herein can select the most cost-effective use of available electronic delivery infrastructure to satisfy the multimedia content, preferences and pricing requests from subscribers 105.

The computer-based methods, systems and apparatuses disclosed herein can incorporate advanced analytics techniques that can place advertising into subscriber 105 clusters, or direct placement to a specific subscriber 105 or group of subscribers 105 with prioritization (for example, Direct Marketing Areas (DMA)). This prioritization can be based on the value the subscriber 105 places on an advertising and/or the value of a subscriber 105 to an advertiser 150. This includes the placement of the advertising in the multimedia content for maximum impact.

The computer-based methods, systems and apparatuses can allow for content transmission at a predetermined time and/or adaptively as a function of the predictive and/or measured loading on network distribution (including backbone and last mile of network service). The approach to multimedia content distribution disclosed herein can select a most cost efficient transport method and transport provider 160 for electronic content delivery or transport, delivery and transport being used interchangeably herein. Contracts with ISPs or the transport providers 160 for the purchase of data transfers during periods of reduced demand or periods of excess capacity can be utilized to minimize costs associated with multimedia content electronic delivery. A lower network Quality of Service (QoS) can be acceptable for electronic delivery of non-live content (i.e., scheduled content delivery), resulting in lower transport cost with improved subscriber 105 experience. The computer-based methods, systems and apparatuses disclosed herein can tolerate lower network QoS to the CPE 110, with multimedia content and advertising being pre-stored on the CPE 110 before it is assembled for display for a subscriber 105. The computer-based methods, systems and apparatuses disclosed herein can allow for error detection and correction to address data dropouts.

The computer-based methods, systems and apparatuses disclosed herein can price preplanned multimedia content of the subscriber 105 in bandwidth/data rate constrained digital distribution systems. Digital multimedia content files or packets can be transmitted over one or more of network and broadcast infrastructures 210, including multicast, torrent and/or mesh architectures, to the CPEs 110 of the subscribers 105. When multiple network and broadcast infrastructures 210 are utilized, the digital packets are stored locally within a CPE 110 of the subscriber 105 for re-assembly into a viewable stream by a selected display device or devices at a specified time.

The subscriber 105 can interact with the multimedia electronic delivery system 100 through a web interface contained in the CPE 110. The subscriber 105 can communicate content selection and operational preferences to the multimedia delivery system 100. In response to these selection and operational preferences (see Table 4) the multimedia delivery system 100 can price the content and make this information available to the subscriber 105 via the web interface in near real-time.

TABLE 1

| CPE Profile |
|---|
| Unique Identifier |
| CPE Identification Number |
| Account Holder Name |
| Street Address |
| City |
| State |
| Zip Code |
| Country |
| Location (for example GPS, etc.) |
| IP Address |
| ISP |
| Congressional District |
| State Political Districts |
| Local Political Districts |
| Trace Route to CPE (for maintenance and guided expansion) |
| Internet Connection Quality (route latencies, dropped packets, etc.) |
| Derived representation generated from the elements in table |

TABLE 2

Subscriber Account Profile

CPE Unique Identification(s)*
Account Identification Number(s) including subscription accounts (e.g., Netflix, Hulu, etc.)
Account Privacy Preferences
Maximum cost for the overall billing period
Control parameters of individual subscriber profiles (Parental)
Password/PIN/Thumbprint/Voice Recognition/Face Recognition/Other
Credit Card Number (for Billing only)
Expiration Date (for Billing only)
Validation Number (for Billing only)
Subscriber Data Cap(s)

Wired
Wireless
Cellular
Satellite
Wi-Fi
CPE Storage (Total, Available, write/erase/read cycles, etc.)
CPE Storage Directory (content, content type, advertising, etc.)
Derived representation generated from the elements in table

*An individual subscriber 105 can be associated with multiple CPEs 110

TABLE 3

Individual Subscriber Profile(s)

Subscriber Account Unique Identification Link
Unique Identification Number
Personal Identification Number
Name
Preferences Table Link
Social Media Input and Connections
Main Subscriber (Parental) Control Limitation - Maturity Level of Content Allowed
Privacy Preferences (Individual Override - If over 18)
Subscriber Domain Shift - Changing viewing preferences and habits
Advertising Preferences (Non-targeted, Targeted, and Requested)
Maximum allowed spending controlled by the primary subscriber
Individual Subscriber Cost Limits - Profile 1
Content Class Max Class Cost
Advertising Preference
Lead-Time
Viewing Delay
Amount of Allowed Advertising
Video Quality/Resolution
Individual Subscriber Cost Limits - Profile 2
. . .
Individual Subscriber Cost Limits - Profile N
Table of Advertising (IDs) to place in storage (Per Profile)
Table of Advertising available in storage (Per Profile)
Table of Advertising (IDs) Targeted Insertion Order (Per Profile)
Derived representation generated from the elements in table Note:
A derived representation can be synthesized by combining weighted elements from Tables 1-8 such that the dimensionality of the input data is reduced when performing the clustering operations described herein. A profile can also be used for sub-entities and/or combinations of entities (e.g., a family).

TABLE 4

Subscriber Preferences

History Reference Number
Preferred Lead-Time (Can be designated per type of content and/or individual pieces of content)
Preferred View-Time (Can be designated per type of content and/or individual pieces of content)
Purchase Mode (Viewing window, Number of Times Allowed, Permanent)
Unique Identification Hash Link
Content Title #1
Content Season (if applicable)
Content Episode (if applicable)

TABLE 4-continued

Subscriber Preferences

Resolution (Mobile Device, SD, HD, UHD, etc.)
Quality (Video Quality Models, etc.)
Length of Planning Interval (Content Viewing Delay)/Prior to broadcast
Requested Commercials Per Unit Content
IP Address
ISP
Content Identification (Library of Congress Number)
Date of Content Identification Number
IMDB Content Identification
Social Media Connections
Privacy Preferences
Advertising Preferences (Non-targeted, Targeted, and Requested)
Derived representation generated from the elements in table

TABLE 5

Subscriber History

Unique Subscriber Identification Hash
History Reference Number - 0*

Content Title ID
Time/date content was selected
Requested viewing system time/date
Actual content viewing system start time/date
Actual content viewing system stop time/date
Number of pauses
Average length of pauses
Fast Forward Operations
Rewind Operations
Method of transport
Cost of Transport Method
Time/date the content was started for delivery to CPE
Time/date the content delivery was completed
Amount and type of advertising accepted
List advertisements inserted - advertising position number and time/date displayed, directed
Advertising Skipped
Price of content when selected
Price of content when watched
Purchase mode
Resolution/quality
Display type
Content Price Equation Type Used for Pricing Content
Content Price Equation Descriptive Parameters (Coefficients, Slope, . . .)
Cluster Content Confidence Interval
Cluster Content Popularity Index
Time/date of Transfer to Mobile Device
Recommendation Thresholds First - Add to Recommended List
Second - Push Content to CPE/Add to Recommended Available List
Third - Push Content to CPE/Add to Calendar and Recommended Available List
Fourth - Multicast/Broadcast Queued Recommendation
Rejection Parameters Amount of content or series watched
Time since last watched
Time/date of overt rejection
Number of times content is watched in a given period
Content Encryption Keys History Reference Number - 1
History Reference Number - 2
. . .
History Reference Number - N
Multimedia Content Search History Record - 0
. . .
Multimedia Content Search History Record - M
Multimedia Content Request Search History Record - 0
. . .

TABLE 5-continued

Subscriber History

Multimedia Content Request Search History Record - P
Derived representation generated from the elements in table For each Content and/or advertising Item Requested or Recommended

TABLE 6

Multimedia Content Metadata

Unique Database Identification
Content Title
Title ID (Database Specific or Library of Congress Number)
Content Rating as a Function of Time from Release Date
Technical Specs (Running Time, Sound Mix, Color, Aspect Ratio, etc.)
Content Genre (Action, Crime, etc.)
Release Date
Other Content Availability Source
Broadcast Electronic Program Guide
Content Director
Content Writer(s)
Content Star(s)
Related Content
Storyline
Plot Keywords
Tag Line(s)
Country of Origin
Filming Locations
Production Company(ies)/Network
Company Contact Data
Viewer Review
MPAA Rating
Curated Reviews
Profession Reviews
Content Season and Episode
Special Effects
Content Provider Sales Price or Licensing Agreement
Library of Congress Multimedia Content Metadata
Derived representation generated from the elements in table Advertisers 150 can pay for the attention of the subscribers 105. Advertisers 150 can provide commercials, desired viewer audience characteristics, and campaign objectives through the dedicated interfaces of the multimedia delivery system 100. The multimedia delivery system 100 can use such information together with sophisticated mathematical algorithms (for example, executed by a system processor 128 shown in FIG. 3) to match requested clusters to the subscribers 105, preferably not to multimedia content. This matching technique can provide advertisers 150 a more cost effective technique to reach their desired audience.

The transport providers 160 can provide the parameters shown in Table 7 to the system and services gateway 120, through dedicated interfaces. These parameters can be used to schedule and price excess capacity of a transport provider 160 to lower distribution price to customer premises equipment 110 of subscribers 105, as well as to make maximal use of a delivery network, particularly during a period when a delivery network is being underutilized, for example midnight to 6 A.M.

TABLE 7

Advertiser Request and Parameters

Unique Advertiser Identification
Unique Commercial Identifier
Advertising Category
Demographic Preferences
Geographic Preferences
Technical Content of Advertiser TABLE 7-continued Advertiser Request and Parameters Advertising Priority
Associated Advertising
Number of Times Advertising to be Shown
Minimum Time Interval to Repeat
Preferred Advertising Position
Preferred Show or Content Type
Zip Code Assignment
Political Boundaries
Advertising QoS (AQoS)
Advertising Value of Advertiser to Subscriber
Advertising Value of Subscriber to Advertiser
Direct Advertising Insertion
Advertising Demographic Group ID
Redeemed Advertising Credit Coupon No. 1
Redeemed Advertising Credit Coupon No. 2
. . .
Redeemed Advertising Credit Coupon No. N
Advertising Impact QoS (AIQoS)
Call to Action Type (Discount Code Alphanumeric String)
Derived representation generated from the elements in table

TABLE 8

Transport Parameters

Unique Transport Identification (or transport identifications, if more than one)
Methods of Transport (OTA broadcast Transmitter Information, such as World Radio TV Handbook*, Cable, Satellite, Cellular, Wireless, DSL, Optical, Combination, etc.)
Excess Capacity as a Function of Time (Hour, Day, Week, Year)
Cost as a Function of Time (Hour, Day, Week, Year, etc.)
Subscriber Data Caps
Transport Data Rates
Network Reliability
ISP (or ISPs, if more than one)
Service Area
Dynamic/Static IP
Optional QoS
Unique Subscriber Identifier
Block of IP Addresses
List of Subscribers using a particular delivery method
Cost of available delivery methods
Multicast groupings
Encrypted or unencrypted
External Timing Reference Source
Time Zone
Capacity for Streaming
Cost to Maintain Equipment in Central Office (or equivalent)
Cellular Number (If applicable) or Transport Provider Account No.
Derived representation generated from the elements in table
Content delivery schedule of available OTA broadcast transmitter identifier(s)

*Different Transmitters can have a unique identifier that is associated with each unique content and advertisement content, as well as the delivery schedule. This can include information from the World Radio TV Handbook, or other equivalent information, including location, frequency, etc.

The content providers 140 can provide information that allows the multimedia delivery system 100 to delivery multimedia content to the subscribers 105. For example, the content providers 140 can provide content listing, licensing and pricing information, together with multimedia content to the multimedia delivery system 100 though dedicated interfaces.

Figure 2:
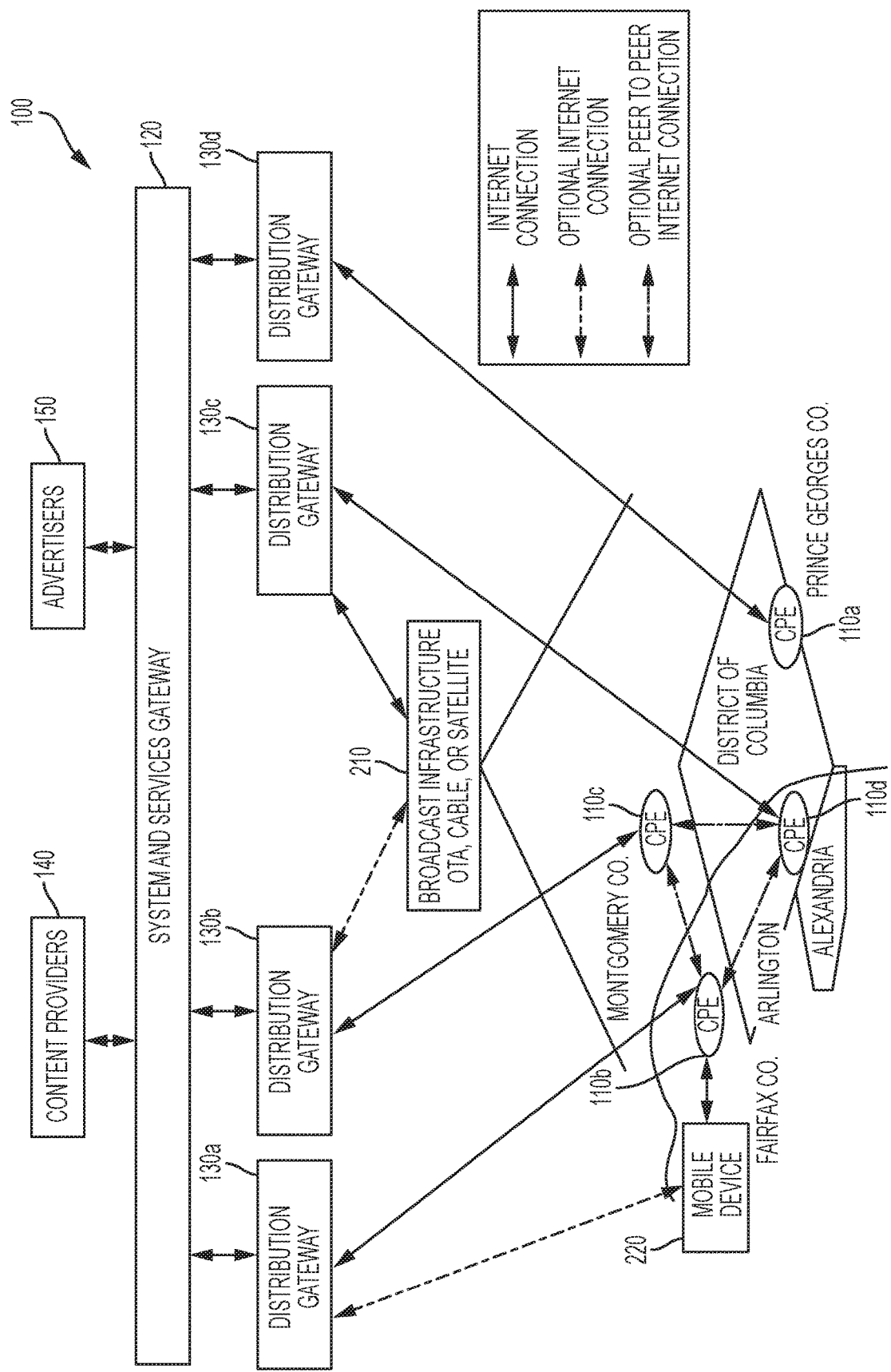
FIG. 2 illustrates example interoperability of components of a multimedia delivery system, according to one or more possible embodiments.

FIG. 2 illustrates example interoperability of components of the multimedia delivery system 100, according to one or more possible embodiments. The system and services gateway 120 can be coupled to content providers 140 and advertisers 150. The system and services gateway 120 can be further coupled to a plurality of distribution gateways 130a-d. One or more of the distribution gateways 130a-d can be coupled to a broadcast infrastructure 210, which can include a broadcast gateway. The broadcast infrastructure 210 can include OTA broadcast infrastructure, cable broadcast infrastructure, satellite broadcast infrastructure, cellular infrastructure, optical infrastructure, and/or any other one-to-many delivery infrastructure, as well as Internet infrastructure (e.g., multicast, peer-to-peer, unicast, and mesh architectures). The broadcast infrastructure 210 can deliver multimedia content and in at least one embodiment advertisements. This delivery can include at least one of live broadcast, streaming, and content that is uploaded for storage for use with an advertisement insertion instruction described below. In at least one embodiment, this delivery can include use of an individual channel that is broadcast over the Internet using the advertisement insertion instruction described below. The distribution gateways 130a-d can allow for simultaneous, synchronous and asynchronous (not in time order) delivery of multimedia content to CPEs 110 of subscribers 105 over one or more of network and broadcast distribution infrastructures. The broadcast infrastructure 210 can determine what multimedia content is transmitted over each transmission infrastructure based on resource excess capacity, resource cost, and resource availability. The CPEs 110 can store such data from multiple sources and reconstructed the multimedia content in proper order for viewing with the CPE 110 of the subscriber 105. The CPE 110 can be at least partially implemented with an application specific integrated circuit (ASIC), a carrier supplied customer premise equipment, a digital video recorder, a set top box, a video extender, a smart television, a personal computer, a tablet computer, a smart phone, with a software application ("app") implementation, and/or any other media device that can play the multimedia content.

Distribution gateway 130a can be coupled to CPE 110b via an Internet connection and optionally coupled to mobile device 220 via an Internet connection. Distribution gateway 130a can service a specific geographic region, for example CPE 110 devices within Fairfax County. Distribution gateway 130b can be coupled to CPE 110c via an Internet connection and optionally coupled to the broadcast infrastructure 210 via an Internet connection. Distribution gateway 130a can service a specific geographic region, for example CPE 110 devices within Montgomery County. Distribution gateway 130c can be coupled to the broadcast infrastructure 210 via an Internet connection and to CPE 110d via an Internet connection. Distribution gateway 130c can service a specific geographic region, for example CPE 110 devices within a region of the District of Columbia. Distribution gateway 130d can be coupled to CPE 110e via an Internet connection. Distribution gateway 130d can service a specific geographic region, for example CPE 110 devices within a different region of the District of Columbia that those CPE 110 devices serviced by distribution gateway 130c. CPE 110b can be optionally coupled to CPE 110c and CPE 110d via a peer-to-peer Internet connection. CPE 110c and CPE 110d can be optionally coupled via a peer-to-peer Internet connection. The size of a specific geographic region that a particular distribution gateway 130 services can be a function of the location and density of CPEs 110 of subscribers 105 within a geographic region.

The system and services gateway 120 and the distribution gateways 130 can be implemented redundantly, and can work through individual failures, either in hardware of the multimedia delivery system 100 or Internet connectivity. A backup hot spare of the system and services gateway 120 can be maintained such that in the event of a failure, operations transition seamlessly to the backup hot spare.

The multimedia delivery system 100 can operate with many distribution gateways 130. In an event of a distribution gateway 130 failure, the operation of the failed distribution gateway 130 can be spread to several nearby distribution gateways 130 until the failure is corrected.

In one or more possible embodiments, there can be no redundant backup for an individual CPE 110, per se. However, a subscriber 105 can stream multimedia content using an alternate media CPE 110 device, for example, a digital video recorder, a set top box, a video extender, a smart television, a personal computer, a tablet computer, a smart phone, a software application (app) implementation, and/or any other media device that can play the multimedia content, in the event of a primary CPE 110 failure. Such streaming to an alternate media CPE 110 device can be performed at no additional cost to the subscriber 105.

The system and services gateway 120 can price subscriber's preplanned multimedia content in bandwidth/data rate constrained digital distribution systems. Digital multimedia content files or packets can be transmitted utilizing at least one of network and broadcast infrastructure 210, to the CPEs 110 of the subscribers 105. When multiple network and broadcast infrastructures 210 are utilized, the digital packets can be stored locally within the CPEs 110 for re-assembly into a viewable steam, preferably prior to release for viewing by a selected display device or devices at a specified time(s).

The system and services gateway 120 can transmit to the CPEs 110 a list of subscriber 105 requested and recommended multimedia content, multimedia content that can meet/subscriber cost constraints, and/or multimedia content that can be stored and/or downloaded to an internal storage 616 (e.g. memory, hard disk drives, solid state drives, flash storage, etc.) and/or external storage 624 (e.g. hard disk drives, solid state drives, cloud-based storage, flash storage, etc.) associated with the CPE 110. The system processor 128 can perform multimedia content recommendation based on information from Tables 1 through 6 to discover the recommended multimedia content. The system processor 128 can determine confidence intervals for each of the subscriber 105 selected and recommended multimedia content, the confidence intervals indicating a likelihood that the multimedia content from the recommended multimedia content best matches preferred subscriber 105 multimedia content. A list of subscriber 105 selected and recommended multimedia content and the confidence intervals, respectively, can be transmitted to the CPE(s) 110 for display to the subscriber(s) 105 via a user interface of the CPE(s) 110. Note: the use of recommended content, recommended multimedia content, and formulated recommended content are used interchangeably throughout this document.

Figure 3:
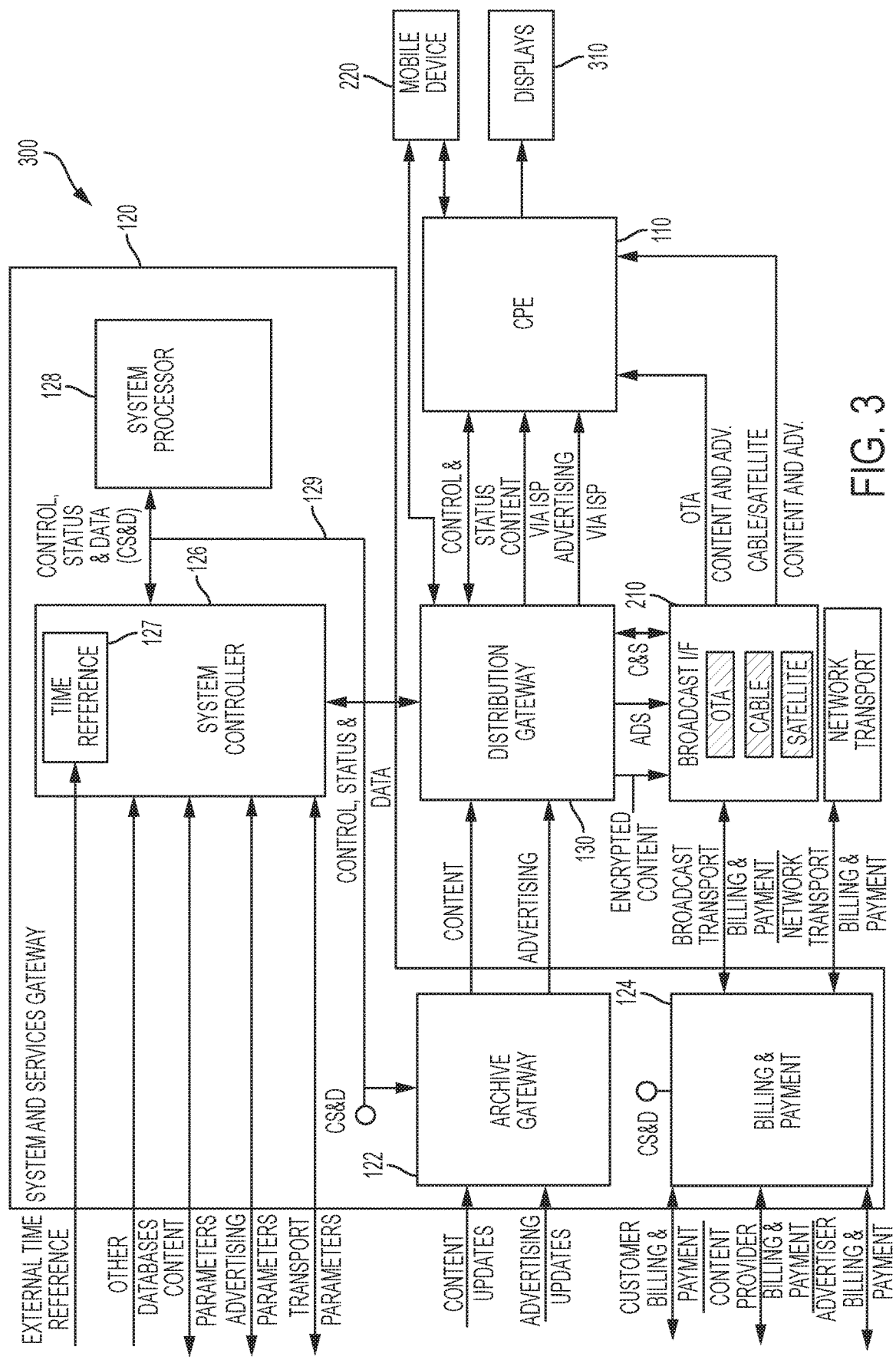
FIG. 3 illustrates an overall block diagram of the example multimedia delivery system, in accordance with one or more possible embodiments.

FIG. 3 illustrates an overall block diagram 300 of the example multimedia delivery system 100, in accordance with one or more possible embodiments. The system and services gateway 120 can include an archive gateway 122, a billing & payment module 124, a system controller 126, and a system processor 128. The system controller 126 can include a time reference module 127. The archive gateway 122 can be coupled to the system controller 126 and the system processor 128 via a control, status & data bus 129. The distribution gateway 130 can be coupled to the broadcast infrastructure 210 for transmission of multimedia content and advertising. At least a portion of the system and services gateway 120 and/or an aggregation distribution gateway 1330 (FIG. 13) (for example, the system controller 126 and system processor 128) can be partitioned and operated simultaneously in, one or more of the following environments: local computing, mobile computing, distributed computing (e.g., within the CPE 110, a third party apparatus (not shown), etc.), and cloud-based computing. In at least one embodiment, one or more of the system and services gateway 120 and/or the aggregation distribution gateway 1330 can be implemented or partially implemented in a third party device (e.g., an advertising broadcaster 1310, a content broadcaster 1320, 1322 and/or 1324) such as a server of Netflix, Hulu, Spotify, Microsoft, etc.

The archive gateway 122 can receive such information as multimedia content updates and advertising updates. The archive gateway 122 can transmit multimedia content and advertising to the distribution gateway 130. The multimedia delivery system 100 can store the multimedia content in the archive gateway 122 (or archive cloud) for transfer to the distribution gateway 130 for commonly viewed multimedia content and to CPEs 110 of the subscribers 105 under agreed licensing and pricing terms and conditions.

All data from external interfaces can be handled through the multimedia delivery system 100. In particular, such data from external interfaces can be sent and received by the system controller 126. This data can include subscriber 105 parameters provided by the subscribers 105, content provider 140 parameters provided by the content providers 140, advertiser parameters provided by the advertisers 150, and transport parameters provided by the transport providers 160, an external time reference 127, and other databases to be used to optimize the multimedia delivery system 100. The external time reference can be distributed throughout the multimedia delivery system 100. The external time reference can be used to maintain synchronization for deconstructing and constructing multimedia content and advertising, as well as token authorization and decryption/encryption. The system controller 126 can receive an external time reference 127 and information from other databases. Throughout this application, token, assembly instruction and insertion instruction can be used interchangeably. The token can contain the source of content, encryption/decryption key management, content assembly, advertising insertion, content access period, etc.

The distribution gateway 130 can send and receive information from the mobile device 220 operating as a CPE 110. The distribution gateway 130 can send and receive, to and from the CPE 110, such bidirectional information as a control, status and data 1610 interface that can be either encrypted or unencrypted, and transmit such information as multimedia content via a transport provider 160 and advertising via a transport provider 160. The distribution gateway 130 can transmit to the broadcast infrastructure 210 such information as encrypted multimedia content and advertisements, and send and receive, to and from the broadcast infrastructure 210, such bidirectional information as control and status that can be either encrypted or unencrypted. The distribution gateway 130 can send multimedia content and advertising to the mobile device 220. In one or more possible embodiments, the CPE 110 can send multimedia content to the mobile device 220 to be viewed on one or more displays 310, either for storage or streaming from the CPE 110.

The broadcast infrastructure 210 can transmit multimedia content and advertising over one or more of the over-the air broadcast infrastructure, cable broadcast infrastructure, and satellite broadcast infrastructure. One or more possible embodiments can maintain a multi-stage process for Internet delivery of multimedia content and advertising to a subscriber 105. All multimedia content and advertising, from their respective sources, can be initially transferred to a central repository, the archive gateway 122. The archive gateway 122 can provide for long term storage or the "permanent" storage of multimedia content. The functions performed by the archive gateway 122 can be distributed in the distribution gateways 130 and/or be performed in a cloud-based computing environment.

Frequently selected multimedia content can be transferred from the archive gateway 122 to distribution gateways 130 for staging. The distribution gateways 130 can be located throughout the country to minimize the impact to the Internet and therefore transport price(s). The multimedia content maintained on the distribution gateway 130 can be regularly updated to reflect new popular multimedia content becoming available, with pruning being performed on least frequently selected multimedia content that is on the distribution gateway 130. The multimedia content selection maintained on a given distribution gateway 130 can be individually optimized and can be different from region to region. The multimedia content selection maintained on distribution gateways 130 can also be updated periodically and can reflect seasonal viewing preferences, for example, holiday multimedia content during holidays, horror multimedia content during Halloween, etc.

Infrequently selected multimedia content can be maintained only on the archive gateway 122. The infrequently selected content, upon a request from the subscriber 105, can be transferred to the distribution gateway 130 and placed in temporary storage of the distribution gateway 130. This buffered multimedia content can then be processed as frequently viewed multimedia content for delivery to a requesting CPE 110 of the subscriber 105, again minimizing the impact to delivery infrastructure (for example, the Internet) and price. The amount of storage maintained in the distribution gateway 130 can be optimized to minimize the overall capital expenditure and operational costs, trading off the cost for adding and maintaining disk storage vs. the Internet backbone impact and cost of delivering infrequently selected content that can be maintained on the archive gateway 122. The optimized storage maintained on the distribution gateways 130 can be different from region to region.

Staged content on the distribution gateway 130 can be transferred to the CPE 110 of the subscriber 105 upon a request from the subscriber 105. Since one or more of the embodiments encourage, via economic incentives, to have subscribers 105 preplan their content selection, the delivery of multimedia content to the CPE 110 can be performed to minimize delivery infrastructure (for example, the Internet) transport charge(s).

The system processor 128 can analyze the multimedia content stored on each archive gateway 122 and each distribution gateway 130. This analysis can use the information contained in subscriber 105 preferences shown in Table 4 and subscriber 105 viewing history data shown in Table 5. Using this analysis, the system processor 128 can rank multimedia content by popularity, longevity, and cost to maintain the multimedia content in the repository of the archive gateway 122 to determine what multimedia content is stored and when it's purged from the repository of the archive gateway 122. Purged multimedia content can be stored in offline storage. This process can be adjusted for seasonal and regional viewing preferences. This information and instructions are passed to the system controller 126 for distribution to the archive gateway 122 and subsequently to the distribution gateway 130.

The system processor 128 can use information contained in CPE profile data shown in Table 1, subscriber 105 account profile shown in Table 2, individual subscriber 105 profile shown in Table 3, subscriber 105 preferences data show in Table 4, subscriber 105 history data shown in Table 5, and multimedia content metadata from external databases shown in Table 6 to discover multimedia content to recommend to the subscribers 105. Such information can be used to create a community of subscribers 105 with common viewing interests and build a subscriber 105 social network. This community can provide discussion groups (similar to a book club), forums, subscriber-written reviews, and lists of curated content for and by subscribers 105. These communities build subscriber 105 affinity and cohesiveness, which can create subscriber 105 "stickiness". This stickiness translates into attention and can create added value for the advertisers 150. Advertisers 150 can use this increased attention to add value to their commercials. Existing social networks (e.g., Facebook) can be integrated into the multimedia delivery system 100.

The price for multimedia content may be determined by the system processor 128 as an exponential decay as a function of time as follows:

$$\text{Content Provider Price}_{i,j}(t) = (\text{Start Price}_{i,j} - \text{Tail Price}_{i,j}) * \exp^{[-\beta_i*(-\text{Start Time}_i)]} + \text{Tail Price}_{i,j}$$

where t is a function of any instantaneous time, i identifies the specific content, j identifies content resolution, and $\beta_i$ identifies the decay rate of the specific multimedia content. More complex models can be instantiated by the system processor 128. More complex forward pricing models can be instantiated by the system processor 128. These models can include different content pricing curves such as polynomials, regression analysis of data (both linear and non-linear), statistical techniques, Maximum Likelihood Estimation, and/or other price curves and/or models. In one embodiment, a staircase model can be used, where the ordinate represents multimedia content price and the abscissa represents the time period over which the price is valid. In this way, the price can increase and/or decrease as a function of time. The model can be updated and/or replaced to match changing conditions. The multimedia content price to the subscriber 105 can be determined by the system processor 128 according to the equation as follows:

Subscriber Content Price=Content Provider Price+
Content Delivery Price−Advertising Subsidy+
Commissions on all Pricing transactions Thus, the subscriber multimedia content price can be expressed a function of at least one of the content provider 140 price, the content delivery price, the advertising subsidy, and the commissions. The commissions can be associated with at least one of selecting the multimedia content, scheduling delivery of the multimedia content, pricing of delivery of the multimedia content, and inserting an advertisement into the multimedia content. The system processor 128 can calculate each of the terms on the right side of this equation. The system processor 128 can compute these quantities simultaneously and in parallel using various mathematical methods and techniques. The system processor 128 can process all cost/price/demand models simultaneously. An adjudication process can be executed by the system processor 128 that can select the best content provider 140 price, which can increase content demand and maximize the content provider's 140 revenue/profit. Initially, parameters for the adjudication process may be set by the content provider(s) 140 and refined by actual CPE 110 measurements and test marketing, or focus group data, within the system processor 128. The system processor 128 can use the collected data to predict the Start Price (shown in FIG. 8 as Start Price 875 on a content provider 140 price curve 810) of multimedia content being a price of multimedia content at a time at which the multimedia content is made available for viewing, the Tail Price (shown in FIG. 8 as Tail Price 880 on content provider 140 price curve 810) of multimedia content being a multimedia content price which decreases as the view-delay becomes large, and $\beta_i$ being an exponential decay parameter that can be for specific multimedia content or clusters of multimedia content. Then, the predicted parameters can be used to calculate the content provider 140 price for each particular multimedia content. The goal is to maximize the content providers' 140 revenue by increasing multimedia content demand by decreasing the multimedia content's price, which in turn can stimulate demand by the subscribers 105. The content provider's 140 cost/price and investment payoff schedule can be considered in these calculations. The system processor 128 can simultaneously perform this costing/pricing function with advertiser 150, transport provider 160, and subscriber 105 pricing data considered. A price of the content can be determined in accordance with the subscriber content price described herein.

The system processor 128 can calculate the Advertising Quality of Service (AQoS) and prioritize advertising to achieve a specified AQoS. The AQoS can include a minimum percentage of distinct subscribers 105 that have a specified advertisement displayed a minimum number of times for the multimedia system 101 or advertiser 150 specified cluster. This process can use the information contained Tables 1, 2 and 3, subscriber 105 viewing histories, external databases (for example, advertiser supplied databases) and advertiser 150 demographics of interest. Advertisers 150 can also purchase exclusivity or limited exclusivity during the viewing of a specified multimedia content by their selected or multimedia system 101 selected cluster profiles. In at least one embodiment, the subscriber 105 can be given a credit coupon by a product seller when associated advertising is viewed and the product is purchased to reduce the out-of-pocket expenses of the subscriber 105 to maintain services and multimedia content provided by the multimedia system 101. The feedback of advertising to a purchase, AQoS, type of advertising (targeted, non-targeted, and subscriber requested), and subscriber 105 interaction with the CPE 110 can be used by the system processor 128 to measure an Advertising Impact Quality of Service (AIQoS). This can be performed for both national and regional advertisers 150.

Placement of an advertisement within content is based on maximum value to an advertiser 150. The system processor 128 can determine such value and priority using subscriber 105 profiles, subscriber 105 viewing history, subscriber 105 account profile, individual subscriber 105 profiles, subscriber 105 preferences, advertiser requests and parameters, interactions of the subscriber 105 with the CPE 110, and/or one or more of factors show in tables 1-6. The system processor 128 can transmit results of such a determination to the CPE 110 for assembly of an advertisement within multimedia content. These factors can include: cluster-specific and individual-specific subscriber 105 profiles, type of advertisement (generic cluster-specific, advertiser-specific, and subscriber-requested), time and date of a start request, value and cycle (i.e., selection of a next advertisement in a value-ordered list of advertisements can be sent to a CPE 110 of a subscriber 105 to be inserted in the multimedia content.

The system controller 126 can transmit this list to the CPE 110. The CPE 110 can maintain and update this ordered list through a prioritized list of advertisements assignments for each available commercial slot, tracking of a number of times a particular advertisement is viewed within a given time interval, a last time a particular advertisement was shown to a subscriber 105 of the CPE 110 to determine when such an advertisement should be shown again to cluster/ and/or grouping-specific and individual-specific subscribers 105, subscriber 105 demographic profile (used by advertisement insertion instruction module of the CPE 110 (not shown)), type of advertising accepted or requested by a subscriber 105 via the CPE 110, a predetermined value of a cluster-specific and individual-specific subscriber 105 to an advertiser 150 in its processing, decreasing value of an advertisement with the passage of time or repeated viewings within a specified time interval to a cluster-specific or individual-specific subscriber 105, and repeated viewings of multimedia content can have different advertisements inserted for each viewing of the multimedia content by cluster-specific and individual-specific subscribers 105. These factors can further include an advertisement or advertising campaign as specified by an advertiser 150 to be inserted within multimedia content based on one or more of cluster-exclusivity, limited cluster-exclusivity, content-specific insertion for selected cluster subscriber 105-profiles, individual-subscriber 105 profiles, advertiser 150 specified minimum number of times an advertisement is displayed, a minimum number of repetitions within a time interval an advertisement can be shown to a subscriber-cluster or individual subscriber 105, advertiser 150 specified demographic-seeding instructions to perform more focused clustering for products and services, advertiser 150 specified regional and national insertion and display of an advertisement, advertiser 150 specified advertisement play time of when the advertisement is presented to a subscriber 105 within the multimedia content relative to the start of the multimedia content, content position (cluster-specific and individual-specific) of advertising insertion times, an advertisement actual play time within a specific multimedia content, position of the advertisement, and content checked (against the specified advertisement play time, content and position) for AQoS and AIQoS validation.

The system and services gateway 120 can limit a subscriber 105 specified maximum price for a billing period (for example, bi-weekly, monthly, quarterly, semi-annually, yearly, and/or any other billing period selected by a subscriber 105) based on the subscriber's 105 desired multimedia content for viewing. The system and services gateway 120 can automatically adjust various subscriber parameters with respect to constraints of the content providers 140, advertisers 150, and transport provider(s) 160. The system and services gateway 120 can automatically adjust preferences of the subscriber 105 to meet a subscriber 105 set price limit for a billing period based on selected multimedia content. The system processor 128 of the system and services gateway 120 can perform dynamic pricing that includes automatic design-to-price of personalized multimedia content programming of the subscribers 105 based on a willingness of the subscribers 105 to modify viewing choices and preferences. For example, the CPE 110 can allow a subscriber 105 to select and control modification of a preference including at least one of an allowed amount of advertising to be inserted in the multimedia content, the lead-time of electronic delivery, a multimedia content delayed viewing period, a multimedia content resolution, and targeted, non-targeted, and subscriber requested advertising types to meet the maximum price for the billing period. Such selection and modification can be based on the subscriber 105, via the CPE 110, selecting at least one of multimedia content for viewing, selecting a different time/date for viewing of the multimedia content, and modifying at least one of the subscriber selected preferences different from the at least one of the subscriber selected preferences modified to meet the maximum price for the billing period. The system processor 128 can update a subscriber content price for at least one of the multimedia content, the unavailable other content, and the available other content based on the subscriber 105 making such modification(s). The system controller 126 can transmit, to a particular subscriber 105 of a particular customer premise equipment 110 making such modification(s), an updated subscriber content price for at least one of the multimedia content, the unavailable other content, and available other content based on such modification(s). The unavailable other content is content that is, at a given time, unavailable to the CPE 110, that is content that both different from the multiplexed multimedia content and advertisement and currently not stored by the CPE 110, and thereafter becomes available other content once stored (e.g., either content that a portion thereof is stored or content that is stored in its entirety) by the CPE 110. In at least one embodiment, the unavailable other content is content that is at least one of currently not stored by the CPE 110 and currently not being received by the CPE 110. As used throughout herein, the multiplexed multimedia content can optionally include the advertisement. Thus, embodiments that describe transmission, reception, and any type of processing of the advertisement can be likewise optional embodiments.

In at least one embodiment, that advertisement can be delivered separately to the CPE 110, separate from the multiplexed multimedia content, such as via the Internet. Thus, any reference to the multiplexed multimedia content and advertisement is for simplification of disclosure, but optionally can include the advertisement. In at least one embodiment, the multiplexed multimedia content can be transmitted by the aggregation distribution gateway 1330 and received by the CPE 110 via a broadcast (such as OTA broadcast, cable, satellite, etc.) and the advertisement can be transmitted by the aggregation distribution gateway 1330 and received by the CPE 110 separately from the multiplexed multimedia content, such as via the control, status, and data 1610 interface and Internet. In at least one embodiment, the multiplexed multimedia content can be transmitted by the aggregation distribution gateway 1330, such as via the control, status, and data 1610 interface and/or Internet and received by the CPE 110 and the advertisement can be transmitted by the aggregation distribution gateway 1330 and received by the CPE 110 separately from the multiplexed multimedia content, via a broadcast (such as OTA broadcast, cable, etc.). For example, the multiplexed multimedia content can include any combination of television shows, movies, documentaries, etc., and the multiplexed multimedia content and advertisement can include such television shows, movies, documentaries, etc. multiplexed together with an advertisement for, e.g., a consumer product and/or services, such as soap, dog food, stone mason, etc. In at least one embodiment, the reduced number of advertising delivery approach can allow the advertisement to be embedded directly in the linear TV multimedia content and the advertisement can be captured by the CPE 110 and then placed in the CPE storage 616/624 for future insertion.

Figure 4:
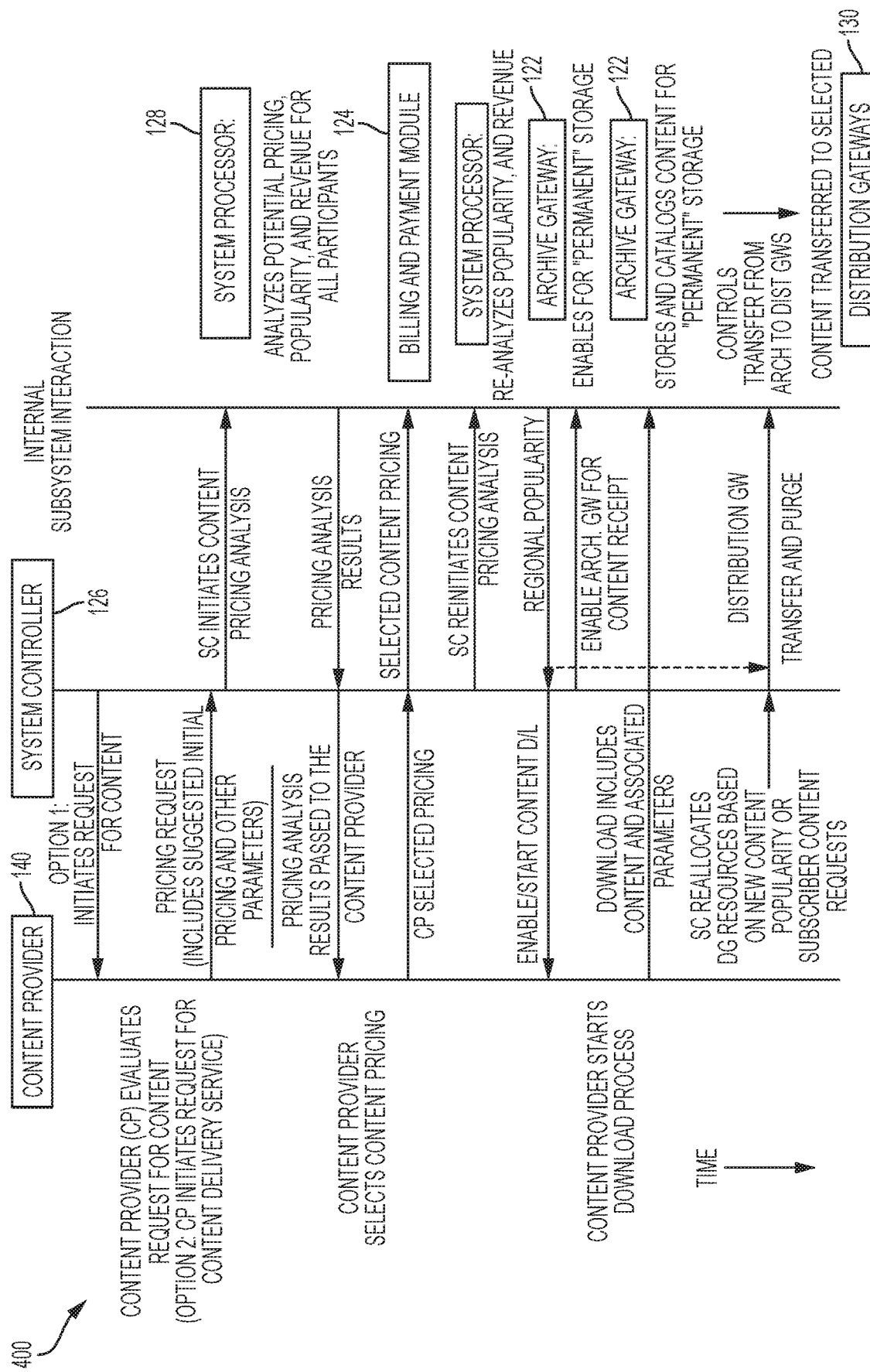
FIG. 4 illustrates an example interaction between a content provider and an SSG-system controller, and interaction between the system controller and internal subsystems of the multimedia delivery system, in accordance with one or more possible embodiments.

FIG. 4 illustrates an example interaction 400 between the content provider 140 and the system controller 126, and interaction between the system controller 126 and internal subsystems of the multimedia delivery system 100, in accordance with one or more possible embodiments. Either the system controller 126 (Option 1) or a content provider 140 (Option 2) can initiate a request for content delivery to the multimedia delivery system 100. The content provider 140 can respond to Option 1 or Option 2 with a pricing request. This pricing request can include an identification number of the content provider 140, a unique multimedia content identification number, a suggested multimedia content price, and other parameters (for example, content screenplay, available content resolution(s), content file size(s), content runtime(s), and other multimedia content descriptive information). This information can be sent to the system controller 126 through the encrypted, bidirectional communication control, status and data 1610 interface, such as a Virtual Private Network (VPN). The system controller 126 then can send this information to the system processor 128.

The system processor 128 can analyze data of the multimedia content, including advanced analytics to analyze the screenplay for plot, and other production choices, for example actors, directors. This analysis can be used in conjunction with subscriber 105 cluster interests. The system processor 128 can provide, based on this analysis, potential content pricing, popularity, and expected content provider 140 revenue. This processing can take into account a domain shift associated with changing subscriber 105 viewing preferences and habits. The system processor 128 can then pass this information back to the system controller 126 which passes the information back to the content provider 140. The information returned to the content provider 140 from the system processor 128, via the system controller 126, can include: 1) the potential subscriber 105 demand for the multimedia content at as a function of price, 2) the predicted popularity of the multimedia content (for example, from clustering analysis performed in the system processor 128) and 3) expected revenue generated by the multimedia content as a function of time. The system processor 128 can analyze and optimize the multimedia content pricing and recommendation, advertising pricing and transport pricing functions either independently or all functions simultaneously/globally through the use of local and global adjudication.

The system processor 128 can calculate an optimum price together with a table that provides the expected demand, expected popularity and expected revenue as a function of a multimedia content price curve. This information can then be passed to a content provider 140 as a basis to select a multimedia content price. The content provider 140 can choose to select the optimum price for the multimedia content determined by the system and services gateway 120 or set a different price. The final selected price is sent by content provider 140 back to the system controller 126. If the content provider 140 selects a multimedia content price that differs from the optimum price determined by the system and services gateway 120, the system controller 126 can forward the new information to the system processor 128 for revaluation. The system processor 128 can reevaluate the popularity and revenue model for internal use by the multimedia delivery system 100. However, even if the content provider 140 selects a suboptimum price, the multimedia delivery system 100 will use that price. The system controller 126 can forward this multimedia content pricing to the billing and payment module 124. The interaction and operation between the system controller 126, the system processor 128, external interfaces (with content providers 140, advertisers 150, and content broadcast and network transport), the archive gateways 122, and the distribution gateways 130 can be controlled by the system controller 126.

The reevaluation of multimedia content popularity as a function of time can be necessary to maintain the archive gateways 122 and the distribution gateways 130. The maintenance can purge less popular multimedia content, thereby freeing up storage for more popular multimedia content. Whenever new multimedia content is added to the archive gateways 122 or distribution gateways 130, the system controller 126 can task the system processor 128 to perform a multimedia content popularity analysis to make storage available. As shown in FIG. 4, the system controller 126 can perform this purging process before enabling multimedia content (or advertising) transfer from a content provider 140 (or an Advertiser 150) to the archive gateways 122. Also, the system controller 126 can perform this purging process before enabling multimedia content (or advertising) transfer from an archive gateway 122 to one or more regional distribution gateways 130.

The distribution gateway 130 can be coupled (for example, contain) to one or more of solid state and/or disk-based storage. Periodically, the system controller 126 can task the system processor 128 to analyze subscriber 105 multimedia content requests. Based on the received analysis, the system controller 126 can reallocate existing distribution gateway 130 multimedia content between solid state and disk-based storage to achieve lower operating cost and faster multimedia content retrieval.

Figure 5:
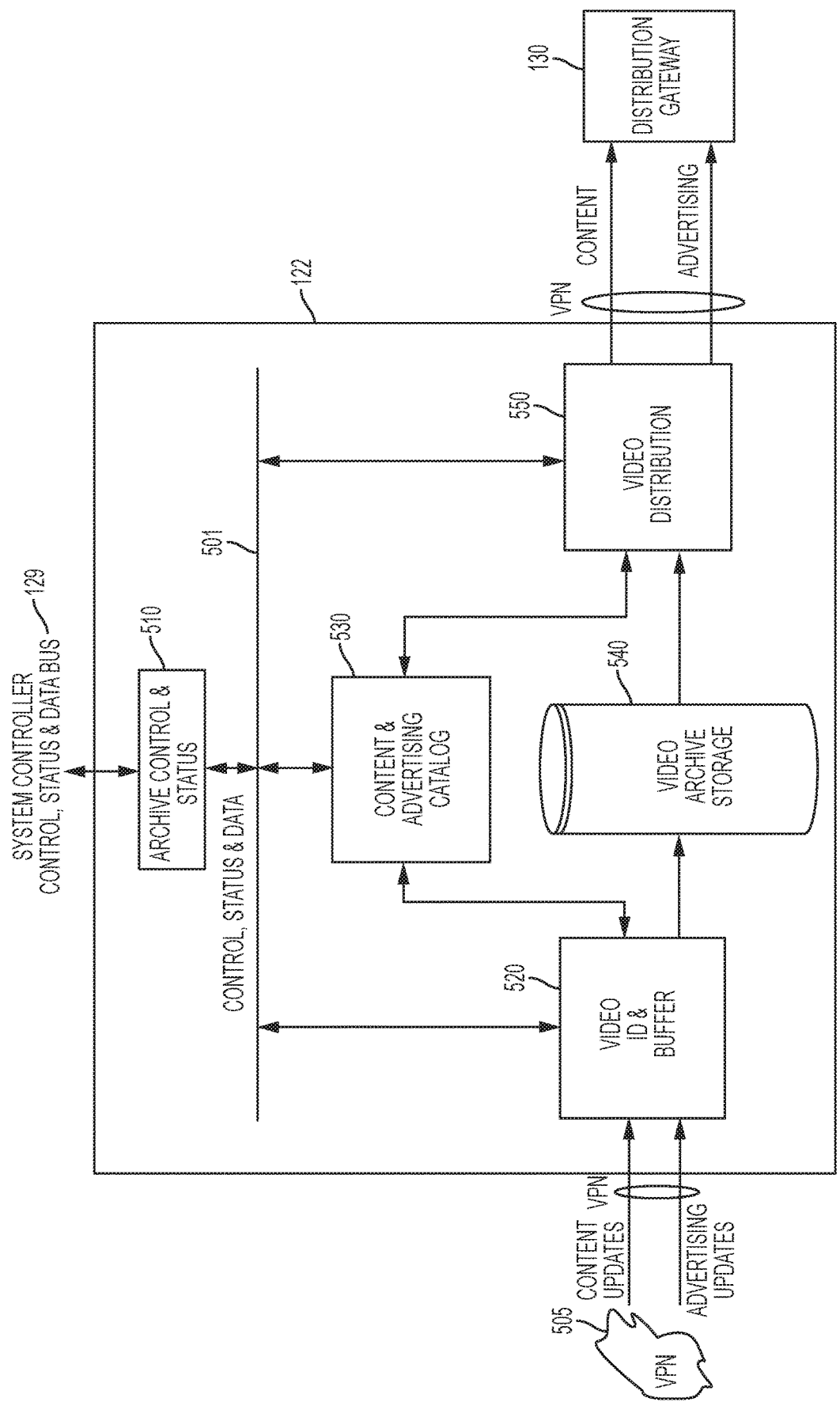
FIG. 5 illustrates a block diagram of an example archive gateway, in accordance with one or more possible embodiments.

FIG. 5 illustrates a block diagram of an example archive gateway 122, in accordance with one or more possible embodiments. The archive gateway 122 can include an archive control & status module 510, a video ID & buffer module 520, a content & advertising catalog 530, video archive storage 540, and a video distribution module 550. The archive control & status module 510 can be coupled to the control, status & data bus 129 and a control, status & data bus 501 within the archive gateway 122. The video ID & buffer module 520 can be coupled to a Virtual Private Network (VPN) 505, the control, status & data bus 501, the content & advertising catalog 530, and the video archive storage 540. The content & advertising catalog 530 can be coupled to the control, status & data bus 501 and the video distribution module 550. The video archive storage 540 can further be coupled to the video distribution module 550. The video distribution module 550 can further be coupled to the control, status & data bus 501 and the distribution gateway 130.

The archive gateway 122 can store all active multimedia content and advertising that may be accessed in the multimedia delivery system 100. This includes licensed multimedia content and active advertising. All new multimedia content and advertising can be received via the VPN 505 from their respective sources, the content providers 140 and the advertisers 150. The video data can be buffered for conversion into a format used by the multimedia delivery system 100 and cataloged. Once this process is complete, the multimedia delivery system 100 formatted multimedia content can be transferred to the video archive storage 540. The content & advertising catalog 530 can maintain an index for all multimedia content and advertising stored in the video archive storage 540.

The video distribution module 550 can control transfer of multimedia content and advertising to the distribution gateway 130. Commonly requested multimedia content (new and perennial favorites) can be stored and serviced directly from the distribution gateway 130 to minimize traffic on distribution infrastructure (for example, the Internet backbone). Infrequently accessed multimedia content can be serviced from the archive gateway 122 for delivery through the distribution gateway 130. The system processor 128 of the distribution gateway 130 can regularly evaluate operations of the multimedia delivery system 100 to optimize storage of the distribution gateway 130. Optimizing storage of the distribution gateway 130 can minimize overall costs by trading off storage of the distribution gateway 130 for distribution infrastructure transportation costs.

Figure 6:
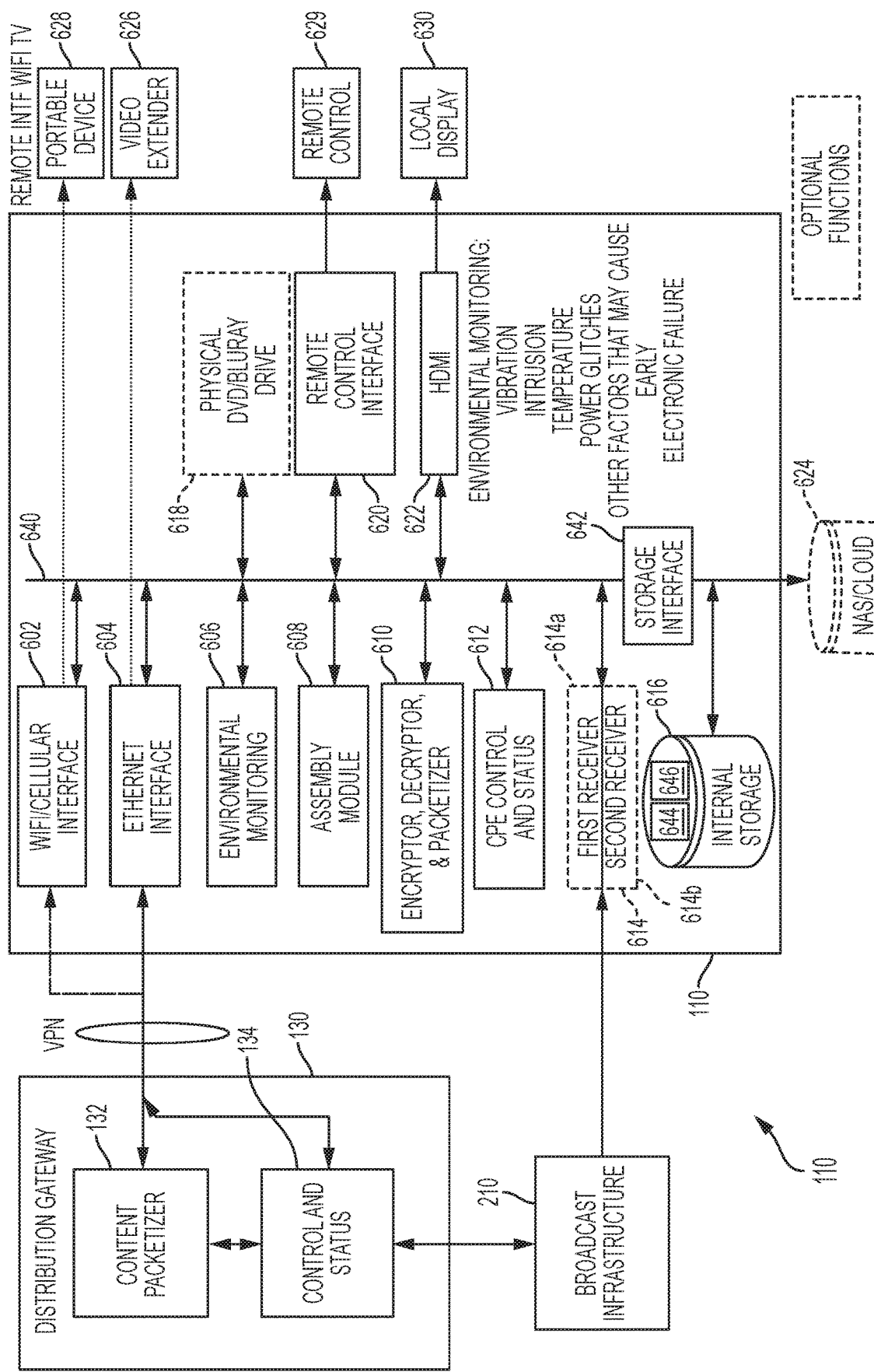
FIG. 6 illustrates a block diagram of an example CPE, in accordance with one or more possible embodiments.

FIG. 6 illustrates a block diagram of an example CPE 110, in accordance with one or more possible embodiments. In particular, the CPE 110 can include a Wi-Fi/Cellular interface 602, an Ethernet interface 604, an environmental monitoring module 606, an assembly module 608, an encryptor, decryptor, & packetizer 610, a CPE control and status module 612, a data bus 640, one or more receivers, such as a first receiver 614a and a second receiver 614b, such receivers can be an OTA broadcast tuner, a cable card, satellite receiver, and/or an Internet receiver, etc., a random access memory 644, first in-first out (FIFO) Memory (not shown) (or other equivalent variant), a program storage memory 646, a storage interface 642, the internal storage 616, and external storage 624 (NAS, cloud-based, etc.). In at least one embodiment, the first receiver 614a and the second receiver 614b can receive the multimedia content, the advertisement, and the unavailable other content, via a same transport. In at least one other embodiment, the first receiver 614a and the second receiver 614b can receive the multimedia content, the advertisement, and the unavailable other content, via different transports. The first receiver 614a and/or the second receiver 614b can receive subscriber 105 requested and/or recommended content for the subscriber 105 (e.g., the multimedia content, the advertisement, and/or the unavailable other content), described herein, for storage for future playback and/or for immediate consumption, by the subscriber 105. The CPE 110 can reorder or place in sequence the multimedia content and advertising, and/or available other content. The CPE 110 can further include a DVD/Blu-ray drive 618, a remote control interface 620, and an HDMI interface 622. All of the components of the CPE 110 can be inter-coupled with one another. The CPE 110 can be coupled to the external storage 624, such as a network attached storage (NAS) device. The remote control interface 620 can communicate with a remote control 629. The HDMI interface 622 can be coupled to a local display 630, such as a local television. The assembly module 608 can retrieve at least one of multimedia content and advertisements from the internal storage 616 and/or the external storage 624 via the storage interface 642, and output the at least one of multimedia content and advertisements to a display device 630, such as local television, for viewing by the subscriber 105. The program, data, information, content, etc. can be stored encrypted in the internal storage 616 (e.g., the internal storage 616 can include the random access memory 644 and/or program storage memory 646), and/or the external storage 624. The multimedia content and advertising can be stored encrypted in the FIFO memory 648.

The CPE 110 can be a "set top" box that can provide a mechanism to store and display multimedia content (and advertisements) across a variety of devices, shown in FIG. 6. The CPE 110 can interact with the distribution gateway 130 and the subscriber 105 to coordinate the viewing of multimedia content. Although the multimedia delivery system 100 can stream multimedia content, the primary mode of operation is to display multimedia content that has been pre-stored on the CPE 110. An advantage of pre-storing multimedia content on the CPE 110 is to reduce peak distribution infrastructure bandwidth requirements and eliminate susceptibility to momentary glitches in network delivery of the multimedia content.

The CPE 110 can have a primary CPE 110 account for bill paying, overall price control, and parental controls, as well as defining underlying individual profiles for viewing preferences and selections. In addition, an individual CPE 110 can have multiple primary accounts that can allow for separate billing.

The CPE 110 can store all multimedia content in an encrypted state until the CPE 110 receives a subscriber 105 requested to display the multimedia content. After viewing, any unencrypted buffered multimedia content can be purged, again leaving only the encrypted multimedia content resident on the CPE 110. The CPE 110 can receive broadcast delivery via at least one of the receivers 614a and 614b from one or more broadcast infrastructure 210. In an embodiment in which the CPE 110 receives broadcast delivery from a single broadcast infrastructure 210, the receivers 614a and 614b are logical receivers within a single physical receiver device, such as a receiver 614. In an embodiment in which the CPE 110 receives broadcast delivery from at least two broadcast infrastructures 210, the receivers 614a and 614b are two physical receivers. In addition, the CPE 110 can be preloaded for general resale with popular current multimedia content so the subscriber 105 can start using the CPE 110 immediately without needing to stream and/or download the multimedia content prior to viewing. The preloaded multimedia content can also include a variety of promotional videos, content, and/or advertising.

The Wi-Fi/cellular interface 602 and Ethernet interface 604 can provide network interfaces to the distribution gateway 130 via the service provider 160 of the subscriber 105. In addition, these interfaces can be used to connect to a video extender 626 and one or more portable devices 628 to the CPE 110. The video extender 626 can be a stripped down CPE 110 that allows the CPE 110 to transfer video content to multiple televisions, simultaneously. The CPE 110 can directly transfer and store multimedia content on portable devices 628 for subsequent display of the multimedia content. The environmental monitoring module 606 can monitor for vibration, intrusion, temperature, power glitches, and any other factors that may cause an electronic failure with the CPE 110. The HDMI interface to the local display 630, video extender 626, and/or portable device 628 can be either encrypted or unencrypted.

The CPE 110 can use, for any one-to-many multimedia content and/or advertisements delivery system (e.g., broadcast, multicast, etc.), a unique encryption key and a common or general decryption key to decrypt particular multimedia content, such as the multimedia and/or advertising content. Once the CPE 110 receives the unique encryption key and the general decryption key, the CPE 110 can decrypt the multimedia and/or advertising content with the general decryption key and re-encrypt the multimedia and/or advertising content with the unique encryption key prior to placing the multimedia content in the internal storage 616 and/or the external storage 624. These decryption/encryption techniques can make use of a combination of multiple keys (that is multi-key) which can be controlled by at least one or more of content providers 140, transport providers 160, advertisers 150, and viewer/subscriber 105. This decryption/encryption process can be performed in at least one of real-time and near real-time in the CPE 110. The distribution gateway 130 can transmit to the CPE 110 information required to perform the broadcast and/or multicast decryption and unique re-encryption per CPE 110 prior to placing the multimedia content and/or advertisements in storage, such as in internal storage 616. In response to a subscriber 105 request to play the multimedia content with the CPE 110, the distribution gateway 120 can transmit a unique decryption key to the CPE 110 that permits the CPE 110 to decrypt and play the multimedia content on the CPE 110. In at least one embodiment, the particular multimedia content can be unavailable other content and/or available other content described herein.

The subscriber 105 can initiate actions at any time during viewing of selected multimedia content with the CPE 110. These actions can include Pause/Resume, Fast Forward, Rewind and AdSkip. Each action modifies assembly instruction differently subject to a set of predetermined, programmable rules. In addition, the subscriber 105 can vote on individual advertisements with the potential to receive subsidies to offset the price of the multimedia content.

In each subscriber-initiated action, the CPE 110 can save the multimedia content state and capture the Time of Day (ToD) and the elapsed time from start of multimedia content viewing Tcs. At the start of multimedia content, Tcs can equal the current ToD and at the end of content Tce can equal the then current ToD. The ToD can include the time stamp of the day count (can be referenced to Jan. 1, 2015) and time (referenced from 0000 hours) and can be locked to an external, system time reference such as the NIST Time Server. Any subscriber 105 initiated action can carry both a ToD and a value relative to the Tcs. The ToD can include a day count starting at a multimedia system 101 defined point (can be referenced to Jan. 1, 2015).

Pause/Resume can allow the subscriber 105 to pause multimedia content and/or advertisement viewing and then resume multimedia content viewing when ready. Fast Forward can allow the subscriber 105 to fast forward the multimedia content and/or advertisement to a selected point and resume viewing. Associated with the Fast Forward action is a visual and/or timing (using the Tcs) cues to allow the subscriber 105 to find the desired point within the multimedia content and/or advertisement and resume viewing from that point. Rewind allows the subscriber 105 to find and replay a previously viewed point in the multimedia content and/or advertisement. Again, associated with the Rewind action is a visual and/or timing (using the Tcs) cues to allow the subscriber 105 to find the desired point and replay the multimedia content and/or advertisement.

AdSkip allows the subscriber 105 to skip a selected advertisement. Since the subscriber 105 can select the number of advertisements inserted into any given multimedia content, this feature is preferably limited. AdSkip can impact the potential advertiser 150 subsidy, and therefore the subscriber 105 costs within the multimedia system 101. The CPE 110 can provide an Advertisement Skip Button for particularly undesirable advertising. This feature can be implemented as permanent commercial skipping for the particular advertisement. This information can be transmitted back to the advertiser 150. If insufficient advertising subsidy remains to meet the subscriber's 105 requested subsidy, the CPE 110 can flash up on a display the cost impact of the commercial skip, indicate that additional advertisements might be needed to be viewed to make up for the skipped advertisement, or a combination of the two.

The Pause/Resume action can be implemented with the CPE 110. When the subscriber 105 presses and activates the Pause/Resume button on a remote of the CPE 110 (using a remote control), the CPE 110 can immediately pause the multimedia content and/or advertisement at that point, and capture and saves the content state (including the ToD and Tcs). The time of action Ta is the content elapsed time from Tcs (when the content was paused). Additionally, a ToD can be assigned to the time of action. If the Ta of the resume minus the Ta of the pause is less than or equal to a maximum allowed pause interval, then the subscriber 105 can resume the viewing of the multimedia content and/or advertisement. If the Ta of the resume minus the Ta of the pause is greater than this maximum allowed pause interval, then the resume functionality causes a new token to be issued by the distribution gateway 130 and the viewing of the multimedia content and/or advertisement resumes from the exact point of the pause. If the current ToD minus the Tcs exceeds the subscriber's 105 purchased viewing window, a new token purchase can be required. This decision can be provided as an option from the content provider 140. The subscriber actions, including play, pause, resume, fast forward, rewind, and ad-skip, can be reported to the system processor 128 of the system and services gateway 120 based on the time of action. The CPE 110 can capture and report actual multimedia content and advertisement viewing statistics in real-time and/or near real-time for use by the system processor 128 of the system and services gateway 120. In addition, all interactions with the subscriber web interface can be reported to the system processor 128. Note, the broadcast and/or playback token(s) can include time of content viewing, allowed length of viewing period, allowed number of times viewed, inserted advertising, etc. The token can be stored encrypted on the CPE 110 and can be scheduled for use at a given time/date prior to the content being viewed.

The distribution gateway 130 can include a content packetizer 132 and a control and status module 134. The distribution gateway 130 can monitor and manage, e.g., subscriber 105 usage of multimedia content and data per CPE 110, billing data per CPE 110, key(s)/token(s) to enable individual CPEs 110 to record and display content, and changes in a CPE 110 router IP address as dynamic addresses changes. In addition, the distribution gateway 130 can supply a subscriber 105 web interface. The web interface can allow the subscriber 105 to select multimedia content and set preferences, to control overall monthly charges, generate advertisement insertion instructions, and provide a VPN bank to service the associated CPEs 110. The content packetizer 132 can deliver encrypted multimedia content and advertising (either encrypted or un-encrypted) to the CPE 110. In addition, the subscriber 105 may access the subscriber 105 web interface via the CPE 110 to request content play, request multimedia content recommendations, etc.

The distribution gateway 130 can have a large front-end storage to hold several million hours, or more, of frequently accessed multimedia content and current advertising. In addition, the front end storage can be used to buffer archived multimedia content, from the archive gateway 122, that is less frequently accessed. This approach can be done to allow all encrypted multimedia content transfers to be handled identically, whether current or archived. The actual sizing of the front end storage is an on-going process and can regularly be calculated in the system processor 128 to trade off and optimize cost for local storage vs. transportation infrastructure delivery prices to minimize expenses for archived or "infrequent" multimedia content access. This process can add, delete, and move multimedia content between the archive gateway 122 and the distribution gateway 130.

The control and status module 134 can provide the overall coordination of the distribution gateway 130. The control and status module 130 can ensure that a subscriber 105 data use monitor, a local audit function, usage tracking and billing function, a token/encryption/decryption key manager, the subscriber web interface, advertising control, the VPN bank, and the content packetizer 132 all operate together without problems.

Figure 7:
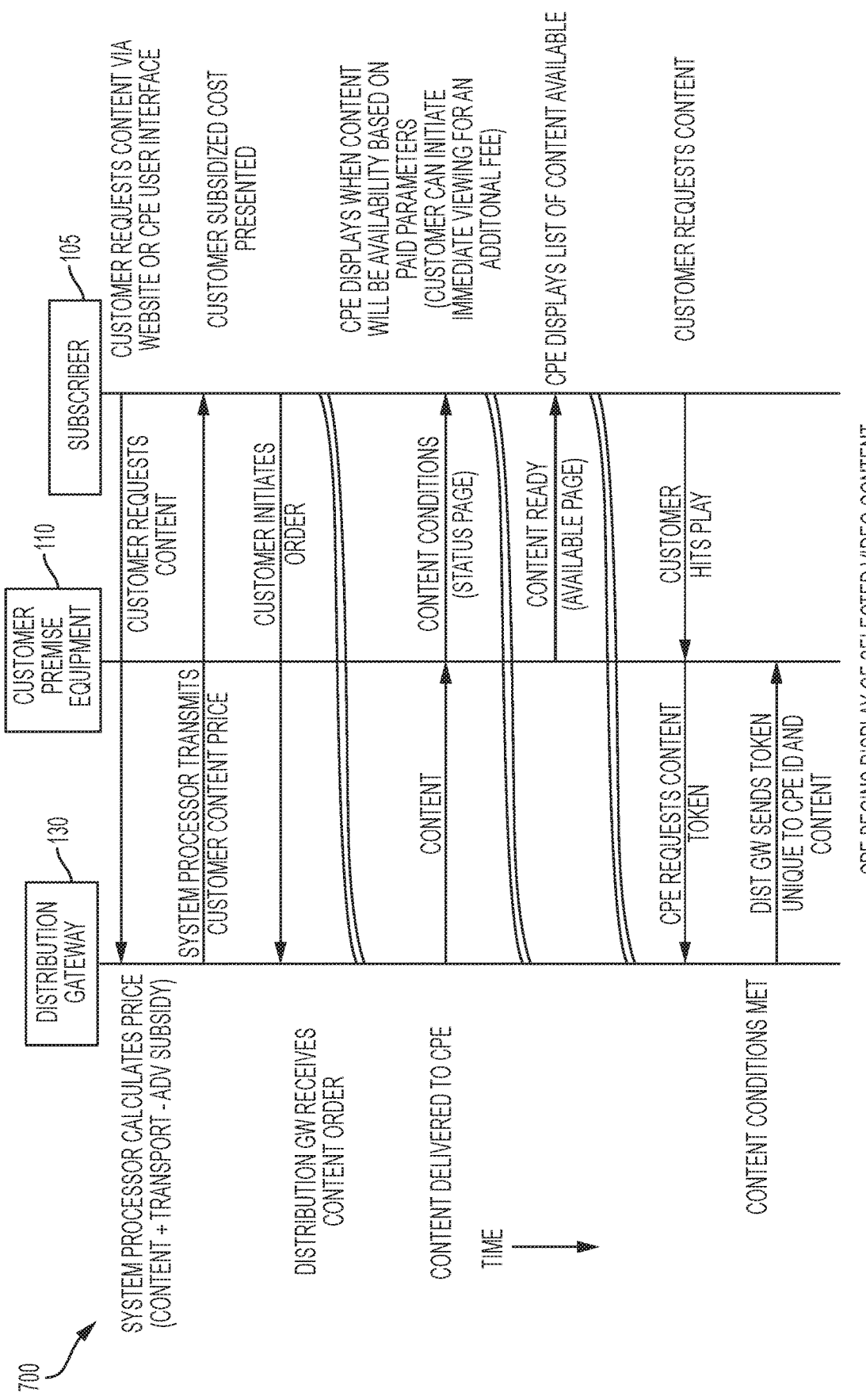
FIG. 7 illustrates an example interactive, bidirectional-exchange of information between the CPE and a distribution gateway, and between the CPE and a subscriber, in accordance with one or more possible embodiments.

FIG. 7 illustrates an example interactive, bidirectional-exchange of information 700 between the CPE 110 and the distribution gateway 130, and between the CPE 110 and the subscriber 105, in accordance with one or more possible embodiments.

All aspects of pricing can be handled outside of the CPE 110. The CPE 110, if requested, can display the current and projected monthly billing cycle charges. In addition, a front panel LED can be set to display different colors based on used and projected multimedia content charges set against a selected threshold of the subscriber 105. As an example, green might indicate less than 75% of the selected dollar threshold utilized, yellow might indicate 76 to 100% of the selected dollar threshold utilized, and red may indicate over 100% of the selected dollar threshold utilized.

The distribution gateway 130 can receive, via the CPE 110, a subscriber 105 request for multimedia content. The subscriber 105 can send a request for multimedia content via a website or a user interface of the CPE 110. In response to such a request, the distribution gateway 130 can transmit to the subscriber 105, via the CPE 110, a plurality of prices associated with delivery of the requested multimedia content. The plurality of prices associated with the delivery can be based on a content provider 140 price for the multimedia content, an amount of lead-time of electronic delivery of the multimedia content, a time/date the multimedia content is viewed or scheduled to be viewed with the CPE 110, resolution of the multimedia content and/or a quality of the multimedia content. The plurality of prices can include any subsidies (for example, advertisements) that the subscriber 105 may receive when ordering the multimedia content. In one or more embodiments, system processor 128 can apply an additional subsidy to the subscriber content price based upon a demonstrated proof of a product purchase after the subscriber 105 viewed an associated advertising. A value of the additional subsidy can be based on whether the associated advertising is at least one of targeted, non-targeted, subscriber 105 requested, associated with a subscriber 105 identified cluster, and associated with an individual subscriber 105.

The subscriber 105 can initiate an order, via the CPE 110, to schedule delivery of the multimedia content by transmitting an "order" including selection of a price for delivery from the plurality of available prices. In response to the distribution gateway 130 receiving the order for multimedia content, the distribution gateway 130 can transmit the ordered multimedia content to the CPE 110 during a period when a delivery network of one or more of the transport providers 160 is being underutilized, for example midnight to 6 A.M. The CPE 110 can display a multimedia content conditions status page for the subscriber 105. The CPE 110 can display when multimedia content will be available for viewing based on paid parameters. The CPE 110 can display an option for the subscriber 105 to initiate immediate viewing of the multimedia content, instead of waiting until the previously scheduled view time, for an additional fee.

The CPE 110 can inform the subscriber 105 that multimedia content is ready for viewing on a display page listing available multimedia content. The subscriber 105 can request to the view the multimedia content by sending a request to the CPE 110. In one or more possible embodiments, the subscriber 105 can hit play on the remote control 629 of the CPE 110. In response to the subscriber 105 requesting to view the multimedia content, the CPE 110 can send a request to the distribution gateway 130 for any type of content token. As long as multimedia content viewing conditions are met, the distribution gateway 130 can respond to such a request by sending a token unique to a requesting particular CPE 110 identifier and the particular multimedia content about to be viewed by the subscriber 105. The CPE 110 can receive such a unique token and begin display of selected multimedia content.

The multimedia system 101 can provide for interactive, bidirectional-exchange of control information between the subscriber's CPE 110 and the distribution gateway 130, for example within the VPN 505 network infrastructure, as shown in FIG. 5. From a perspective of the subscriber 105, this control can include downloaded multimedia content identification, subscriber viewing choices and preferences (general and content-specific), and additional control parameters that flow from the CPE 110 to the distribution gateway 130. From the perspective of the distribution gateway 130, this control can include pricing based on subscriber 105 choices and alternate pricing strategies, which can lower the price of multimedia content. Additional information (for example, billing) can also pass through the VPN 505.

Figure 8:
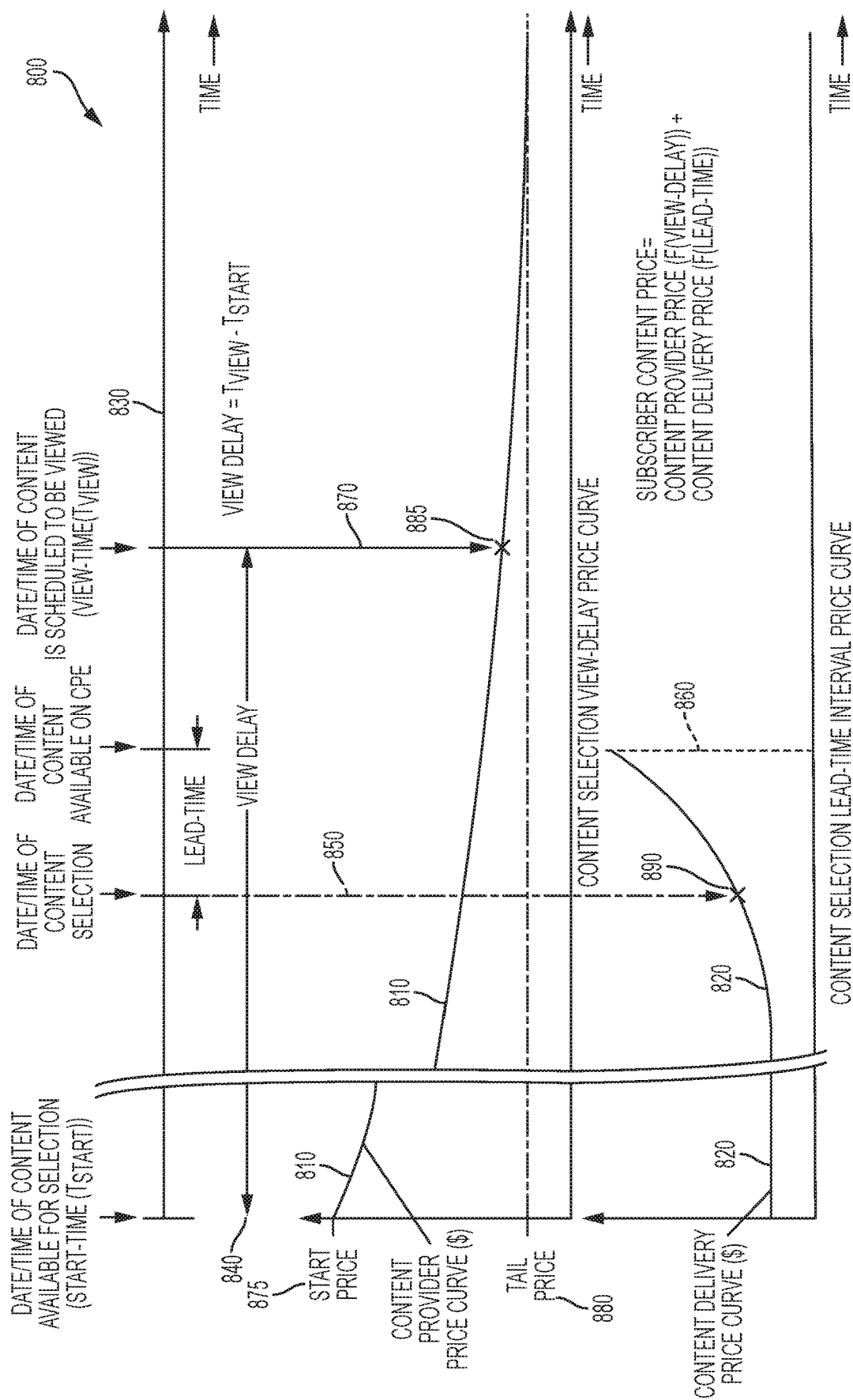
FIG. 8 illustrates an example of subscriber content price timing, in accordance with one or more possible embodiments.

FIG. 8 illustrates an example of subscriber 105 multimedia content price timing 800, in accordance with one or more possible embodiments. The subscriber 105 multimedia content price timing 800 illustrates a timeline 830 showing timing for events from an earlier time to a later time comprising: a date/time of multimedia content is available for selection (start-time) 840, a date/time that multimedia content selection 850, a date/time that multimedia content is available 860 for viewing on the CPE 110, and a date/time that multimedia content is scheduled to be viewed (view-time) 870 on the CPE 110.

The subscriber content price sequence 800 can include a multimedia content provider 140 price curve 810 and a content delivery price curve 820. The content provider 140 price curve 810 can decrease as a function of the length of time from a date/time of multimedia content is available for selection (start-time) 840. The content provider 140 price curve 810 can decrease from a start price 875 that can be established at a time the multimedia content is made available for selection 840. The content delivery price, as shown with curve 820, can increase or decrease as function of lead-time (the length of time between the date/time of multimedia content selection 850 and the date/time of multimedia content is required to be available 860 on the CPE 110).

The system processor 128 can determine a lead-time by taking a difference between the time of the date/time of multimedia content being available 860 and the date/time of multimedia content selection 850. The content delivery price 890 can be determined at any instantaneous time on the content delivery price curve 820 that intersects with the date/time of multimedia content selection 850. In accordance with the principles disclosed herein, the system processor 128 can determine the lead-time and delivery time(s) that will result in the lowest price to deliver the multimedia content to the CPE 110. The system processor 128 can determine the lead-time as hours, days, a week, two-weeks, a month, quarterly for a year, and/or any other period of time that can optimize the delivery price of the multimedia content and as an outcome of this, optimizes the bandwidth of the delivery infrastructure provided by one or more transport providers 160. The multimedia content can be delivered all at once or in segmented portions to the CPE 110. The multimedia content can be delivered throughout the lead-time period to be reassembled at the CPE 110 upon completion of the delivery to the CPE 110.

The system processor 128 can determine a view-delay by taking a difference between the date/time of multimedia content is planned to be viewed (view-time) 870 and the date/time of multimedia content is available for selection (start-time) 840. The multimedia content price 885 can be determined at any instantaneous time on the content provider 140 price curve 810 that intersects with the date/time of multimedia content is planned to be viewed (view-time) 870. The system processor 128 can determine a subscriber 105 content price by adding a content provider 140 price and a content delivery price for transporting the multimedia content via one or more transport providers 160. The content provider 140 price is a function of a time at which the multimedia content is scheduled to be viewed and the actual start time for the multimedia content. The content delivery price can be a function of the lead-time of delivery via the transport provider 160 to the CPE 110.

Figure 9:
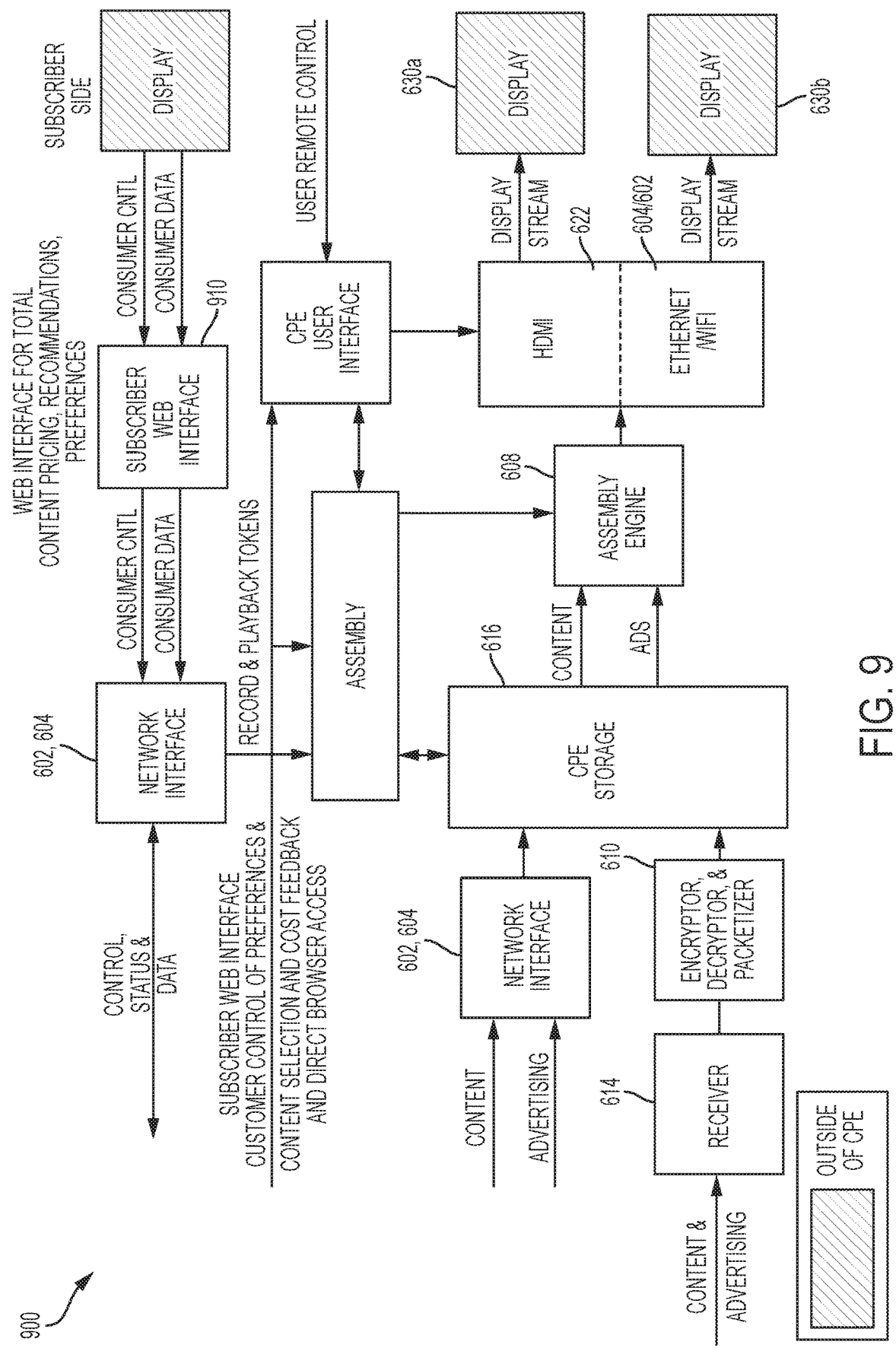
FIG. 9 illustrates a functional block diagram of the example CPE, in accordance with one or more possible embodiments.

FIG. 9 illustrates a functional block diagram 900 of the example CPE 110, in accordance with one or more possible embodiments. The top half of FIG. 9 illustrates the control, status and data interaction with the subscriber 105 and distribution gateway 130 via the network interface 602 and/or 604. This interaction (listed in Tables 1 through 4) can include at least one subscriber web interface 910 for setting up subscriber preferences, request multimedia content recommendations and selection(s), and billing. The distribution gateway 130 interface controls the preloading of content and advertising to the CPE 110, the control of content playback and advertising insertion, and CPE 110 usage for customer billing. The lower left hand side of FIG. 9 illustrates a network interface 602 and/or 604 that can load content and advertising into the CPE storage 616 via the delivery infrastructure (for example, the Internet and/or broadcast infrastructure 210). The lower right hand of FIG. 9 illustrates the playback control and assembly of video streams to multiple displays responding to subscriber 105 requests.

The CPE 110 can encrypt all information passing through external display interfaces to increase the security of the CPE 110. An external interface encryption key can be unique to each CPE 110 and particular multimedia content. Note, key generation and transport of said key can be via an encrypted, bidirectional control, status and data 1610 interface. The CPE 110 can be manufactured with a special epoxy or other adhesive to prevent integrated circuit (IC) delidding that could allow the internal decryption keys to be read.

The CPE 110 can maintain a log of all CPE 110 events to provide viewing historical feedback about/for the subscriber 105. This can include a list of all content advertising viewed, graphical representation of cost/price as a function of time, price or program rating histograms, or other useful feedback. This historical feedback can be on a per profile basis or as a profile summary for the CPE 110.

Figure 10:
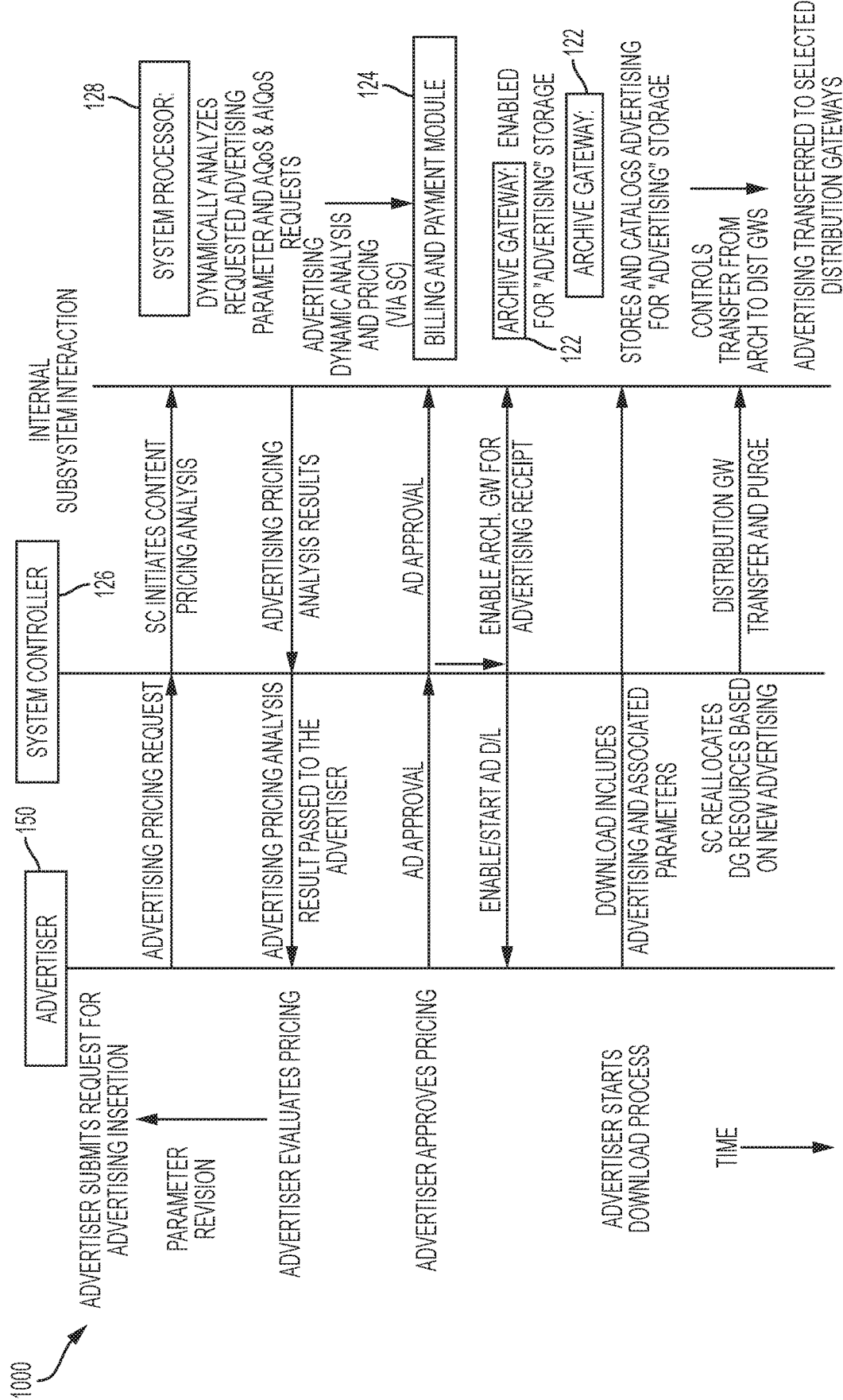
FIG. 10 illustrates example interaction between an advertiser and the system controller, and between the system controller and internal subsystems of a system and services gateway, in accordance with one or more possible embodiments.

FIG. 10 illustrates example interaction 1000 between the advertiser 150 and the system controller 126, and between the system controller 126 and internal subsystems of the system and services gateway 120, in accordance with one or more possible embodiments.

The advertiser 150 can transmit an advertising pricing request to the system controller 126. In response to such a request, the system controller 126 can pass such information to the system processor 128 to initiate an advertising pricing analysis. The system processor 128 can analyze requested advertising parameter(s), AQoS request, and AIQoS. The system processor 128 can transmit advertising pricing analysis results to the system controller 126. The system controller 126 can transmit the advertising pricing analysis results to the advertiser 150. The advertiser 150 can approve pricing for advertising by transmitting approval to the system controller 126. The system controller 126 can transmit such an approval to the billing and payment module 124.

The system controller 126 can transmit a request to the advertiser 150 to enable/start an advertising download. The system controller 126 can enable the archive gateway 122 to receive the advertising for storage. The advertiser 150 can transmit the advertising and associated parameters to the archive gateway 122 via the system controller 126. The system controller 126 can reallocate distribution gateway 130 resources based on new advertising. The system controller 126 can transfer the advertising from the archive gateway 122 to selected distribution gateway(s) 210 and send instructions to the distribution gateway(s) 210 to purge any advertisements that are no longer being used by the advertisers 150. In at least one embodiment, the aggregation distribution gateway 1330 can send (e.g., periodically such as weekly, monthly, etc.) the instructions to purge advertisements on the CPE 110 that are no longer used by the advertisers 150.

Figure 11:
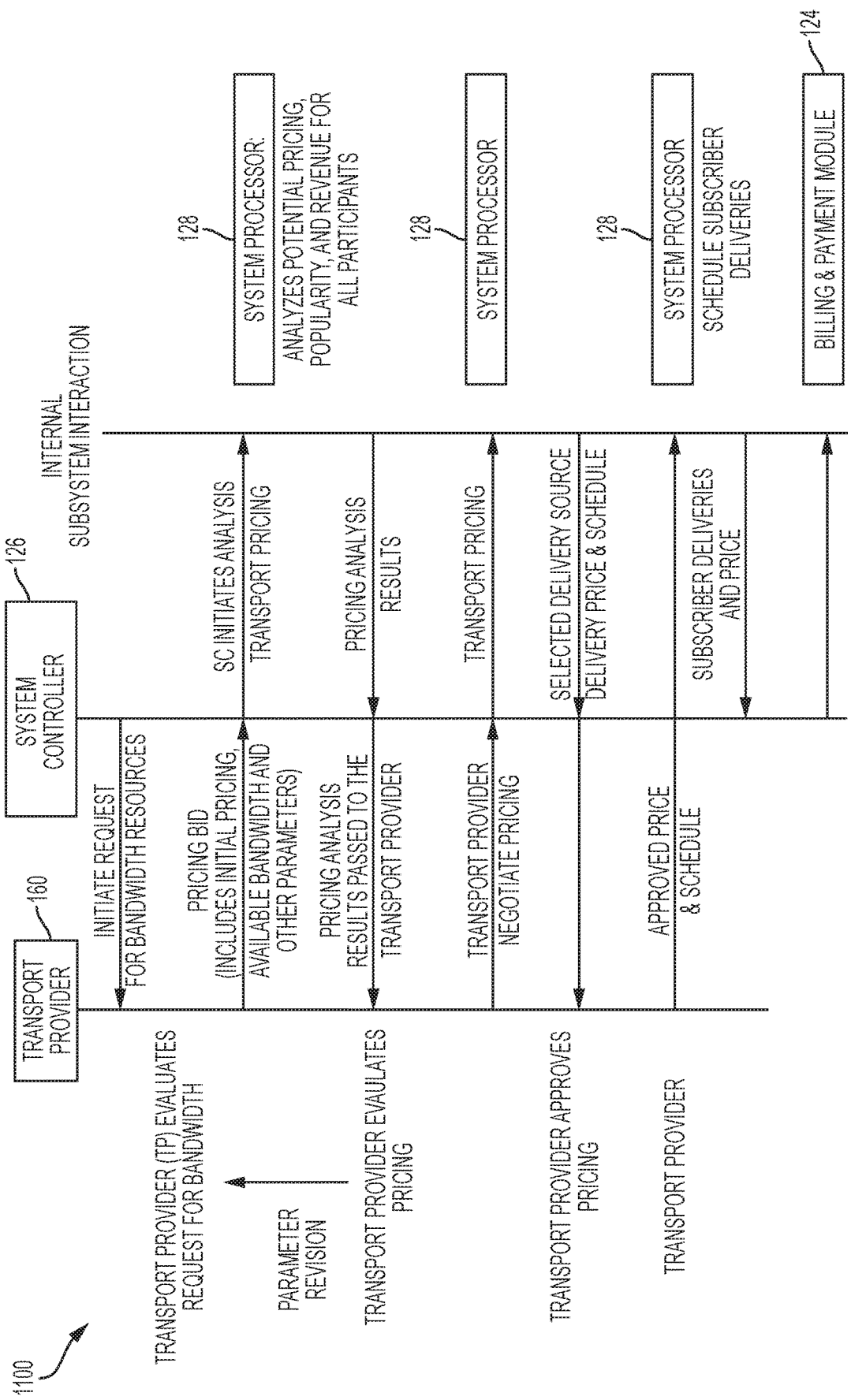
FIG. 11 illustrates an example interaction between a transport provider and the system controller, and between the system controller and internal subsystems of the system and services gateway, in accordance with one or more possible embodiments.

FIG. 11 illustrates an example interaction 1100 between the transport provider 160 and the system controller 126, and between the system controller 126 and internal subsystems of the system and services gateway 120, in accordance with one or more possible embodiments.

The transport provider 160 can receive a request for bandwidth resources from the system controller 126. The transport provider 160 can evaluate the request for bandwidth and respond with a pricing bid to the system controller 126. The pricing bid can include initial pricing of the bandwidth requested, available bandwidth, and any other parameters required to satisfy the request for bandwidth resources. The system controller 126 can initiate an analysis of delivery pricing by transmitting the delivery pricing bid to the system processor 128. The system processor 128 can analyze potential pricing, popularity, and revenue for all participants, content providers, transport providers, and advertisers, individually and jointly. The system processor 128 can send results of the delivery pricing analysis to the system controller 126.

The system controller 126 can transmit the pricing analysis results to the transport provider 160. The transport provider 160 can evaluate the electronic delivery pricing analysis and respond to the system controller 126 with negotiated transport pricing. The system controller 126 can pass the negotiated delivery pricing to the system processor 128. The system processor 128 can select a transport provider 160, a delivery price, and a delivery schedule. The system processor 128 can pass the transport provider 160, the delivery price, and the delivery schedule to the system controller 126 which transmits such information to a particular transport provider 160. The particular transport provider 160 can respond to such information by transmitting, to the system processor 128 via the system controller 126, an approval of the delivery price and the delivery schedule. The system processor 128 can schedule multimedia content delivery and pass the scheduled multimedia content delivery to the system controller 126. The system controller 126 can pass the ultimate delivery pricing to the billing and payment module 124.

Figure 12:
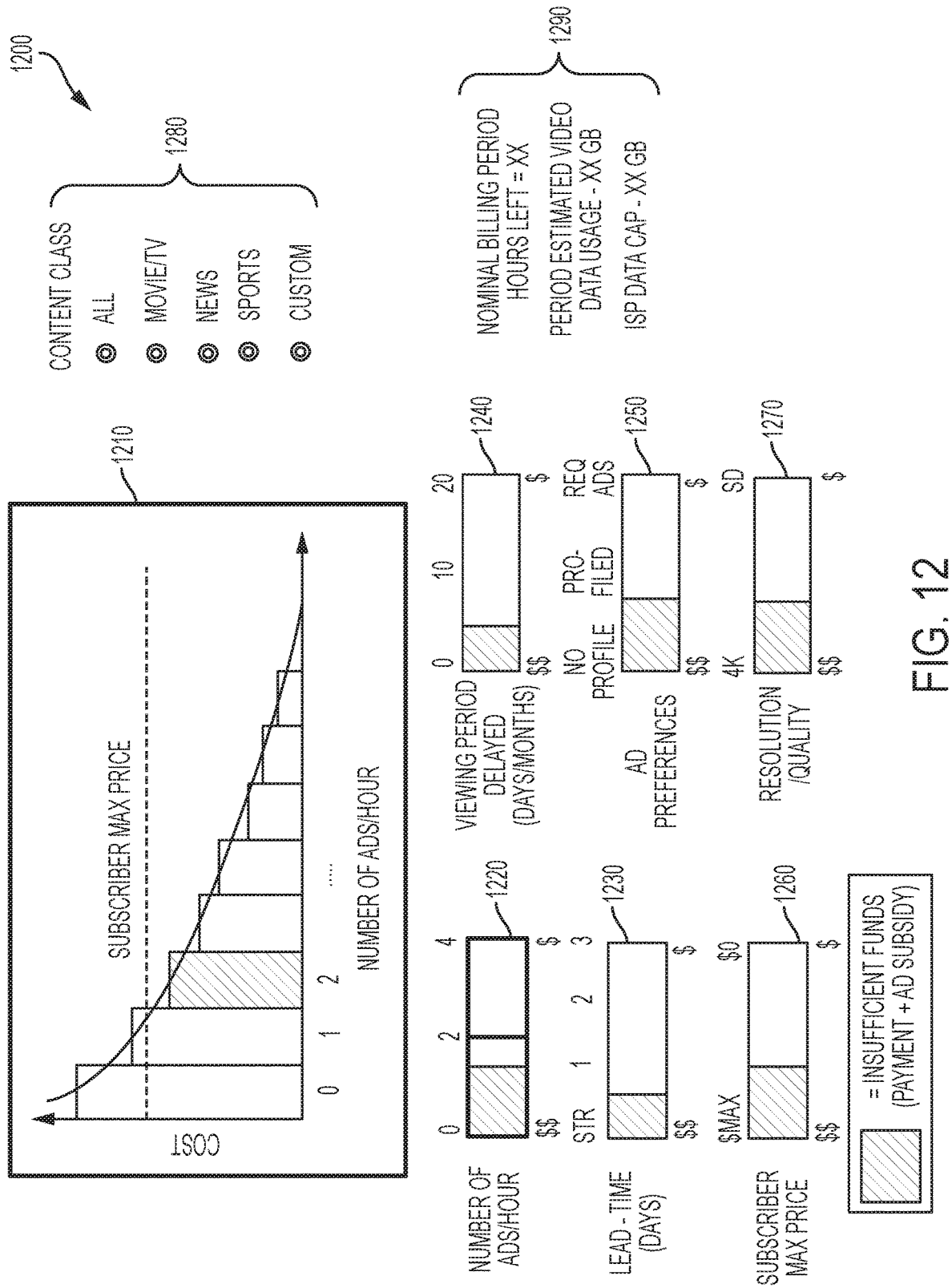
FIG. 12 illustrates an example subscriber web interface displaying preference/cost impact, in accordance with one or more possible embodiments.

FIG. 12 illustrates an example subscriber web interface 1200 displaying preference/price impact, in accordance with one or more possible embodiments.

The subscriber web interface 1200 can display monthly billing cost as a function of a number of ads per hour, lead-time, content viewing delay, and advertisement preferences. Each variable can be independently displayed showing the cost/price impact of the preference selection by the subscriber 105. Preferences can be set for all content, desired groupings of multimedia content, particular multimedia content for the subscriber 105 account, or can be further subdivided by individual profile. The subscriber 105 can also adjust price as an independent variable. The subscriber web interface 1200 can include an advertisement subsidy box 1210, an advertisement slide control 1220, a lead-time slide control 1230, a delayed viewing period since release slide control 1240, an advertisement preferences slide control 1250, a subscriber maximum cost slide control 1260, and a resolution and/or quality slide control 1270. The subscriber 105 can change any of the slide controls 1220, 1230, 1240, 1250, 1260, and 1270 and view a price result of such changes.

The subscriber web interface 1200 can further include subscriber selectable groupings. For example, the content class buttons 1280 can allow a subscriber 105 to set the groupings of multimedia content. The groupings can include classes of what particular multimedia content the subscriber 105 would make selections from. System defined content classes (for example, a default content class) can include selections for all, movie/TV, news, sports, and custom. As an example, subscriber 105 defined content class could include Movie/TV which would override the All Class setting for Movie/TV content. In addition, an individual multimedia content class would set a custom setting for a particular TV series which would override the Movie/TV settings for that particular series. The subscriber 105 web interface 1200 can further include account information 1290 for the subscriber 105, such as nominal billing period hours left information, period estimated data usage information, and ISP data cap information.

The advertisement subsidy box 1210 can display, for the subscriber 105, a maximum cost/price set by the subscriber 105. The advertisement subsidy box 1210 can display a cost/price for particular multimedia content as a function of a number of advertisements that the subscriber 105 accepts to be viewed while watching the multimedia content. The advertisement slide control 1220 can allow the subscriber 105 to set a number of advertisements to be viewed within a given period of time (for example, per hour). Changes made to the advertisement slide control 1220 can be viewed in the advertisement subsidy box 1210.

The lead-time slide control 1230 can allow the subscriber 105 to control a maximum amount of delay (lead-time) before multimedia content is to be sent to the CPE 110. The delayed viewing period since release slide control 1240 can allow the subscriber 105 to control a number of days/months until the CPE 110 allows the subscriber 105 to view particular multimedia content. Advertisement preferences slide control 1250 can allow the subscriber 105 to control a number of advertisements that are inserted into the multimedia content and presented to the subscriber 1250 when viewing particular multimedia content. The subscriber max cost slide control 1260 can allow the subscriber 105 to adjust a maximum cost that the subscriber 105 will accept for a given billing period. The subscriber web interface 1200 can include the resolution and/or quality slide control 1270 to allow the subscriber 105 to select a resolution and/or quality for particular multimedia content. The lead-time slide control 1230 is illustrated as allowing a subscriber 105 to set the lead-time as an exemplary maximum of 3 days. However, the maximum lead-time that the lead-time slide control 1230 can allow the subscriber 105 to set can be any number of days that provides adequate flexibility to the subscriber 105. For example, the lead-time slide control 1230 can allow the subscriber 105 to set the lead-time to a week, two-weeks, a month, quarterly for a year, and/or any other period of time that can optimize the delivery price of the multimedia content for the subscriber 105.

The subscriber 105 can also manually adjust their control parameters, including cost, for specific subscriber 105 or system defined classes of content for their viewing experience. These classes can be defined for individual pieces of multimedia content, a content series, or selected subset of content that can include, as examples, newer television, older television, live sports, movies, etc. and/or can provide further refinements of class such as movie, action, etc.

Figure 13:
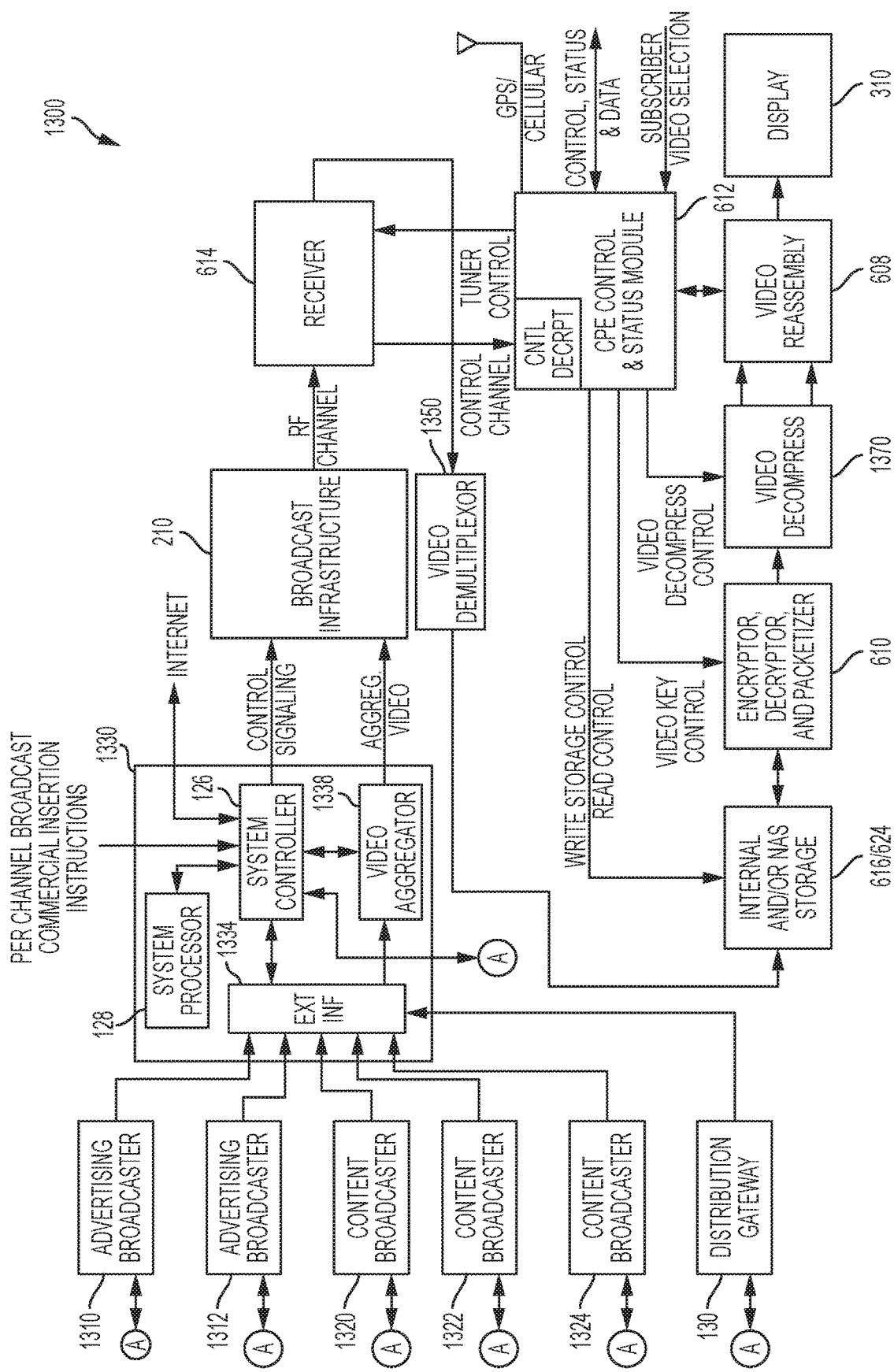
FIG. 13 illustrates an example video time-bandwidth product improvement (VTBPI) system, in accordance with one or more embodiments.

FIG. 13 illustrates an example video time-bandwidth product improvement (VTBPI) system, in accordance with one or more embodiments. The VTBPI system 1300 can include the hardware components illustrated in FIGS. 1-3, 5, 6, and 9 discussed above and further include an apparatus, such as the aggregation distribution gateway 1330, a broadcast infrastructure 210 provided by one or more transport providers 160, the encryptor, decryptor, & packetizer 610, a video decompressor module 1370, the assembly module 608, and a CPE 110 control & status module 612. In at least one embodiment, the CPE 110 can be another apparatus. The aggregation distribution gateway 1330 can be coupled to and/or included within the distribution gateway 130 and receive multiple content, for example from multimedia content broadcasters 1320, 1322, and 1324 and advertising broadcasters 1310 and 1312. A content broadcaster 1320, 1322, and 1324 can include a legacy linear TV OTA content broadcaster (e.g. ABC, CBS, etc.), community content broadcaster, cable (and satellite) linear TV content broadcasters (e.g. Discovery, TMC, etc.) and any other source or provider, that in the future, can the provide linear TV content broadcast, multimedia content that can be delivered on a schedule (e.g. YouTube, Netflix, etc.). In at least one embodiment, a content broadcaster can deliver multimedia content without using a standard legacy TV schedule in which programs are aligned with wall clock time starting at even hour and ½ hour marks.

In another embodiment, the aggregation distribution gateway 1330 can deliver the multimedia content and/or other application(s) using a market-based approach in which the multimedia content delivery and/or other application(s) are prioritized based on value to the content provider 140, subscriber 120, advertiser 150 and/or other application. In at least one embodiment, this prioritization can separately be done for only excess OTA broadcast bandwidth (e.g., the bandwidth and/or RF spectrum required beyond legacy OTA broadcasters, community channels, etc.) or across all bandwidth and/or RF spectrum. A content broadcaster 1320, 1322 and 1324 can also operate as an advertiser broadcaster 1310 and 1312. When all or part of a distribution gateway 130 is combined with all or part of the aggregation functionality disclosed herein, such a distribution gateway 130 can be designated as the aggregation distribution gateway 1330. The aggregation distribution gateway 1330 can include the system processor 128, an external interface 1334, the system controller 126, and a video aggregator 1338, where in at least one embodiment the video aggregator 1338 can be part of the system controller 126. In at least one embodiment, the VTBPI system 1300 can include multiple antennas for different frequency bands on the same tower (e.g., such as for VHF-Hi and VHF-Lo frequencies), as well as multiple aggregation distribution gateways 1330 (e.g., on one or more antennas) delivering the same or different mixes of multimedia content and advertisements.

In at least one embodiment, the system processor 128 and/or the system controller 126 can be implemented in multiple devices, for example the system processor 128 and/or the system controller 126 can be distributed within the aggregation distribution gateway 1330, broadcast infrastructure 210 and/or the CPE 110. In another embodiment, the number of linear TV broadcasters 1320, 1322, and 1324 in the aggregated broadcast can be reduced by using feedback from the CPE 110 to identify programs that are at least not one of currently being viewed by a subscriber 105 and not currently being stored by the CPE 110. The aggregation distribution gateway 1330 can then use this feedback information to further reduce the bandwidth and/or spectrum required by the broadcast infrastructure 210. The at least one transport provider 160 can utilize the broadcast infrastructure 210 to deliver content to CPEs 110. Distribution of aggregated and multiplexed multimedia content and/or advertising content to the CPE 110 via the broadcast infrastructure 210 is referenced herein as a VTBPI broadcast. The VTBPI broadcast can be done via OTA broadcast, cable, satellite, cellular, and/or the Internet (e.g. multicast, unicast, peer-to-peer, and/or mesh architectures). The HVTBPI system can include VTBPI broadcast.

In accordance with one or more embodiments, the aggregation distribution gateway 1330 can implement VTBPI to automatically record multimedia content on the CPE 110 that will be repeated within a specified period of time, for example, those that repeat within a 24 hour period. Once the multimedia content is initially recorded (with or without advertisements) by the CPE 110, if the subscriber 105 tunes to a delivery channel when a repeated show was scheduled to be broadcast via a transport provider 160, the CPE 110 can reconstruct the multimedia content programs from the previously recorded multimedia content with no discernible viewing experience difference to the subscriber 105 as compared to watching a conventional "broadcast" program, also known within the art as a linear TV program. The broadcast infrastructure 210 can include one or more of OTA broadcast, satellite, cellular, wired, wireless, and/or the Internet and/or may instead insert multimedia content, advertising, public service announcements, etc. instead of resending the repeated multimedia content to the CPE 110.

In at least one embodiment, the aggregation distribution gateway 1330 can release additional bandwidth via the VTBPI process disclosed herein to download to a specific CPE 110 or groups of CPEs 110 defined by one or more demographic clusters for advertising, advertising insertion instructions, and/or any other data to the CPE 110. This download information can also be transmitted to the CPE 110 with the aggregated stream, or via the Internet or other transport structure. The extra bandwidth that is released by use of the aggregation distribution gateway 1330 implementing VTBPI may be used to download higher resolution and/or higher quality multimedia content for display with the CPE 110, as part of an enhanced broadcast, a subscription service, and/or ala carte multimedia content viewing service provided by the CPE 110 for the subscriber 105. In at least one embodiment, the video aggregator 1338 of aggregation distribution gateway 1330 can multiplex a content broadcaster 1320, 1322, 1324 multimedia content together with the multimedia content scheduled (e.g. other multimedia content) to be delivered within the scheduled lead-time discussed above under direction of the system controller 126. The scheduled lead-time is discussed above in relation to FIGS. 1-12. The video aggregator 1338 can further multiplex an advertisement together with the multimedia content, the advertisement can be scheduled for delivered to the CPE 110 prior to presentation to the subscriber 105 or concurrently with a broadcast of the advertisement to the CPE 110. Such an advertisement can be delivered, by the system controller 126 of the aggregation distribution gateway 1330, to the CPE 110 separately from the multimedia content. The system controller 126 of the aggregation distribution gateway 1330 can transmits an advertising insertion instruction to the CPE 110 instructing the CPE 110 where to insert the advertisement into the multimedia content. Note, scheduled lead-time multimedia content can be delivered via a content broadcaster.

The aggregation distribution gateway 1330 can further reduce the required spectrum for a given delivery channel of the CPE 110 by eliminating the continued repetition of advertisements disclosed herein, referred to herein as advertising delivery option (ADO). The aggregation distribution gateway 1330 can maximize the VTBPI process for a given region by combining the multimedia content broadcasts of multiple channels. Such a broadcast aggregation process can be implemented using a subset of the distribution gateways 130 or via the aggregation distribution gateway 1330. The aggregation performed by the aggregation distribution gateway 1330 and/or the distribution gateway(s) 130 can be combined with advanced video compression algorithms for even greater time-bandwidth product improvement. The VTBPI can be combined with an increased number of bits per symbol, improved forward error correction (FEC), advanced video compression, use of a statistical multiplexer, use of directional receive antennas and/or transmitter power control, transmitter beam shaping to provide a substantial spectral efficiency and frequency reuse improvement compared to current OTA broadcast transmission.

The aggregation distribution gateway 1330 can more efficiently utilize bandwidth and/or RF spectrum for the delivery of multimedia content from at least one linear OTA content broadcaster 1320, 1322, 1324 via the broadcast infrastructure 210. The aggregation distribution gateway 1330 can make additional RF spectrum and/or bandwidth available for other applications. These other applications can include at least one of cellular service, software updates, software downloads (e.g., game downloads), public safety, Internet-of-Things (IOT), additional multimedia content delivery, etc. These other applications can be combined with services provided by the aggregation distribution gateway 1330 described herein, and in other embodiments, the other applications can be distinct from the services provided by the aggregation distribution gateway 1330.

The VTBPI techniques disclosed herein can also save spectrum in other wireless broadcast infrastructures, e.g. satellite, cellular, Wi-Fi, etc. The VTBPI techniques can save bandwidth in wired infrastructure, e.g. cable, fiber optic, copper line (e.g. digital subscriber line), etc. The aggregation distribution gateway 1330 can also be used in OTA broadcast or other wireless broadcast infrastructure 210 methods to increase the number of linear TV broadcasters that can be delivered within a given existing bandwidth or spectrum, release spectrum or bandwidth for other applications, or a combination of these uses. A subset of these techniques, such as statistical multiplexing, improved video compression, ADO, etc. can improve video transmission bandwidth efficiency in cable and other wired broadcast infrastructure 210 methods, and can be used to either increase the number of channels delivered to the viewer or use the released bandwidth for other applications.

The aggregation distribution gateway 1330 can aggregate multiple broadcast channels, including encrypted content, advertising and channel control information, into a reduced number of channels. The aggregation distribution gateway 1330 can transmit the reduced number of channels out of order/sequence. In one or more embodiments, the aggregation distribution gateway 1330 can aggregate multiple broadcast channels into a single channel stream for delivery to the CPE 110. The aggregation distribution gateway 1330 can delivery such information via the broadcast infrastructure 210. The channel control information can include advertising insertion instruction, regional overlays, logical channel assignment, program schedule (e.g., a schedule of multimedia content delivered via broadcast and/or a schedule of multimedia content delivered via VTBPI/HTVPBI disclosed herein), specific CPE 110 address disable instruction, and any other information to control the CPE 110. In this way, the multimedia delivery system 100 can emulate the way advertisements are currently being inserted into a multimedia content stream for a given legacy OTA TV broadcaster. In another embodiment, the advertising insertion instruction can be controlled via a secure data path to the CPE 110.

The aggregation distribution gateway 1330 can receive multimedia content from multiple content broadcasters 1320, 1322, and 1324 and multiplex that multimedia content into a reduced number of channels. For example, multimedia content from content broadcasters 1320, 1322, and 1324 can be multiplexed into any two of the channels of the broadcasters 1320, 1322, and 1324. Thus, multiplexing multimedia content from three content broadcasters 1320, 1322, or 1324 into reduced number of channels can free up the spectrum of the third channel for other wireless applications by eliminating the repeated delivery of advertisements. For OTA broadcast delivery, multiple aggregation distribution gateways 1330 can be used in areas with overlapping coverage. For satellite, cellular, and/or cable delivery, a single aggregation distribution gateway 1330 can be used for areas of overlapping coverage. The aggregation distribution gateway 1330 can provide a low speed control channel with a higher level of encryption delivered as a separate channel or multiplexed into the multimedia content channel. The aggregation distribution gateway 1330 can assemble the multimedia content into logical channels for reassembly by the CPE 110 once received. For each aggregation channel, the low speed control channel can provide the video channel data rate, logical channel definition, content decryption keys, advertising insertion instructions, broadcast tokens, and any other information that can be used to control video reassembly for each aggregation of multimedia content in the CPE 110. The control channel can be used to provide a multilayer authentication process to improve the encryption protection of the multimedia content that can be tied to the specific CPE 110.

Note, bandwidth (that is the channel capacity) for each channel of the statistical multiplexer can be proportional to the data content and/or application of said channel. Note, the statistical multiplexer can be part of the aggregation distribution gateway 1330. The use of a statistical multiplexer across multiple video feeds (channels) can reduce the RF spectrum and/or bandwidth required as the peak video compression data rate for a given video feed is spread amongst the total number of video feeds. As an example, 10 video feeds multiplexed with a statistical multiplexer can be more efficient (and typically is more efficient) than the 10 video feeds multiplexed as 2 sets of 5 video feeds. The statistical multiplexer and ADO disclosed herein can be combined with increased number of bits per transmitted symbol, such as N-QAM (Quadrature amplitude modulation) where N can be powers of 2, etc., as well error correction encoding, such as Reed-Solomon, trellis, Turbo, etc., combined with data interleaving. In another embodiment, the plurality of subscribers 105 recommendation, as part of intelligent aggregation as described herein, can be used to further release at least one of bandwidth, radio frequency spectrum, and data rate.

The spectral efficiency improvement of the statistical multiplexing can be further improved by profiling the required data rate as a function of time of the video compression over the prerecorded program. Using this profile across all prerecorded multiplexed content, along with local buffering of content within the CPE 110 can provide a further reduction in the average data required over a block of time by further smoothing out the highest instantaneous data rate required for a given compressed video quality (rate shaping). This can provide a reduction in required spectrum, an increase in the amount of content that can be delivered in a fixed bandwidth, and/or provide other applications. This approach can also be used with content that is a combination of live, such as news programs, award programs, sports, etc., and pre-recorded multimedia content. The system processor 128 can perform the rate shaping.

The CPE 110 can report its video and control link reliability (satellite or enhanced OTA broadcast operation) when feedback is available via a data network, for example, Internet, satellite Internet, a back channel, cellular, and/or any other data network that allows reporting of the reliability. Such reliability information can be reported to distribution gateway. This feedback can be used to calculate, prior to multimedia content viewing, a need to rebroadcast critical control information, reformulate transmitter beam patterns, or any other information/functions to improve overall link reliability.

Table 9 lists VTBPI/HVTBPI broadcast transmission options. These options can include a single multimedia content broadcaster and/or a single advertiser broadcaster with multiple sub-channels, cooperative content broadcasters that can form their own aggregations, regional and/or national broadcast aggregators.

TABLE 9

VTBPI/HVTBPI Options

| Option[1] | Description |
|---|---|
| Single Broadcaster Aggregation | A single broadcaster with multiple sub-channels can reduce a required RF spectrum by eliminating transmission of repeated advertisements. |
| Cooperative Broadcaster Aggregation | For example, three broadcasters can operate using the spectrum of two broadcasters by eliminating the embedded advertisements (~⅓ of the broadcast time) and the CPE can reinsert advertisements in the displayed video stream. |
| Regional Broadcast Aggregation | A regional broadcast aggregator can combine the content from multiple broadcasters into a high data rate stream or streams to aggregate many channels. This method can also reduce the number of tuners required in a CPE and reduce the amount of spectrum used for frequency guard bands. |

TABLE 9-continued

VTBPI/HVTBPI Options

| Option[1] | Description |
|---|---|
| National Broadcast Aggregation | A national broadcast aggregator can combine the content from multiple broadcasters into a high data rate stream or streams to aggregate many channels that may provide regional and national coverage. This can also reduce the number of tuners required in a CPE and reduce the amount of spectrum used for frequency guard bands. The national broadcast can be made up of transmission towers transmitting the same (or nearly the same) aggregated content via OTA broadcast signal, satellite transmission, cellular infrastructure, etc. |

[1]For example, broadcast aggregation can be done via OTA broadcast, satellite, cellular, Internet, cable, and/or a combination of all.

The options shown in Table 9 can be implemented in a subset of the distribution gateway 130 to pre-deliver VTBPI/HVTBPI multimedia content to CPEs 110. A subset of the CPE 110 functionality previously described herein can be used to implement VTBPI/HVTBPI functionality. A subset of the distribution gateway 130 functionality described herein can be located within a broadcaster's facility. The video aggregation disclosed herein can allow for use of logical channels, such that the subscriber 105 can use the same use currently assigned HDTV OTA or satellite channel that the subscriber 105 are already accustomed to using. The channel number is simply an arbitrary logical channel from the standpoint of the CPE 110, however such a channel number can provide for backwards compatibility that can reduce subscriber search. The use of broadcast aggregation disclosed herein can further reduce spectrum use by eliminating the need for spectral guard bands between individual channels.

Figure 14:
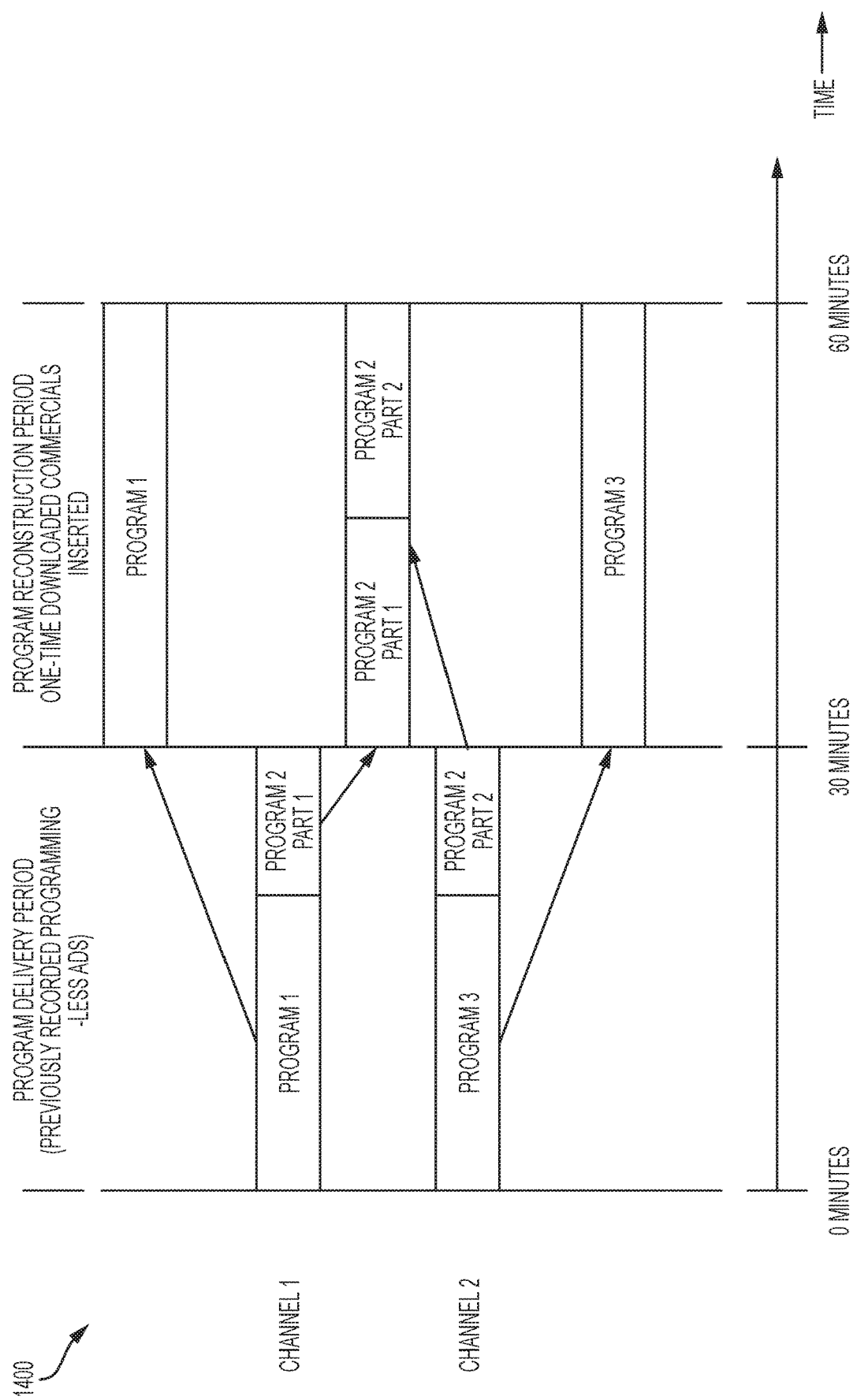
FIG. 14 illustrates an example VTBPI timetable, in accordance with one or more embodiments.

FIG. 14 illustrates an example VTBPI timetable 1400, in accordance with one or more embodiments. FIG. 14 shows an example VTBPI timetable in which the aggregation distribution gateway 1330 can delivery three (3) programs of multimedia content, that conventionally included embedded advertisements, in the time-bandwidth product that is conventionally required to deliver two (2) programs of multimedia content, referred to herein as the ADO. The aggregation distribution gateway 1330 can implement VTBPI, as discussed above, to deliver multimedia content to the CPE 110 with individual multimedia content being broken into smaller data blocks, which can minimize an amount of storage required in at least one of the internal storage 616 and the external storage 624 device of the CPE 110 for buffering. As the multimedia content data blocks become sufficiently small, the operation of multimedia content data block delivery can operate as a statistical multiplexer. The removal of advertising provides significant improvement in bandwidth efficiency compared to a statistical multiplexer with embedded advertising.

The aggregation distribution gateway 1330 can coordinate the VTBPI functions disclosed herein with the functions performed by the distribution gateway 130 discussed above for FIGS. 1-12. For example, the aggregation distribution gateway 1330 can coordinate its functions with the distribution gateway 130 to transmit the aggregated and multiplexed multimedia content within the lead-time determined by the system and services gateway 130 and by at least one transport provider 160. In addition, the pricing of multimedia content as a function of the view-time, as well as, subscriber 105 preference operation discussed above can be included in the functionality of the aggregation distribution gateway 1330, with, as discussed above, the system processor 128 may be implemented in the distribution gateway 130 and now referred to as the aggregation distribution gateway 1330.

Figure 15:
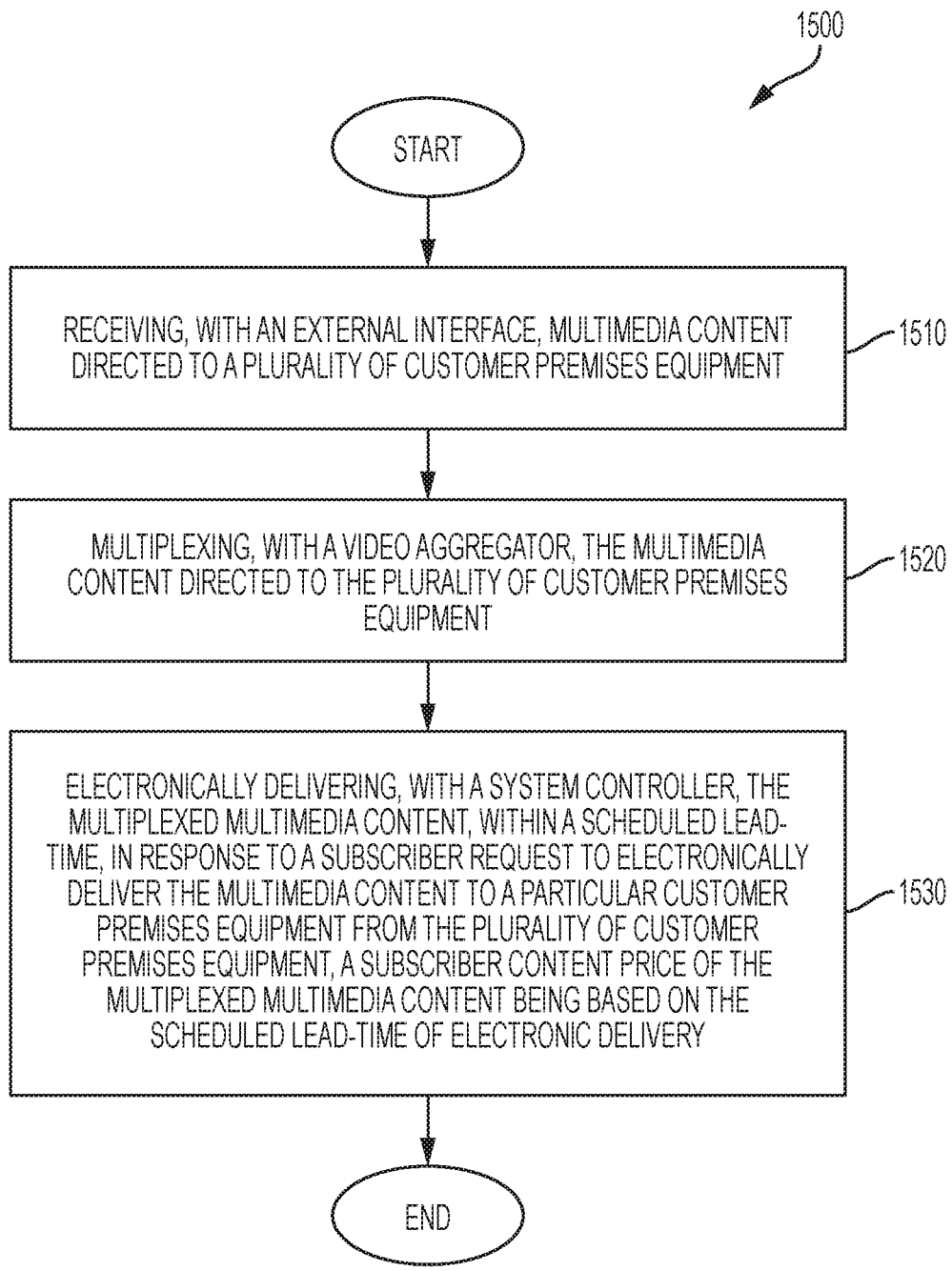
FIG. 15 illustrates a flowchart of an example method of transmitting VTBPI multimedia content, in accordance with one or more possible embodiments.

FIG. 15 illustrates a flowchart of an example method 1500 of transmitting VTBPI multimedia content, in accordance with one or more possible embodiments. The method 1500 is not limited to the example blocks shown and can include any of the processes performed by the multimedia delivery system 100.

The method 1500 can begin with block 1510. The method 1500 can begin by receiving multimedia content directed to a plurality of CPEs 110. The external interface 1334 of the aggregation distribution gateway 1330 can receive multimedia content that is directed to a plurality of CPEs 110 from one or more of the content broadcasters 1320, 1322, and 1324. Such multimedia content received with the external interface 1334 can include advertisements received from one or more of the advertising broadcasters 1310 and 1312. Block 1510 can proceed to block 1520.

At block 1520, the method 1500 can multiplex multimedia content. The video aggregator 1338 of the aggregation distribution gateway 1330 can multiplex the multimedia content directed to the plurality of CPEs 110 received in block 1510. Block 1520 can proceed to block 1530.

At block 1530, the method 1500 can electronically deliver the multimedia content. The system controller 126 of the aggregation distribution gateway 1330 can electronically deliver the multiplexed multimedia content, within a scheduled lead-time, in response to a subscriber 105 request to electronically deliver the multimedia content to a particular CPE 110 from the plurality of CPEs that the multimedia content was directed to. A subscriber 105 content price of the multiplexed multimedia content can be based on the scheduled lead-time of electronic delivery to the particular CPE 110.

Although the embodiments are directed toward the delivery of multimedia content, the teachings of the embodiments can be applied to any electronic paid content being served over a network or encrypted broadcast. The embodiments can be extended to traditional print media, on-line training, etc. One or more of the embodiments can even use a micro-payment system.

Figure 16:
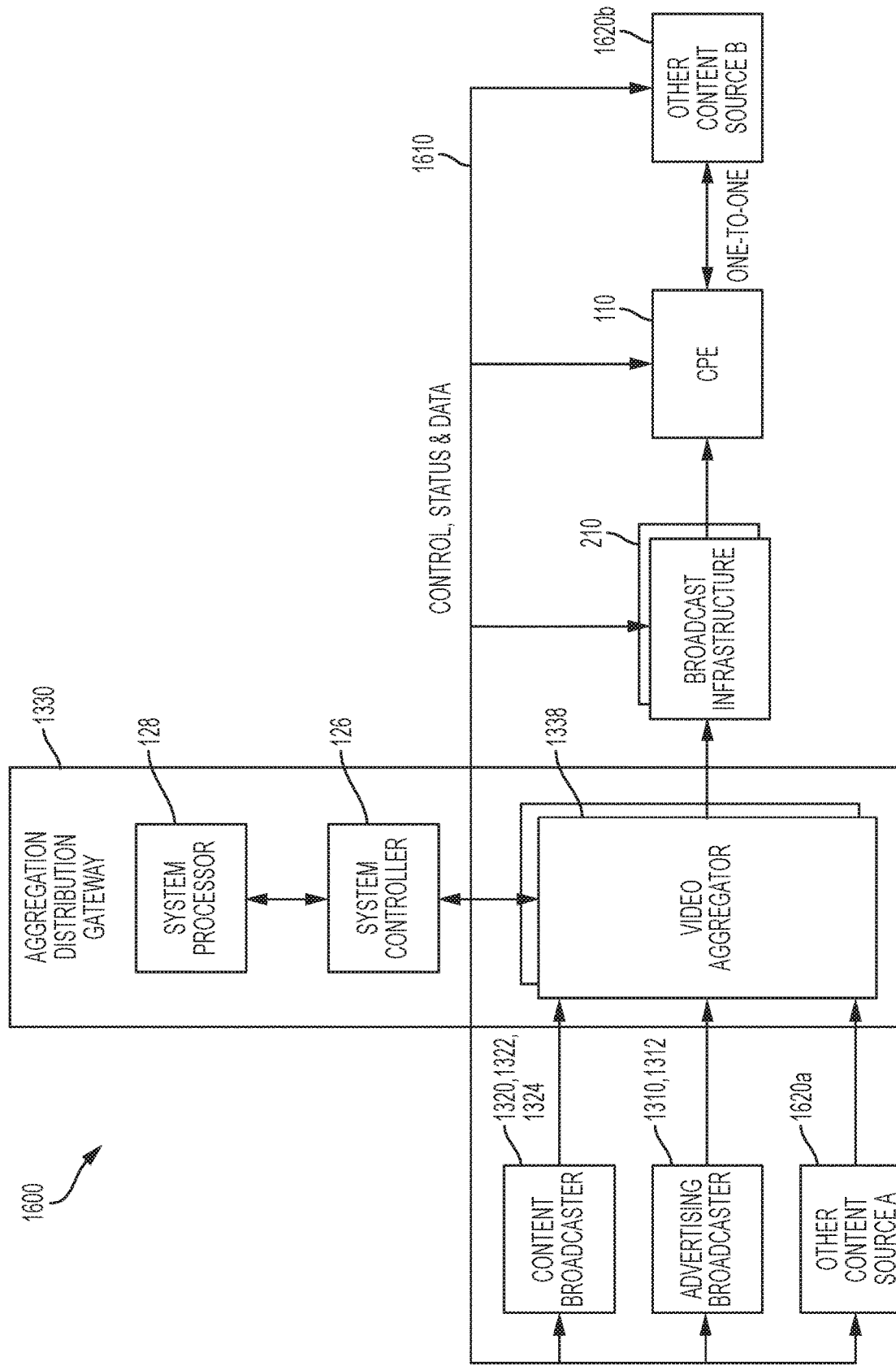
FIG. 16 illustrates an example simplified system of the system shown in FIGS. 2 and 3 that can support hybrid VTBPI (HVTBPI) disclosed herein, in accordance with one or more possible embodiments.

FIG. 16 illustrates an example simplified system 1600 of the multimedia delivery system 100 shown in FIGS. 2 and 3 that can support HVTBPI disclosed herein, in accordance with one or more possible embodiments. In at least one embodiment, the operation of the CPE 110 in combination with operation of the aggregation distribution gateway 1330 can provide the HTVBPI functionality disclosed herein for the subscriber 105. The system 1600 can further include the components shown in FIGS. 2 and 3 of the multimedia delivery system 100, and can utilize the features disclosed for the multimedia delivery system 100 in combination with HVTBPI disclosed herein. In particular, the system 1600 can include the broadcasters 1320, 1322, 1324, 1310, 1312 that can be in communication with the aggregation distribution gateway 1330. The aggregation distribution gateway 1330 can be in communication with the transport 160 which can be in communication with the CPE 110. The broadcaster 1320, 1322, 1324, 1310, 1312 and aggregation distribution gateway 1330 can communicate such information as compressed, encrypted multimedia content and advertising, aggregation control, and playback key control. The aggregation distribution gateway 1330 and the broadcast infrastructure 210 can communicate such information as transport control and aggregated compressed, encrypted multimedia content and advertising, along with aggregation control, and playback key control. The transport 160 can communicate such information as compressed, encrypted multimedia content and advertising, aggregation control, and playback control, to the CPE 110. The CPE 110 can communicate with the Internet such information as multimedia content, advertising, recommendation information, paid content, advertising removal key control, and billing information. In at least one embodiment, the video aggregator 1338 can use a statistical multiplexor to multiplex multimedia content from the content broadcasters 1320, 1322, 1324, and in at least one embodiment can further multiplex advertising with the multimedia content, and use the output of the statistical multiplexor as the aggregated and multiplexed multimedia content, and in at least one embodiment the advertising. In at least one embodiment, the video aggregator 1338 can use more than one statistical multiplexor to multiplex the subsets of the content broadcasters 1320, 1322, 1324 and use the output of the statistical multiplexor to aggregate the multiplexed multimedia content, and in at least one embodiment advertising, logically (as a single broadcast channel) or a separate broadcast channels that can, for example, utilize different frequency bands for transmission of the aggregated and multiplexed multimedia content, and in at least one embodiment the advertising. In at least one embodiment, the aggregator 1338 can multiplex the multimedia content such that the multiplexing can use independent frequency bands (for example, VHF-Lo and VHF-Hi) that can be shared for transmission of the multimedia content. The transmitted multimedia content data block associated with a specific multimedia content broadcaster 1320, 1322, 1324 can be sent in at least one frequency band and subsequently reconstructed at the CPE 110. This frequency band sharing can also be used for advertising broadcasters 1310, 1312 and other content source A 1620*a*. In at least one embodiment, the multiplexing can be done independently for each individual frequency band for the multimedia content broadcaster 1320, 1322, 1324, advertising broadcasters 1310, 1312 and other content source A 1620*a*. The individually multiplexed channels for each frequency band can then be aggregated for transmission to the CPE 110.

The system 1600 can add to the aggregated and multiplexed multimedia content delivery, that is can add the capability to deliver unavailable other content to the CPE 110. This hybrid delivery approach can combine a seamless combination of aggregated delivery, streaming, and/or Internet download delivery. The HVTBPI disclosed herein can seamlessly meld these delivery approaches, while minimizing Internet congestion due to video content consumption. This approach can provide the best features of each delivery mode. The unavailable other content, determined from the other content, from the other content source 1620*a*, can be delivered to the CPE 110 by the aggregated distribution gateway 1330 and broadcast infrastructure 210. The unavailable content, determined from the other content, from the other content source 1620*b*, can be delivered to the CPE 110 via the Internet (or any one-to-one delivery method). The system controller 126 can initiate the delivery of the unavailable other content from the other content source A 1620*a* and other content source B 1620*b* by at least one of the initiation of streaming and initiation of download and coordinate the record token operation discussed herein, by the CPE 110. The other content source A 1620*a* and B 1620*b* can be provided by a third party and/or contained within the aggregation distribution gateway 1330. The initiation of an action can include the set of commands and action responses to delivery unavailable other content to a particular CPE 110 for current viewing and/or to be placed in storage 616/624 for viewing at a time convenient to the subscriber 105. The other content sources A 1620*a* and/or B 1620*b* can have available different multimedia content and other content, such as software applications (e.g. software updates, etc.).

The multiplexed multimedia content can include at least one of broadcast linear multimedia content provided by content broadcaster 1320, 1322, and 1324, other content, and in at least one embodiment can further include advertising or itself be advertising. The multimedia content can include premium content (e.g. HBO), linear multimedia content not currently being delivered via OTA broadcast (e.g. TBS, AMC), streaming content, audio only content, virtual reality (VR) content, augmented reality (AR), podcasts, gaming, social media, integrated social media platform (including viewer comments and critiques of content and/or advertising), Internet webpages, and/or electronically delivered print content (e.g., newspaper), etc. The unavailable other content is other content and advertising that is not currently being delivered via the aggregation distribution gateway 1330 or is not currently located in storage 616/624 on a particular CPE 110. The other content source 1620*a* and 1620*b* can be the content provider 140, the advertisers 150, the distribution gateway 130, the streaming service, a video aggregator service, etc. In at least one embodiment, the other content source 1620*a* and 1620*b* can include content broadcasters 1320, 1322, and 1324 and advertising broadcasters 1310 and 1312. The determination of the other content to be delivered and the method of delivery to the CPE 110 is subsequently discussed. In at least one embodiment, the advertising delivered using the HVTBPI can be inserted into webpages, such as Internet delivered webpages. The HVTBPI can optimize the cost of multimedia content and advertising delivery by using the broadcast infrastructure 210 (nominally, one-to-many) instead of one-to-one delivery (e.g. Internet, etc.) as this can be more efficient and cost effective for the delivery of relatively more popular multimedia content and advertising. Intelligent aggregation, subsequently defined, can be used to determine the method of delivery of the multimedia content and advertising and can further reduce the required RF spectrum and/or bandwidth for delivery of multimedia content and advertising.

The system 1600 can use the video aggregator 1338 (that can include a statistical multiplexer), ADO, intelligent aggregation (subsequently defined), video compression, number of bits/symbols, error detection and correction (EDAC), data interleaving, frequency reuse (e.g., using directional receive antennas) disclosed herein, either individually or in combination, to further release RF spectrum and/or bandwidth for other applications. A preferred order of implementation of these techniques can include ADO, video compression, statistical multiplexer, EDAC, and modulation. Other embodiments can have a different order of implementation. In the reception side of the implementation, these techniques can be reversed. The RF spectrum and/or bandwidth savings using the above techniques can be used to either increase the amount of aggregated and multiplexed multimedia content delivered, use for other applications, or a combination of the two.

The control, status and data 1610 interface, logically connects the system controller 126 to the content broadcasters 1320, 1322, 1324, the advertising broadcasters 1310 and 1312, the other content source 1620*a* and 1620*b*, the broadcast infrastructure 210, and the CPE 110. The control, status, and data 1610 interface can be a completely separate interface, such as a Controller Area Network (CAN) bus, etc. or a protocol implemented within the Internet or other communications standard. The control, status, and data 1610 interface can be bi-directional, can be encrypted, and can be implemented on any physical interface (e.g. wired, wireless, optical, etc.). In at least one embodiment, the control, status, and data 1610 interface can be implemented using a VPN. The control, status, and data 1610 interface can also connect the system controller 126 to the system processor 128.

The aggregation distribution gateway 1330 can transmit a broadcast token that can include the decryption key, advertising insertion instructions, etc. to the CPE 110 to reassemble the linear TV content and advertising used in OTA TV broadcaster, cable (and satellite) linear TV content broadcasters. In at least one embodiment, the broadcast token can be stored on the CPE 110 (along with the multimedia content) to enable subsequent playback of the content as originally constituted with the inserted advertising. The system controller 126 can send a storage token, via the control, status and data 1610 interface, that includes the decryption key and a CPE 110 specific re-encryption key associated with all and/or a particular piece of multimedia content, the re-encryption key can be used to encrypt the multimedia content prior to storage on the CPE 110. The system controller 126 can send a playback token to the CPE 110, via the control, status and data 1610 interface, that includes the decryption key, advertising insertion instructions (that can allow a unique set, number, and order of advertisements per CPE 110) for all or a particular piece of content. In at least one embodiment, a playback token can be sent to the CPE 110 from the system controller 126, via the control, status and data 1610 interface, to display broadcast content with a reduced set of or no inserted advertising. The CPE 110 can also be configured to start the reduced set of or no advertising content delayed in time by the corresponding amount of advertising removed to provide a continuous content program. The broadcast, storage, record, and playback tokens can be stored encrypted on the CPE 110. In at least one embodiment, the storage token can be used to delete multimedia content and advertising in the CPE 110 storage. In at least one embodiment, any of the information in the broadcast, storage, record, and playback tokens can be delivered as a separate token, (e.g., the advertising insertion instructions can be a standalone token). Any subscriber 105 interaction with the aggregation distribution gateway 1330 can be delivered via a token. The individual encryption/decryption keys associated with the storage and broadcast tokens can be based on at least two or more keys (for example, CPE serial number, content ID, viewer/subscriber PIN, etc.). The encryption/decryption keys associated with the broadcast, storage, and playback tokens can change over time. The encryption/decryption keys associated with the broadcast, storage, record, and playback tokens can as a function of time.

The aggregation distribution gateway 1330 can receive advertising insertion instructions from a variety of sources (e.g., the content broadcaster, advertising broadcaster, the advertisers, etc.) and forward the advertising insertion instructions to the CPE 110, such as embedded in the broadcast or playback tokens. The advertising insertion instructions can be derived from an advertising insertion schedule provided by the content broadcaster, advertising broadcaster, the advertisers, etc. The advertising insertion instructions can be delivered at any time prior to viewing of the advertising with the CPE 110 of the subscriber 105. The aggregation distribution gateway 1330 can also generate the advertising insertion instructions on a per channel basis, as well as per subscriber 105 basis.

The delivery of the advertisements can be via 1) inserted in the aggregated and multiplexed multimedia content linear multimedia content channels, 2) a separate advertising only channel, 3) included with the aggregation distribution gateway 1330 low speed control channel, 4) the control, status, and data 1610 interface, and/or 5) delivered via the Internet (and/or other one-to-one communications link). Advertising delivery can be performed as required with advertisements nominally being repeatedly played from the internal storage 616 and/or the external storage 624 associated with the CPE 110. The CPE 110 can generate reassembled multimedia content based on the information included in the advertising insertion instructions. Regardless of the resolution/quality of the content channel, the CPE 110 can insert advertising at a same or different resolution/quality than the channel's content resolution/quality. In the event of a storage 616 and/or 624 failure associated with the CPE 110, the CPE 110 can insert recently received, non-targeted and/or limited targeted advertising into the reassembled video stream until the failure can be corrected.

The broadcast infrastructure 210 can have different operational modes dependent on a particular broadcast infrastructure 210 being used. For example, in the case of OTA broadcast there can be multiple aggregated broadcast antennas for a given area. For satellite delivery, multiple satellites can be used with a single aggregation distribution gateway 1330. For cellular delivery, multiple cellular providers can be serviced by a single aggregation distribution gateway 1330. For cable delivery, delivery can rely on an existing wiring infrastructure currently in place. The broadcast infrastructure 210 can operate cooperatively using OTA broadcast, satellite, cellular, cable and/or Internet infrastructures.

The receivers 614a and 614b of the CPE 110 can be multichannel and can demodulate received data. In at least one embodiment, the ethernet interface 604 and/or Wi-Fi/cellular interface 602 can operate as the receiver for the multimedia content received via the Internet in the CPE 110. The receivers 614a and 614b and the ethernet interface 604 and/or Wi-Fi/cellular interface 602 functioning as receivers, can operate independently with or without the other. In another embodiment, another advertisement(s) (different from the advertisement received via the broadcast described herein and/or unavailable on storage 616/624 associated with the CPE 110), can be delivered via at least one of the first receiver 614a and the second receiver 614b. In at least one embodiment, the ethernet interface 604 and/or Wi-Fi/cellular interface 602 can operate as the second receiver 614b (referred herein to as the Internet receiver) for the CPE 110.

The buffering and storage of the multimedia content and advertisements, as well as the overall operation of the CPE 110, is under control of the CPE 110 control & status module (CCSM) 612. The data bus 640 can be unencrypted, partially encrypted (for certain modules and/or functions), or entirely encrypted. The storage processing can be done by the CPE 110 for selected subscribers 105 or formulated recommended multimedia content from the received aggregated broadcasts, other content source A 1620a and/or other content source B 1620b. A video demultiplexer 1350 can demultiplex the demodulated content, the demodulated content being multimedia content and/or advertising content. Once a subscriber 105 selects a given channel for playback, the CCSM 612 can send content decryption keys received by the CCSM 612 to the encryptor, decryptor, & packetizer 610 for processing that particular channel when "tuned" to the particular channel either by selection of the subscriber 105 or a recording command. Multiple channels can be processed simultaneously. After decryption, video decompressor 1370 of the CPE 110 can decompress the multimedia content and provide such decompressed multimedia content to the assembly module 608. This same process can be implemented for advertisements. The assembly module 608 can use the advertising insertion instructions to insert the advertisements into the multimedia content to emulate linear standard television broadcasting that embeds the advertisements into the multimedia content. The assembly module 608 can use the advertising insertion instructions to insert the advertisements into the multimedia content to provide advertising that is tailored to the subscriber 105.

The system 1600 can release broadcast bandwidth and Radio Frequency (RF) spectrum associated with OTA broadcast, cable TV, cellular, and satellite TV for other applications by eliminating the repeated transmission of advertisements (referred to herein as ADO), in a broadcast channel. The ADO broadcast (large number of subscribers 105), via OTA broadcast, cable, fiber, cellular, satellite, etc. can be combined with other one-to-one (e.g., Internet) content delivery services (individual subscriber 105 selections) to provide other multimedia content to the subscriber 105. In accordance with one or more embodiments, the system 1600 can further combine ADO with the unavailable and/or available other multimedia content, such as at least one of streaming and advanced delivery of unavailable and/or available other multimedia content via the Internet and/or video aggregator 1338 to provide personalized content for the viewer/subscriber 105, referred to herein as HVTBPI. This unavailable other content can include other content, different from the currently broadcast aggregated and multiplexed multimedia content and advertisement within the reduced number of broadcast channels and which is unavailable to the customer premises equipment 110, such as being unavailable within the storage 616/624. In at least one embodiment, the personalized content can be provided for the viewer/subscriber 105 in a personalized channel.

In at least one embodiment, such unavailable other content can include any content that is delivered to the customer premises equipment 110 via at least one of the OTA broadcast, wired, satellite, wireless, cellular, and the Internet, such as over-the-top (OTT) streaming. In at least one embodiment, the unavailable other content can be streamed to the customer premises equipment 110. In at least one embodiment, the ADO, although a departure from traditional broadcast advertising, can provide the subscriber 105 with increased flexibility to reduce or remove entirely advertising from a displayed program. A nominal bandwidth of 42 MHZ (for example, the largest contiguous spectrum in the VHF OTA band) can provide 82K hours per month of HD content to the subscriber 105. In comparison, 43K hours per month of HD content can be delivered in the full 360 MHZ assigned to the OTA bandwidth. Other combinations of resolution and quality can be delivered within the 42 MHZ. In other embodiments, multiple frequency bands (e.g. VHF-Lo, VHF-Hi, etc. for OTA broadcast) and/or portions of frequency bands can be combined for use in the aggregation distribution gateway 1330. The use of broadcast for content delivery can be very efficient in a one-to-many scenario. The system 1600 can combine the broadcast content delivery with the unavailable other content, such as Internet streaming of content (one-to-one) to create a personalized channel for the subscriber 105 and can use a combination of both sources of such content. In accordance with the embodiments disclosed herein, this combination of aggregated and multiplexed multimedia, together with the unavailable other content in accordance with HVTBPI disclosed herein can provide for content, multimedia content and/or advertisement, that is otherwise not available to the CPE 110 with content that is delivered and/or stored with VTBPI. In at least one embodiment, the unavailable other content can be received by at least one customer premises equipment 110 from a plurality of customer premises equipment 110 via at least one of the Internet or other protocol, using a wireless, wired communications, optical, etc.

Bandwidth and/or RF spectrum can be reduced by eliminating repeated transmission of advertisements, referred to herein as ADO, in the broadcast channel for cable TV and Internet TV broadcast. For OTA broadcast, cellular, and satellite TV delivery of content the bandwidth reduction can be referred to as releasing Radio Frequency (RF) spectrum. Note, the released RF spectrum and bandwidth can be used for other applications. In at least one embodiment, the system 1600 can use directional receive antennas to communicate with one or a few broadcast antennas to improve the spectral frequency reuse. Using directional receive antennas can result in less RF spectrum required for a given amount of multimedia content transmitted and/or can result in more multimedia content transmitted and/or other applications delivered within the same RF spectrum. In addition, other applications can use this excess bandwidth to download other video content and/or data services to the subscriber 105. As an example, a software company can download their software patches in a bandwidth efficient manner to many computers simultaneously using this excess bandwidth.

The HVTBPI disclosed herein can include a combination of two or more transport providers 160 that complement each other. As an example, a combination transport system can include a combination of a broadcast, (OTA, satellite, cellular, wired, wireless, etc.) and Internet (cable, fiber, cellular provider, etc.) or multiple combinations of broadcast and Internet. With combination transport that includes a multicast capable transport system and a one-to-one transport system, using the subscriber 105 requested and/or recommended content for the subscriber 105 in conjunction with storing the multimedia content on the CPE 110, the total amount of data transferred to the plurality of CPEs 110 can be reduced (thereby reducing the bandwidth and/or RF spectrum requirements), and/or the peak data rate required on the Internet. For example, a particular movie (e.g., The Seven Samurai) can be subscriber 105 requested and/or recommended content for the subscriber 105, and targeted for a particular subscriber 105 or a group of subscribers 105 (e.g., based on demographics, geographical locations, etc.), which reduces the total amount of data transferred. In addition, the most efficient/cost effective transport can be selected by the system 1600 to communicate the particular movie to the subscriber(s) 105, referred to herein as intelligent aggregation. For example, if the number of subscribers 105 requests and/or recommendations for the particular content is sufficiently large (above a threshold), then the aggregation distribution gateway 1330 can use OTA broadcast as the selection for transport. Where the number of subscribers 105 requests and/or recommendations for the particular content is below a threshold, then the aggregation distribution gateway 1330 can use the Internet as the selection for transport. The use of a combination transport system with subscriber 105 requested and recommended content storage can become particularly valuable if Internet providers implement demand-based pricing for data. This combination transport of multimedia content and advertisements can also be valuable to the subscriber 105 when data caps are implemented by an ISP. The transport charges of multimedia content can also be paid for by a third party, such as a content provider 140, etc. In at least one embodiment, at least one of the multimedia content, the advertisement, and the unavailable other content can be at least one of subscriber 105 requested content and/or formulated recommended content for the subscriber 105. The system 1600 (e.g., the aggregation distribution gateway 1330) can then select the at least one of the formulated recommended content and/or advertising and the subscriber requested content and/or advertising, together with the multiplexed multimedia content and advertisement received over the reduced number of broadcast channels to select a best transport available to the aggregation distribution gateway 1330 to further reduce the required RF spectrum and/or bandwidth, such as for the other applications. Thus, the aggregation distribution gateway 1330 using intelligent aggregation can balance loads between the available transports for any of the embodiments disclosed, such as based on cost of transport, loading on transports, etc. Transport and delivery are used interchangeably throughout this document for electronic transport and delivery of electronic content.

The system processor 128 can perform intelligent aggregation to group the particular multimedia content and/or advertising for simultaneous delivery to a plurality of subscriber 105 CPEs 110. The intelligent aggregation can reduce at least one of the amount and repetition of multimedia content and/or advertisement delivered in a given period of time, therefore can release at least one of bandwidth and radio frequency spectrum. This particular multimedia content and/or advertising can include both subscriber 105 requested and formulated recommended content and/or advertising for the subscriber 105 and can be included with the recommendation of multimedia and advertising content and can be used in conjunction with the delivery lead-time and scheduled view-time disclosed herein. This use of the delivery lead-time and/or scheduled view-time can allow for greater transport efficiencies and correspondingly lower delivery prices. The system processor 128 can perform intelligent aggregation to balance use of whatever transports (e.g. delivery more popular multimedia content via the video aggregator 1338 and less popular multimedia content via the Internet) are available for delivery of the subscriber requested and formulated recommended content and can be included with the recommendation of multimedia content and/or advertising to meet the delivery lead-time and/or schedule view-time for the maximum number of subscribers 105. In the case of broadcast, including over-the-air, cable satellite, and/or Internet, this aggregation can include a general form of aggregation (e.g., the HVTBPI). The CPE 110 can be instructed to receive and store the subscriber 105 requested and/or formulated recommended multimedia content and/or advertising for current and/or subsequent viewing. The intelligent aggregation storage can also reduce the number times an individual piece of multimedia content is transported. The record token can also mark commercial breaks to allow the CPE 110 to store only the multimedia content without advertisements, thus conserving storage used by the CPE 110. Advertising can be directed to the subscriber 105 and associated with the CPE 110, the CPE 110 can receive instructions to index and store advertising delivered via broadcast delivery and/or one-to-one delivery.

Intelligent aggregation can establish different settable thresholds to select one or more transport providers to deliver multimedia content to one or more CPEs 110. Each threshold can initiate an action. For example, thresholds can select the most efficient delivery for content. These thresholds can be based on one or more of transport cost, number of viewers requesting said content, number of viewers for whom the content is recommended, the lead-time of transport provider, the scheduled view-time of the content, the time when the content is broadcast, etc. Intelligent aggregation can be used synergistically with the HVTBPI to further improve the released RF spectrum and/or the reduced number of bandwidth channels that can be used for other applications.

Advertising has and is expected to continue to be used as the primary mode to subsidize content consumption. However, the system 1600 can present the subscriber 105 with the option to reduce or eliminate advertising. In addition, advertising can be non-targeted, targeted, or viewer selected, as a subscriber 105 option. Targeted and/or subscriber 105 selected advertising can allow for an overall reduction in the amount of advertising presented to the subscriber 105. The inserted advertising can be controlled by a broadcast channel provider, such as via the broadcast infrastructure 210 provider or by the advertisers 150 that would pay the content broadcaster. In event of a failure of the storage (e.g., storage 616 and/or 624) associated with the CPE 110, the CPE 110 can insert current or recently transmitted advertising into a reconstructed video stream. In addition, the inserted advertising can be tailored to the viewer. The inserted advertising can use recommendation to select specific advertising, order, repetition rate, etc. to be presented to the subscriber 105.

The system 1600 can use the bandwidth reduction techniques disclosed herein to repurpose significant portions of the designated television spectrum for other uses across a region, nation (or combination of nations, (e.g. the European Union), while maintaining a same or increased video feed delivery or service options (e.g. 4K video, etc.). Since the spectrum is available nationally, this can simplify the radio design of equipment used for services using the repurposed released spectrum. In at least one embodiment, the released spectrum can be shared by one or both Long Term Evolution (LTE) and $5^{th}$ Generation New Radio (5G), or any cellular application.

The control, status and data 1610 interface can support at least one or more multimedia content, advertising, the unavailable other content, viewer requests, calendar display and interaction, recommendations to the viewer, use statistics, token, key management, status reporting, viewing parameters for AR, viewing perspective and viewer participation feedback, social media, and/or interaction for VR, etc. In another embodiment, the system controller 126 can electronically control the CPE 110 to unavailable other content to storage 616/624 via a record token. The information associated with the record token can include the source of the multimedia content and/or the advertisement, the display and/or release time of the multimedia content and/or the advertisement storage, encryption and/or decryption keys, advertising insertion instructions, etc.

In addition, the system 1600 can use multimedia content recommendation to reduce the requirements for RF spectrum, bandwidth, and/or total data rate to deliver video content by eliminating repeated transmission of video content for single and/or multiple subscribers 105 for the multiplexed multimedia content and/or other content source A/B 1620*a*, 1620*b* delivery. The unavailable other content described above can be communicated to the CPE 110 based on a formulated recommendation. This recommendation can include a recommendation of multimedia content and/or advertisement disclosed herein and can be formulated in accordance with recommendation formulation for health science recommendation disclosed in U.S. patent application Ser. No. 16/142,905 and/or cyber security recommendation disclosed in U.S. patent application Ser. No. 16/143,093, both of which are incorporated herein by reference, either or both of which can be modified by one skilled in the art to determine the recommendation of the multimedia content and/or advertisement, disclosed herein. In at least one embodiment, this content recommendation can be formulated in accordance with recommendation formulation disclosed in U.S. patent application Ser. No. 15/436,486 and/or U.S. Pat. No. 9,781,459, both of which are incorporated herein by reference. This application further incorporates by reference U.S. patent application Ser. No. 16/367,476 which discloses in at least one embodiment a CPE, such as CPE 110, that receives multimedia content, and in at least one embodiment advertising. In an example embodiment disclosed herein, reception of such multimedia content by the CPE 110, and in at least one embodiment advertising, can be received from such sources as the aggregation distribution gateway 1330, the Internet, and/or any other source of multimedia content, and in at least one embodiment advertising, disclosed herein.

In at least one embodiment, the recommendation can include a recommendation of multimedia content and/or advertisement disclosed herein and can be formulated in accordance with one or more of collaborative filtering, content-based filtering, combination recommender, demographic recommender, and knowledge-based recommender, neural network recommender, hybrid recommendation using any combination of these recommendation techniques, etc. The hybrid recommender can combine at least one or more of weighted, switched, mixed, feature combination, feature augmentation, cascade and meta-level, which can be selected and controlled by adjudication, such as the adjudication described in U.S. patent application Ser. No. 15/436,486 and/or U.S. Pat. No. 9,781,459. Note, the performance of recommendation systems can depend on the risk associated with the recommendation. Note, the recommendation system (including proprietary recommender systems) contained herein can be used to further reduce the RF spectrum/bandwidth required to deliver multimedia content by eliminating repeated transmission of multimedia content for single and/or multiple subscribers 105. The technique using recommendation for reducing the requirements for RF spectrum, bandwidth, and/or total data rate can be used with cell tower angular sector footprint, satellite footprint coverage and/or satellite spotbeam coverage, etc.

In at least one embodiment, the neural network recommendation can use weights, biases, and thresholds, which can be manually and/or automatically controlled. Various types of neural nodes (the individual operator within a neural network) can be used. These nodes can include perceptron and the sigmoid neurons, learning/training algorithms, e.g., stochastic gradient decent, recurrent neural networks, multi-layer feed forward network and the multi-layer feedback network, Radical Bias Functions (RBF), Recurrent Neural Networks (RNN), Hopfield Network, Boltzmann Machine, Self-organizing map, Learning vector quantization, Echo State Network (ESN), long short-tern memory network, Bidirectional RNN, Stochastic Neural Network, and many Modular Neural network which can include Committee of Machines, Associative Neural Network, etc.

Cost functions can be incorporated into the neural network recommendation and can be similar to the utility function associated with Bayesian decisions discussed herein. For example, the cost function, C, can be the quadratic cost function. This cost function can indicate how good the training is. The aim of training is to minimize the cost function C varying a set of weights and biases using gradient decent method. Other cost functions can include Cross-Entropy cost, aka, Bernoulli negative log-likelihood and Binary Cross-Entropy, Exponential cost, Hellinger distance, Kullback-Leibler divergence, and Itakura-Saito distance. The use of the cost minimization can measure the effectiveness of the neural network recommendation implementation.

As discussed above, the aggregator 1338 can multiplex multimedia content and an advertisement, such as that received from the aggregation distribution gateway 1330. The multiplexed multimedia and advertisement can be directed, such as from the aggregation distribution gateway 1330, to a plurality of customer premises equipment 110. The aggregator 1338 can further aggregate the multiplexed multimedia content and advertisement into a reduced number of broadcast channels. In at least one embodiment, the aggregated and multiplexed multimedia content and advertisement can eliminate continued repetition of the advertisement and/or multimedia content within the reduced number of broadcast channels. This aggregated and multiplexed multimedia content and advertisement can release at least one of bandwidth and radio frequency spectrum, not included in the reduced number of broadcast channels, for other applications.

The CPE 110 can receive other content and/or advertising, in addition to the content described herein as being broadcast to the CPE 110. This other content can be either formulated recommended content and/or subscriber requested content. In another embodiment, the other content and/or advertising can be requested by transport providers 160, advertisers 150, and/or content providers 140 in addition to the subscriber requested content. In at least one embodiment, the advertisement, from the multiplexed multimedia content and advertisement, can be a first advertisement and the multimedia content can be a first multimedia content. At least one of the multimedia content, the advertisement, and the unavailable other content can be formulated recommended content, the recommended content can be formulated in various ways. For example, the recommended content can be at least one of non-linear manifold formulated recommended content, collaborative filtering formulated recommended content, content-based filtered recommended content, demographic recommended content, knowledge-based recommended content, and combination recommended content including at least two of the non-linear manifold formulated recommended content, collaborative filtering formulated recommended content, content-based filtered recommended content, demographic recommended content, and knowledge-based recommended content. The use of recommendation can also be used to transfer formulated multimedia content and/or advertising via the multiplexed multimedia content, advertising and/or unavailable other content to the CPE storage 616/624.

The aggregation distribution gateway 1330 can control delivery of content. For example, the system controller 126, such as that of the aggregation distribution gateway 1330, can electronically control delivery of the aggregated and multiplexed multimedia content and advertisement to the plurality of customer premises equipment 110, such as via the reduced number of broadcast channels. In at least one embodiment, the system controller 126 can further receive a request for the unavailable other content.

The system processor 128 can further determine whether desirable multimedia content is currently unavailable on storage of the CPE 110, such as multimedia content that the subscriber 105 may want to watch. The system processor 128, such as that of the aggregation distribution gateway 1330, can determine whether the other content, the other content being at least one of not currently being broadcast via the aggregated and multiplexed multimedia content into a reduced number of broadcast channels and not stored by a particular CPE 110, is unavailable to determine the unavailable other content, such as unavailable within storage 616/624 associated with a particular customer premises equipment 110. The aggregation distribution gateway 1330 can search multimedia content that is currently being stored on the storage, such as the internal storage 616 and/or the external storage 624, and compare that stored multimedia content to multimedia content that the subscriber 105 may want to view. This comparison is the basis for the system processor 128 to determine that such stored multimedia content lacks multimedia content that the subscriber 105 may want to view. The system processor 128 can further formulate the request for the other content if the other content is unavailable. In at least one embodiment, the request for the unavailable other content can be automatically generated by the aggregation distribution gateway 1330 based on at least one of viewing history, a subscriber account profile, advertiser requests and parameters, and interactions of a subscriber 105 (including subscriber requested content and/or recommended content for the subscriber 105) with at least one of the plurality of customer premises equipment 110.

The system controller 126 and the system processor 128 can work together for delivery of content, such as the multimedia content, the advertisement, and the unavailable other content to the CPE 110. In at least one embodiment, the system controller 126, such as that of the aggregation distribution gateway 1330, can electronically deliver the aggregate and multiplexed multimedia content and advertisement to the plurality of customer premises equipment 110 within the reduced number of broadcast channels and receive a request for the unavailable other content. The system processor 128 can determine whether this other content, different from the aggregated and multiplexed multimedia content and advertisement within the reduced number of broadcast channels, is unavailable to the customer premises equipment 110, such as being unavailable within the storage 616/624. The system processor 128 can formulate the request for the unavailable other content if the other content is determined by the system processor 128 to be unavailable. In at least one embodiment, the system controller 126 can deliver and/or request to deliver this unavailable other content. In at least one embodiment, the system controller 126 and the system processor 128 can be implemented in a first apparatus (e.g., the aggregation distribution gateway 1330), and the system controller 126 can request to deliver and/or electronically control delivery of the unavailable other content from another component, a second apparatus such as a server of Netflix, Hulu, Spotify, Microsoft, etc. In at least one embodiment, the system controller 126 can control local delivery of the unavailable other content, that is from an apparatus that includes the system controller 126. The unavailable other content can be content that is at least one of not stored by at least one of the plurality of customer premises equipment 110 and not currently being broadcast (e.g., via the aggregated and multiplexed multimedia content and advertisement into a reduced number of broadcast channels) to a particular CPE 110 from the plurality of customer premises equipment 110. The not stored unavailable other content can be content that is at least one of broadcast to and not stored by at least one of the plurality of customer premises equipment 110 and content that is not downloaded to at least one of the plurality of customer premises equipment 110.

The aggregation distribution gateway 1330 can further provide an advertising insertion instruction to the CPE 110 instructing the CPE 110 where to insert the advertisement into the multimedia content. In at least one embodiment, the system controller 126, such as that of the aggregation distribution gateway 1330, can further deliver an advertisement insertion instruction to the plurality of customer premises equipment 110. This advertisement insertion instruction can instruct the plurality of customer premises equipment 110 where to insert the advertisement into the multimedia content. In at least one embodiment, the system controller 126 can receive the request for the unavailable other content from at least one of the plurality of customer premises equipment 110 and electronically control delivery of the unavailable other content to the at least one of the plurality of customer premises equipment 110. For example, in an embodiment in which the system controller 126 is implemented within at least one customer premises equipment 110, the system controller 126 can electronically request and control delivery of multimedia content from a streaming service, such as Netflix. In an example embodiment, the system controller 126 can communicate a record instruction to at least one customer premises equipment 110 to record, such as on storage 616/624, the unavailable other content and/or aggregated and multiplexed content for later consumption by the subscriber 105.

In at least one other embodiment, another component, such as a second apparatus (e.g., a server of Netflix, Hulu, Spotify, Microsoft, advertising, etc.) can receive the request for the unavailable other content from the aggregation distribution gateway 1300 and/or at least one of the plurality of customer premises equipment 110. In at least one embodiment, at least one of the multimedia content, the advertisement, and the unavailable other content is particular multimedia content. The system controller 126 can further control transmission, to the particular customer premise equipment 110 from the plurality of customer premises equipment 110, of decryption information and unique re-encryption information associated with the particular customer premises equipment 110 and particular multimedia content to allow the particular customer premises equipment 110 to decrypt and uniquely re-encrypt this particular multimedia content. In response to a subscriber 105 request to play the particular multimedia content, the system controller 126 can transmit a unique decryption key to this particular customer premise equipment 110 to allow the particular customer premises equipment 110 to decrypt the particular content using the at least one unique decryption key and present the particular multimedia content to the subscriber 105 via the local display 630.

The system processor 128 can further update a subscriber content price for particular multimedia content. For example, in an embodiment in which at least one of the unavailable other content, available other content, and the multimedia content is particular multimedia content, the system processor 128 can update a subscriber content price for the particular multimedia content based on at least one of selecting the particular multimedia content for viewing, selecting a time/date for viewing of the particular multimedia content, modifying at least one of a time/date the particular multimedia content is scheduled to be viewed, a scheduled lead-time of electronic delivery of the particular multimedia content, a maximum price for a billing period, an allowed amount of advertising to be inserted in the particular multimedia content, a multimedia content resolution, and targeted, non-targeted, and subscriber requested advertising types to be inserted into the particular multimedia content. Then, the system controller 126 can transmit to a particular CPE 110, the updated subscriber content price for the particular multimedia content based on such modification.

Figure 17:
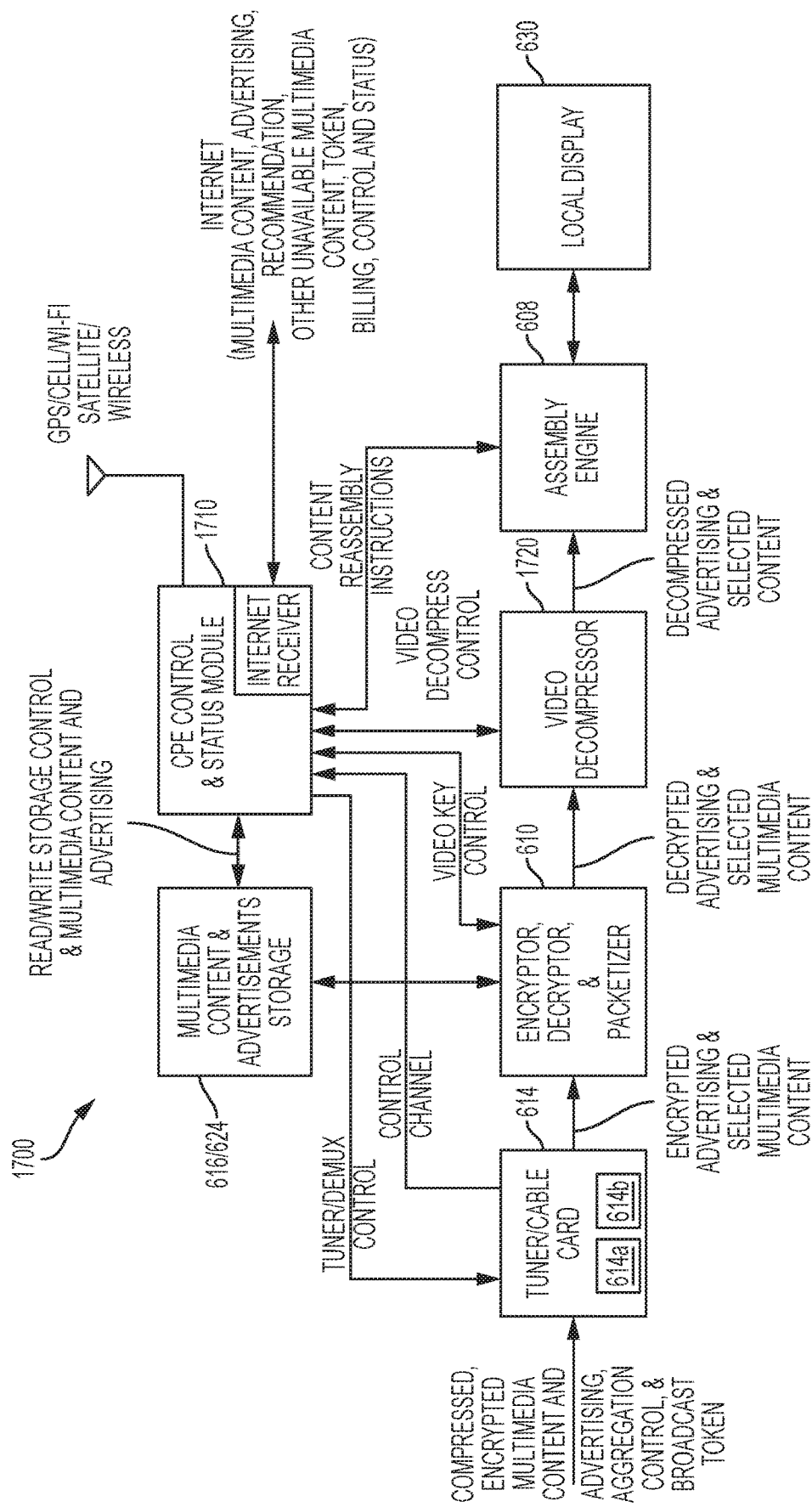
FIG. 17 illustrates another example CPE that can support HVTBPI, in accordance with one or more possible embodiments.

FIG. 17 illustrates another example CPE 1700, in accordance with one or more possible embodiments. The CPE 1700 can include any of the components illustrated in FIG. 6 and further include a CPE control and status module 1710 (which can include a GPS, cellular, and/or other wireless service receiver, transmitter, and/or transceiver interfaces) and a video decompressor 1720. The multimedia content and advertisements storage 616/624 can be in communication with both the CPE control and status module 1710 and the encryptor, decryptor, & packetizer 610. The CPE control and status module 1710 can be in communication with the receivers 614a and 614b, the encryptor, decryptor & packetizer 610, the video decompressor 1720, and the assembly module 608. The receivers 614a and 614b can be in communication with the encryptor, decryptor & packetizer 610, and the encryptor, decryptor & packetizer 610 can be in further communication with the video decompressor 1720. The video decompressor 1720 can be in further communication with the assembly module 608 which can be in communication with the local display 630. The CPE control and status module 1710 receive such information as global positioning system (GPS) information, cellular data and/or other wireless services. The video decompressor 1720 can decompress any content received by the CPE 1700 prior to viewing by the subscriber 105 on the local display 630.

The multimedia content and advertisements storage 616/624 can communicate such information as read/write storage control information, multimedia content, and advertisements, with the CPE control and status module 1710. The CPE control and status module 1710 can communicate such information as viewer/subscriber 105 video selections and the Internet content described herein, such as multimedia content, advertising, recommendations, paid multimedia content, advertising removal key control information, and billing information. The CPE control and status module 1710 can further communicate tuner/demux control information to the receivers 614a and 614b and the receivers 614a and 614b can communicate control channel information to the CPE control and status module 1710. The CPE control and status module 1710 can communicate video key control information with the encryptor, decryptor, & packetizer 610. The CPE control and status module 1710 can communicate video decompress control information with the video decompressor 1720 and content reassembly instructions with the assembly module 608.

The receivers 614a and 614b can receive compressed, encrypted multimedia content and advertising, aggregation control information, and playback control information. The receivers 614a and 614b can communicate encrypted advertising and subscriber 105 selected (or formulated recommendation) multimedia content to the encryptor, decryptor, & packetizer 610. The encryptor, decryptor, & packetizer 610 can communicate decrypted advertising and subscriber 105 selected (or formulated recommendation) multimedia content to the video decompressor 1720. The video decompressor 1720 can communicate decompressed advertising and subscriber 105 selected (or for recommendation) multimedia content to the assembly module 608, with the local display 630 being able to display assembled content communicated from the assembly module 608, that is displaying multimedia content with or without interspersed advertisements. The use of encryption for advertising can protect the advertising from being deleted, corrupted, bypassed, and/or other method that disables or diminishes the display of advertising on the CPE 110 to protect the advertising value for the advertisers 150 and content providers 140. In at least one embodiment, the advertisement can include (e.g., embedded therein) a decryption key for unencrypting the multimedia content and/or the available other content.

The system processor 128 (e.g., of an apparatus such as the aggregation distribution gateway 1330), through the system controller 126, can manage (e.g., optimize) the storage 616 and/or 624 of another apparatus, such as the CPE 1700, as a resource commodity that has a cost associated with it. The use of recommendation can be used to minimize the amount of storage 616, 624 required by the CPE 110/1700. The cost associated with the CPE storage 616 and/or 624 can include at least one of recommendation, intelligent aggregation, transport cost, marginal cost (e.g. increasing the local storage), lost opportunity cost (the cost of not having the multimedia content available and/or the advertisement on the CPE 110) by minimizing the Loss Function (or equivalently, maximizing a Reward Function) disclosed in U.S. patent application Ser. No. 16/143,093 incorporated herein, etc. In at least one embodiment, the recommendation threshold(s) disclosed herein can be reduced so that more the multimedia content, advertisements, and/or available other content can be stored by the CPE 110 when the amount of storage 616/624 is increased. The cost of the CPE storage 616 and/or 624 can be paid for by the subscriber/viewer 105, the content provider 140, transport provide 160, advertiser 150, and/or a combination of these. The system processor 128 can use intelligent deletion of multimedia content on the CPE storage 616 and/or 624 to make optimal use of available storage. In another embodiment, the system processor 128 can arbitrate these storage resources to assign these storage resources based on highest value to the subscriber 105, content provider 140, advertisers 150, transport providers 160, and/or a combination of these, and the system controller 126 can implemented such arbitration. Such arbitration can be performed for the multimedia content and/or the advertisement.

The system processor 128 can divide entities into two or more sub-entities. An entity can be divided into two or more sub-entities if the source information generating the feature vector for the entity is conflicting and/or sets the entity in a position that underlying information is negated or masked. At least one embodiment of this process can analyze the individual source term vectors, etc. for the entity and separate the entity into set of two or more sub-entities if the mean and/or variance (i.e., statistical moments) is above a sub-entity threshold. Throughout this application, the use of the term sub-entity can be substituted for entity with regards to functionality. The concept of a sub-entity can be used to partition and/or organize the CPE 110 storage 616 and/or 624. based on the composition of the subscriber 105, subscriber's household, content genre, etc. The use of sub-entities can be used to customize and/or tailor the amount of CPE 110 storage for required for and/or dedicated to each viewer, e.g., associated with a particular CPE 110 or under a subscription.

The system processor 128 such as that of the CPE 1700, through the system controller 126, can manage the storage 616 and/or 624 of the CPE 1700 as a resource commodity that has a cost associated with it. The cost associated with the CPE storage 616 and/or 624 can include marginal cost (e.g. increasing the local storage), lost opportunity cost (the cost of not having the multimedia content available on the CPE 110), etc. The cost of the CPE storage 616 and/or 624 can be paid for by the subscriber/viewer 105, the content provider 140, transport provide 160, advertiser 150, or a combination of these. The system processor 128 can use intelligent deletion of multimedia content on the CPE storage 616 and/or 624 to make optimal use of available storage.

The CPE 1700 can further support the HVTBPI disclosed herein. In addition to the functionality described above for the CPE 110, the first receiver 614a can receive multiplexed multimedia content and advertisement. The multiplexed multimedia content and advertisement can be received over a reduced number of broadcast channels to, as discussed above, release at least one of bandwidth and radio frequency spectrum, not included in the reduced number of broadcast channels, for other applications. In at least one embodiment, at least one of the first receiver 614a and the second receiver 614b can further receive an advertising insertion instruction an apparatus, such as the CPE 110, where to insert the advertisement into the multimedia content. The assembly module 608 can then insert the advertisement into at least one of the multimedia content and the available other content, based on the insertion instruction. In at least one embodiment, the reduced number of broadcast channels are broadcast over and the unavailable other content is received by the CPE 1700 via at least one of over-the-air broadcast, wired, wireless, optical, satellite, cellular, and the Internet.

In at least one embodiment, the first receiver 614a can further receive scheduled multimedia content received within the scheduled lead-time disclosed herein, the multiplexed multimedia content and advertisement can be received together with the scheduled multimedia content. The second receiver 614b can receive the unavailable other content. In at least one embodiment, the system controller 126 can further electronically control delivery of the unavailable other content to the CPE 1700. As discussed above, the unavailable other content can be other content that is different from the multiplexed multimedia content and advertisement and unavailable in storage 616/624 on the apparatus, such as the CPE 1700.

In at least one embodiment, the unavailable other content is content that is at least one of not stored by the CPE 1700 and not currently being broadcast to the CPE 1700. As discussed above, the video demultiplexor 1350 can demultiplex the received multiplexed multimedia content and advertisement from the reduced number of broadcast channels to produce a multimedia content and an advertisement. In at least one embodiment the video demultiplexer 1350 can store, within a storage device, such as at least one of the internal storage 616 and the external storage 624, the multimedia content, the advertisement, and the available other content disclosed herein. In accordance with at least one embodiment, at least one of the first receiver 614a and the second receiver 614b can further receive at least one of the multimedia content, the advertisement, and the unavailable other content, respectively, for at least one of storage within the storage device (e.g., at least one of the internal storage 616 and the external storage 624) for future display on the display device (e.g., the local display 630) and for output to the display device as being received by the first receiver 614a and the second receiver 614b, respectively. In accordance with at least one embodiment as discussed above, the first receiver 614a and the second receiver 614b can one of logical receivers within a single electronic receiver and different electronic receivers. Thus, the first receiver 614a and the second receiver 614b can receive the multimedia content, the advertisement, and the unavailable other content via one of a same transport and different transports, depending upon the configuration of the receivers 614, 614a, and 614b. In at least one embodiment, the first receiver 614a can further receive an advertisement insertion instruction instructing the apparatus, such as the CPE 1700, where to insert the advertisement into the multimedia content. In at least one embodiment, a subscriber content price for at least one of the unavailable other content, available other content, and the multimedia content can be based on a time/date the multimedia content is scheduled to be viewed with the CPE 1700, such as discussed herein. In at least one embodiment, the advertisement is scheduled for delivery to the CPE 1700 at least one of prior to presentation of the advertisement by the CPE 1700 and currently with a broadcast of the advertisement to the CPE 1700.

As broadcast multimedia content can be the primary source of multimedia content for the subscriber 105, the subscriber 105 may want to view other multimedia content that is unavailable via this primary broadcast source, referenced herein as unavailable other content. To assist the subscriber 105 with obtaining such unavailable other content that is unavailable via this primary broadcast source, in at least one embodiment, the system processor 128 of the CPE 1700 can determine the unavailable other content and formulate a request for the unavailable other content. At least similar to that as performed by the aggregation distribution gateway 1330, the system processor 128 of the CPE 1700 can search multimedia content that is currently being stored on the storage, such as the internal storage 616 and/or the external storage 624, and compare that stored multimedia content to multimedia content that the subscriber 105 may want to view. This comparison is the basis for the system processor 128 to determine that such stored multimedia content lacks multimedia content that the subscriber 105 may want to view. In response to such a determination, the system processor 128 can determine the unavailable other content and formulate a request for the unavailable other content. In at least one embodiment, the request is automatically generated, that is without subscriber 105 action, based on at least one of viewing history, a subscriber account profile, advertiser requests and parameters, and interactions of a subscriber with the apparatus.

To facilitate increased security for particular content, that is at least one of the multimedia content, the advertisement, and the available other content, the CPE 1700 can re-encrypt the particular content prior to storage. In at least one embodiment, at least one of the multimedia content, the advertisement, the unavailable other content, the available other content is particular content, at least one of the first receiver 614a and the second receiver 615b can further receive decryption information and unique re-encryption information associated with a particular CPE 1700 and the particular content, such as a particular movie. The particular CPE 1700 can further decrypt and uniquely re-encrypt, via the system processor 128, the particular content and, in response to a subscriber request to play the particular content. Then to decrypt the uniquely re-encrypted the particular content, the first receiver 614a can further receive at least one unique decryption key and the system processor 128 can further decrypt the particular content using the at least one unique decryption key and present the particular content to a subscriber, such as via the display, such as local display 630. In at least one embodiment, the first receiver 614a receives this at least one unique decryption key in response to the subscriber 105 requesting to play the particular content. In at least one embodiment, this request to play the particular content can be a request to play the content at a future time, such as the scheduled view time disclosed herein. In at least one embodiment, a single token can be used for all advertisements separate from one or more tokens used for the multimedia content, the unavailable other content, and/or available other content. In at least one embodiment, single decryption information and unique re-encryption information is received for all multimedia content and/or all advertising, respectively. In at least one embodiment, a single decryption information and unique re-encryption information is used for all content stored on the storage 616/624. In another at least one embodiment, unique decryption information and unique re-encryption information is used for each content, respectively, stored on the storage 616/624. The CPE 110 can be at least partially implemented with a carrier supplied customer premise equipment, a digital video recorder, a set top box, a video extender, a smart television, a personal computer, a tablet computer, a smart phone, with a software application ("app") implementation, and/or any other media device that can display the multimedia content, the advertisement, and the available other content, described herein.

Figure 18:
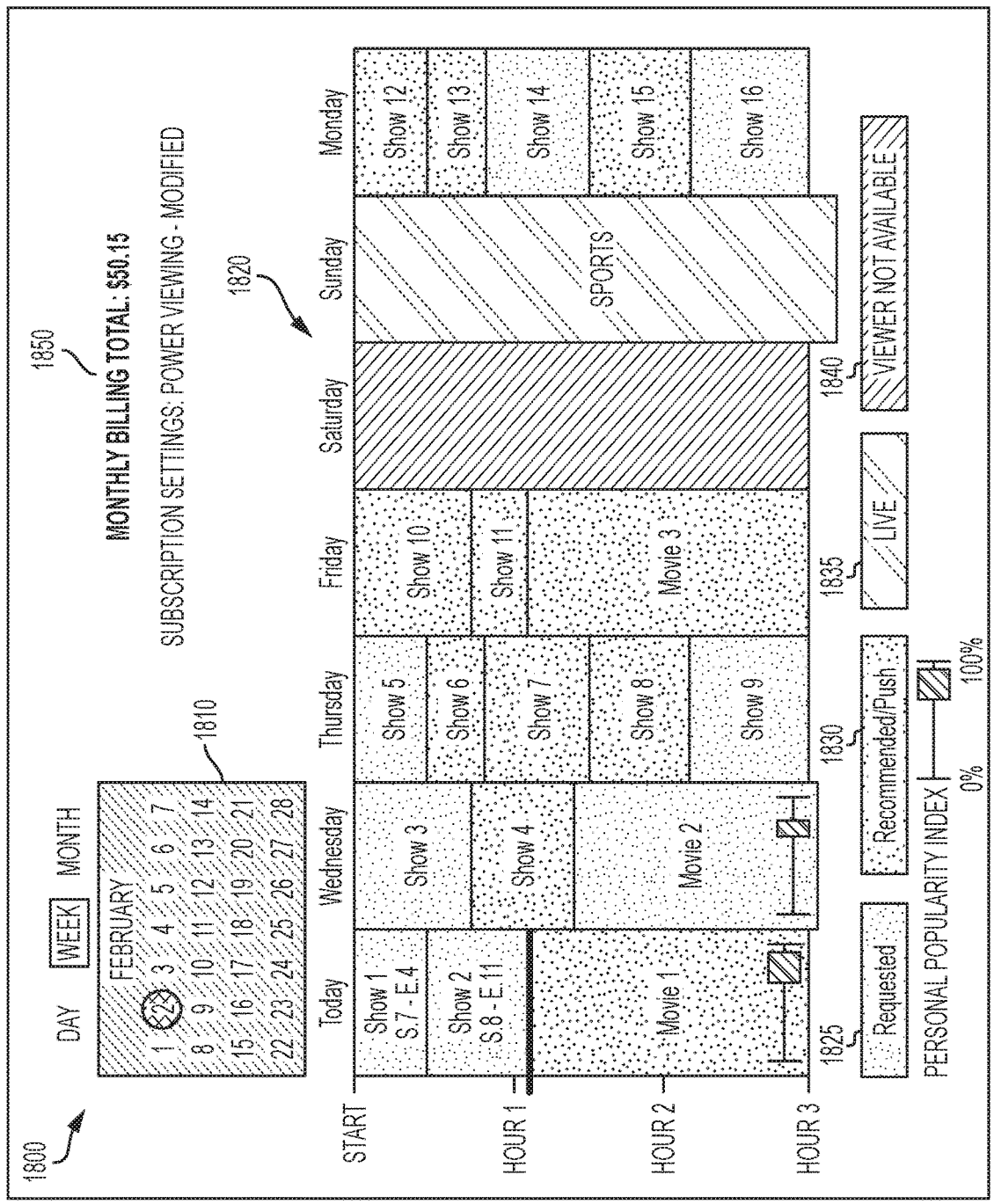
FIG. 18 illustrates an example graphic user interface (GUI) for scheduling HVTBPI content, in accordance with one or more possible embodiments.

FIG. 18 illustrates an example graphic user interface (GUI) for scheduling HVTBPI content, such as the scheduling interface 1800, in accordance with one or more possible embodiments. The example scheduling interface 1800 can include different types of modes for scheduling multimedia content for delivery to the customer premises equipment 110, such as two different types of modes comprised of a list of multimedia content interface (not shown) and a calendar interface 1820. The calendar interface 1820 can include a calendar 1810 that allows the subscriber 105 to select a particular date that the subscriber 105 wants to view a schedule for.

The calendar interface 1820 can include a calendar showing particular multimedia content available on various days and at various times. Multimedia content available at these various days and at these various times can be coded to allow the subscriber 110 to more easily identify and differentiate requested content 1825, recommended/push content 1830, live content 1835, and viewer not available 1840. Such coding can include use of different colors, hash marks and/or any other type of designation that allows the subscriber 105 to identify and differentiate such different types of multimedia content.

The subscriber 105 can manually move and/or change programming content on the list of multimedia content interface and the calendar interface 1820. Such a move and/or change can result in changes to the multimedia content list, viewing schedule, price, monthly billing total, etc., accordingly. The subscriber 105 can make modifications to list of multimedia content interface and the calendar interface 1820 as a basis for determining how such changes will modify their monthly billing total 1850 and allow the subscriber 105 to determine whether monthly budgetary targets are being met. The display of this information can be presented to the subscriber 105 in multiple, selected formats (e.g., a rank ordered list, and/or calendar format such as daily, weekly, biweekly, monthly, custom, etc.). Note, viewer, customer, and subscriber can be used interchangeably herein. In at least one embodiment, the viewer/customer/subscriber pays for at least some delivered multimedia content and/or available other content, while receiving other content for free. In other embodiments, the viewer/customer/subscriber pays for all delivered multimedia content including the available other content. Yet in other embodiments, the viewer/customer/subscriber receives all the delivered multimedia content including the available other content for free, without charge. In at least one embodiment, a subscriber content price for at least one of the unavailable other content, available other content, and the multimedia content is based on a time/date the multimedia content is scheduled to be viewed with the particular customer premise equipment 110 from at least one of a plurality of customer premises equipment 110.

The list of multimedia content interface can include a list of multimedia content. The list of multimedia content can include shows, movies, and any other programming that the subscriber 105 may desire to view. The list of multimedia content can be filtered based on any number of criteria, for example, multimedia content that is requested, multimedia content that is recommended, live content, multimedia content available for streaming, multimedia content that is scheduled for delivery to the customer premises equipment 110 and requested by the subscriber 105, and multimedia content that is scheduled for delivery to the customer premises equipment 110 and recommended for the subscriber 105. The list of multimedia content can be ordered based on popularity, alphabetically, in accordance with subscriber 105 defined preferences, and any other order that assist the subscriber 110 in scheduling multimedia content. The list of multimedia content interface can include a combination of requested content 1825, recommended/push content 1830, live content 1835, and viewer not available multimedia content 1840. Note, the subscriber 105 can also interact with an integrated social media platform (not shown) to comment on and/or critique content and advertising. The integrated social media platform can produce higher subscriber 105 engagement and satisfaction. This integrated social media platform can use the control, status and data 1610 interface.

Figure 19:
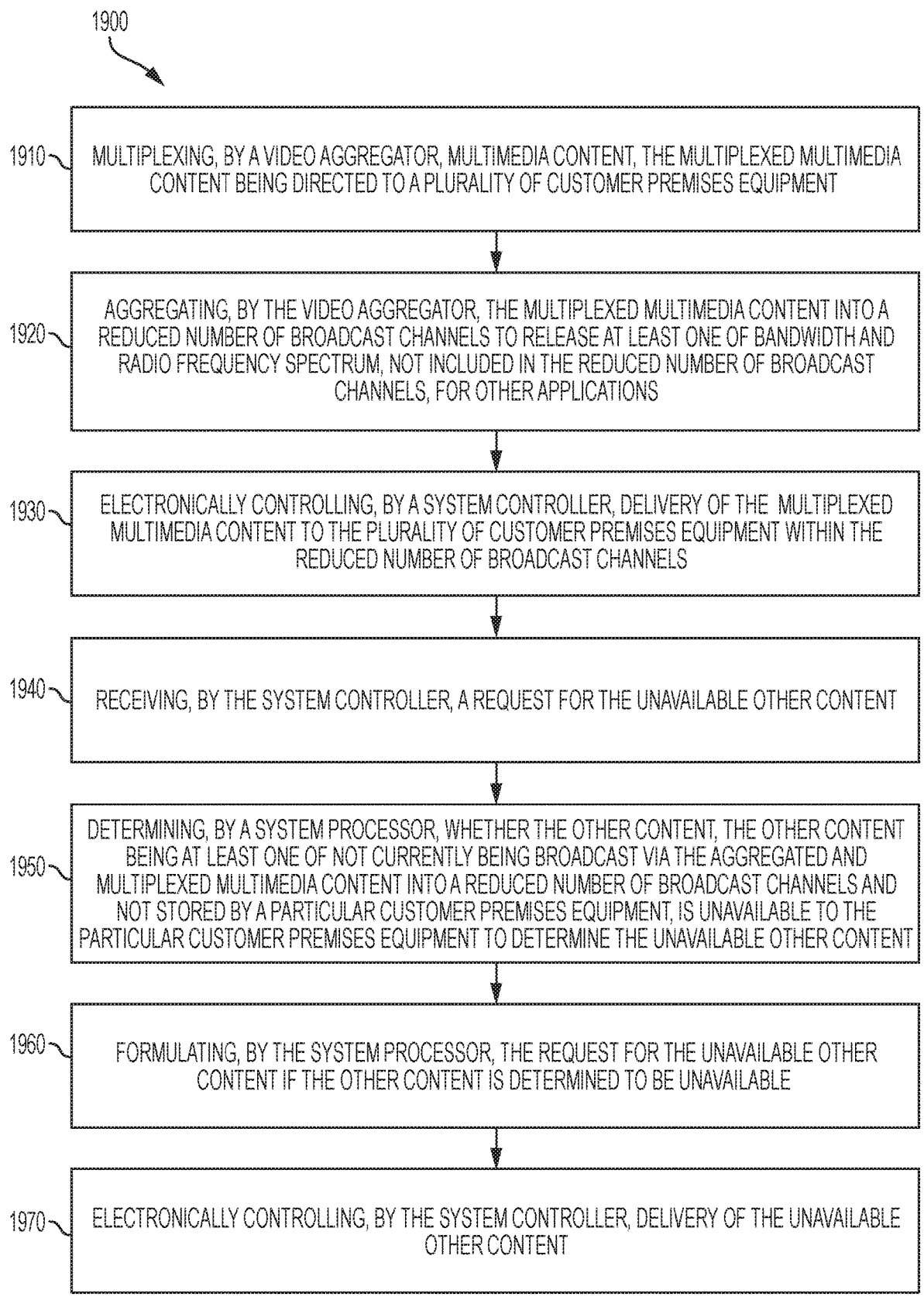
FIG. 19 illustrates a flowchart of an example HVTBPI electronic delivery method of multimedia content and unavailable other content, in accordance with one or more possible embodiments.

FIG. 19 illustrates a flowchart of an example HVTBPI electronic delivery method 1900 of multimedia content, and the unavailable other content, in accordance with one or more possible embodiments. The method 1900 is not limited to the example blocks shown and can include any of the processes performed by the multimedia delivery system 100. In at least one embodiment, the method 1900 can be at least partially implementing the method with at least one of a local computing, mobile computing, distributed computing, and cloud-based computing.

The method 1900 can begin with block 1910. The method 1900 can begin by multiplexing the multimedia content, the multiplexed multimedia content being directed to a plurality of customer premises equipment 110. For example, the video aggregator 1338 can multiplex the multimedia content. Block 1910 can proceed to block 1920.

At block 1920, the method 1900 can aggregate the multiplexed multimedia content into a reduced number of broadcast channels. For example, the video aggregator 1338 can aggregate the multiplexed multimedia content into a reduced number of broadcast channels to release at least one of bandwidth and radio frequency spectrum, not included in the reduced number of broadcast channels, for other applications. Block 1920 can proceed to block 1930.

At block 1930, the method 1900 can electronically control delivery of the multiplexed multimedia content. The system controller 126 can electronically control delivery of the aggregated and multiplexed multimedia content to the plurality of customer premises equipment 110 via the reduced number of broadcast channels. Block 1930 can proceed to block 1940.

At block 1940, the method 1900 can receive a request for the unavailable other content. Block 1940 can be performed by the system controller 126. Block 1940 can proceed to block 1950.

At block 1950, the method 1900 can determine whether the other content is unavailable. The system processor 128 can determine whether the other content, different from the multiplexed multimedia content within the reduced number of broadcast channels, is unavailable to a particular customer premises equipment 110 to determine the unavailable other content. In at least one embodiment, the other content is at least one of not currently being broadcast via the aggregated and multiplexed multimedia content into a reduced number of broadcast channels and not stored by a particular CPE 110. In at least one embodiment, the unavailable other content is unavailable within storage 616/624 associated with the particular CPE 110. Block 1950 can proceed to block 1960.

At block 1960, the method 1900 can formulate the request for the unavailable other content. The system processor 128 can formulate this request for the unavailable other content if the other content is unavailable.

At block 1970, the method 1900 can electronically control delivery of the unavailable other content. For example, the system processor 128 can electronically control delivery of the unavailable other content.

In at least one embodiment, the aggregated and multiplexed multimedia content can include an advertisement, and the unavailable other content is both different from the aggregated and multiplexed multimedia content and advertisement and currently not stored by the CPE 110. In this embodiment, the method 1900 can further comprise multiplexing, by the video aggregator 1338, multimedia content and the advertisement, the multimedia and the advertisement being directed to a plurality of CPE 110, and aggregate the multiplexed multimedia content and the advertisement into a reduced number of broadcast channels to release at least one of bandwidth and radio frequency spectrum, not included in the reduced number of broadcast channels, for other applications. Further in this embodiment, the method 1900 can further comprise electronically controlling, by the system controller 126, delivery of the aggregated and multiplexed multimedia content and the advertisement to the plurality of CPE 110 within the reduced number of broadcast channels. Further in this embodiment, the method 1900 can further comprise determining, by the system processor 128, whether the other content, different from the aggregated and multiplexed multimedia content and the advertisement within the reduced number of broadcast channels, is unavailable to a particular CPE 110 to determine that the other content is the unavailable other content.

Figure 20:
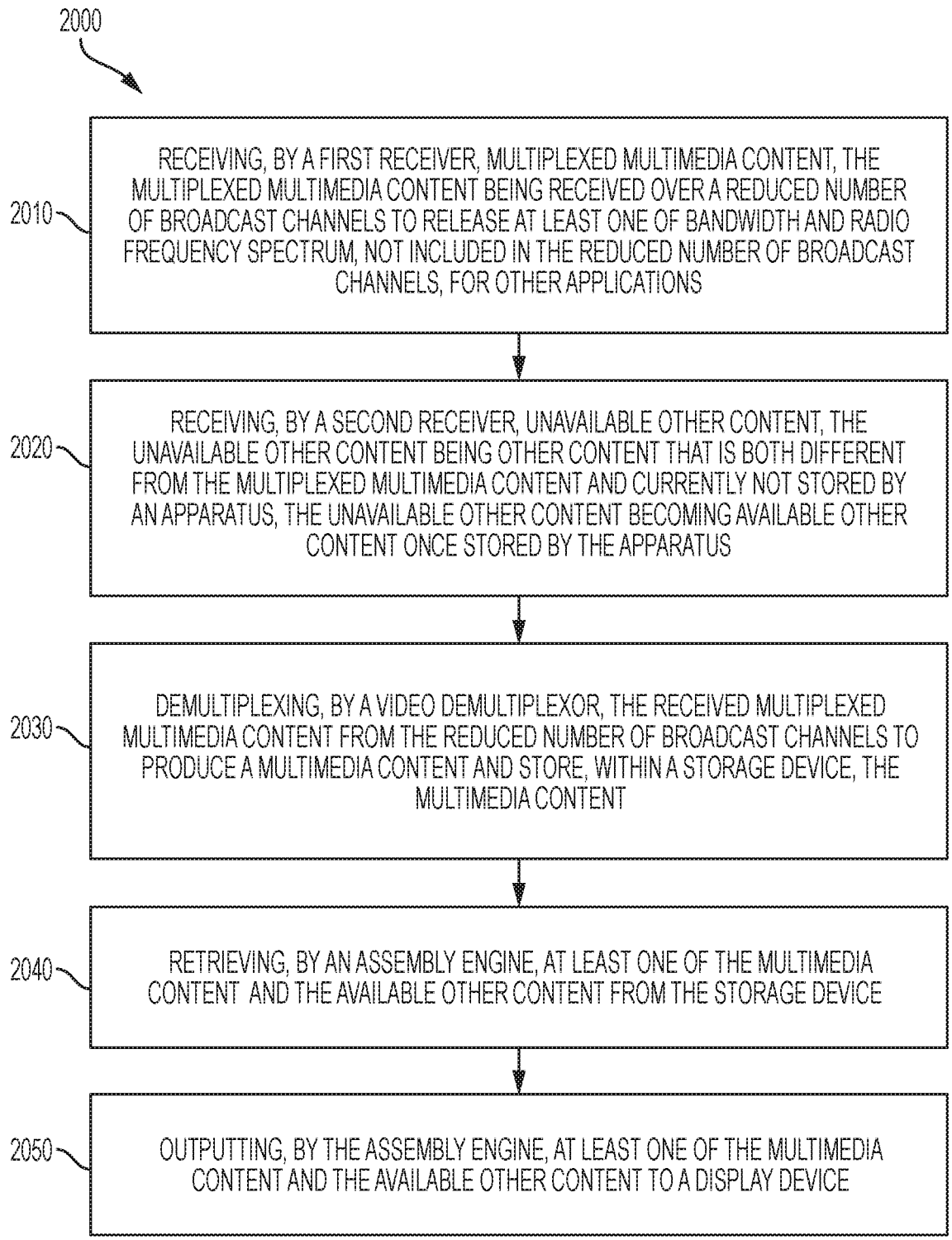
FIG. 20 illustrates a flowchart of an example HVTBPI electronic reception method of multimedia content and unavailable other content, in accordance with one or more possible embodiments.

FIG. 20 illustrates a flowchart of an example HVTBPI electronic reception method 2000 of multimedia content and the unavailable other content, in accordance with one or more possible embodiments. The method 2000 is not limited to the example blocks shown and can include any of the processes performed by the multimedia delivery system 100. In at least one embodiment, the method 2000 can be at least partially implementing the method with at least one of a local computing, mobile computing, distributed computing, and cloud-based computing.

The method 2000 can begin with block 2010. The method 2000 can begin by receiving, by a first receiver such as the first receiver 614a, multiplexed multimedia content, the multiplexed multimedia content being received over a reduced number of broadcast channels to release at least one of bandwidth and radio frequency spectrum, not included in the reduced number of broadcast channels, for other applications. Block 2010 can proceed to block 2020.

At block 2020, the method 2000 can receive, by a second receiver such as the second receiver 614b, unavailable other content, the unavailable other content being other content that is both different from the multiplexed multimedia content and currently not stored by the apparatus, the unavailable other content becoming available other content once stored by the apparatus, such as the CPE 110. Block 2020 can proceed to block 2030.

At block 2030, the method 2000 can demultiplex, by a video demultiplexor such as the video demultiplexor 1350, the received multiplexed multimedia content from the reduced number of broadcast channels to produce a multimedia content and store, within a storage device such as at least one of the internal storage 616 and the external storage 624, the multimedia content. In at least one embodiment, the demultiplexing can be performed by the video demultiplexor 1350. Block 2030 can proceed to block 2040.

At block 2040, the method 2000 can retrieve, by an assembly engine such as the assembly module 608, at least one of the multimedia content and the available other content from the storage device, such as at least one of the internal storage 616 and the external storage 624. Block 2040 can proceed to block 2050. At block 2050, the method 2000 can output, by the assembly engine such as the assembly module 608, at least one of the multimedia content and the available other content to a display device, such as the local display 630.

In at least one embodiment, the multiplexed multimedia content received by the first receiver 614a can further include the advertisement, and the unavailable other content is both different from the multiplexed multimedia content and advertisement and currently not stored by the CPE 110. In this embodiment, the method 2000 can further comprise demultiplexing, by the video demultiplexor 1350, the received multimedia content and advertisement from the reduced number of broadcast channels to produce a multimedia content and an advertisement and store, within the storage device, the multimedia content and the advertisement. Further in this embodiment, the method 2000 can further comprise retrieving, by assembly engine 608, at least one of the multimedia content, the advertisement, and the available other content from the storage device and output at least one of the multimedia content, the advertisement, and the available other content to a display device.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. The methods 1900 and 2000 can further include any of the processes described above in FIGS. 1-18.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

The invention claimed is:

1. An apparatus, comprising:
a video aggregator to multiplex multimedia content, the multiplexed multimedia content being directed to a plurality of customer premises equipment, and aggregate the multiplexed multimedia content into a reduced number of broadcast channels to release at least one of bandwidth and radio frequency spectrum, not included in the reduced number of broadcast channels, for other applications;
a system controller to electronically control delivery of the aggregated and multiplexed multimedia content to the plurality of customer premises equipment within the reduced number of broadcast channels, receive a request for unavailable other content, and electronically control delivery of the unavailable other content; and
a system processor to determine whether other content is unavailable, the other content being determined to be not currently being broadcast via the aggregated and multiplexed multimedia content into a reduced number of broadcast channels and determined to be not stored by a particular customer premises equipment, to the particular customer premises equipment to determine the unavailable other content, and formulate the request for the unavailable other content if the other content is determined to be unavailable.

2. The apparatus according to claim 1, wherein the aggregated and multiplexed multimedia content further includes an advertisement;
the video aggregator further multiplexes the multimedia content and the advertisement, the multiplexed multimedia content and the advertisement being directed to the plurality of customer premises equipment, and aggregates the multiplexed multimedia content and the advertisement into a reduced number of broadcast channels to release at least one of bandwidth and radio frequency spectrum, not included in the reduced number of broadcast channels, for other applications;
the system controller further electronically controls delivery of the aggregated and multiplexed multimedia content and the advertisement to the plurality of customer premises equipment within the reduced number of broadcast channels; and
the system processor further determines whether the other content, the other content being at least one of not currently being broadcast via the aggregated and multiplexed multimedia content and advertisement into a reduced number of broadcast channels and not stored by the particular customer premises equipment, is unavailable to the particular customer premises equipment to determine the unavailable other content, and formulate the request for the unavailable other content if the other content is determined to be unavailable.

3. The apparatus according to claim 2, wherein the video aggregator further eliminates repetition of at least one of the advertisement within the reduced number of broadcast channels and repetition of the multimedia content within the reduced number of broadcast channels.

4. The apparatus according to claim 2, wherein the system controller further delivers an advertisement insertion instruction to at least one of the plurality of customer premises equipment instructing the at least one of plurality of customer premises equipment where to insert the advertisement into the multimedia content.

5. The apparatus according to claim 2, wherein the advertisement is a first advertisement and the multimedia content is a first multimedia content, at least one of the unavailable other content and the multimedia content is at least one of formulated recommended content and subscriber requested content, the at least one of formulated recommended content and subscriber requested content being at least one of a second multimedia content and a second advertisement.

6. The apparatus according to claim 5, wherein the recommended content is formulated by at least one of non-linear manifold, collaborative filtering, content-based filtering, demographic recommendation, knowledge-based recommendation, and neural network recommendation.

7. The apparatus according to claim 2, wherein the advertisement is scheduled for delivery to the plurality of customer premises equipment at least one of prior to presentation of the advertisement by at least one of the plurality of customer premises equipment and currently with a broadcast of the advertisement to at least one of the plurality of customer premises equipment.

8. The apparatus according to claim 2, wherein at least one of the multimedia content, the advertisement, and the unavailable other content is at least one of recommended content for the subscriber and subscriber requested content and wherein the apparatus selects at least one of the recommended content and the subscriber requested content together with at least one of the multiplexed multimedia content and advertisement being received over the reduced number of broadcast channels and the unavailable other content, to select a best transport available to the apparatus.

9. The apparatus according to claim 2, wherein at least one of the multimedia content, the advertisement, and the unavailable other content is particular multimedia content, the system controller further transmits, to a particular customer premise equipment from the plurality of customer premises equipment, decryption information and unique re-encryption information associated with the particular customer premises equipment and particular multimedia content to allow the particular customer premises equipment to decrypt and uniquely re-encrypt the particular multimedia content and, in response to a subscriber request to play the particular multimedia content, transmits a unique decryption key to the particular customer premise equipment to allow the particular customer premises equipment to decrypt and present the particular multimedia content to the subscriber.

10. The apparatus according to claim 2, wherein the system processor further optimizes at least one of use of and amount of storage available to another apparatus for at least one of the multimedia content, the advertisement, the available other content, and the other applications, based on at least one of recommendation, intelligent aggregation, marginal cost of storage on the another apparatus, transport cost, multimedia lost opportunity cost, and advertising lost opportunity cost.

11. The apparatus according to claim 1, wherein the reduced number of broadcast channels are broadcast over and the unavailable other content is received by at least one of the plurality of customer premises equipment via at least one of over-the-air, wired, wireless, optical, satellite, cellular, and the Internet.

12. The apparatus according to claim 1, wherein the storage includes at least one of internal storage and external storage that is coupled to at least one of the plurality of customer premises equipment.

13. The apparatus according to claim 1, wherein the system controller further receives the request for the unavailable other content from at least one of the plurality of customer premises equipment and electronically controls delivery of the unavailable other content to the at least one of the plurality of customer premises equipment.

14. The apparatus according to claim 1, wherein the request is automatically generated based on at least one of viewing history, a subscriber account profile, advertiser requests and parameters, and interactions of a subscriber with at least one of the plurality of customer premises equipment.

15. The apparatus according to claim 1, wherein the apparatus is a first apparatus and the system controller electronically controls delivery of the unavailable other content from at least one of the first apparatus and a second apparatus.

16. The apparatus according to claim 1, wherein:
the video aggregator further multiplexes broadcast multimedia content together with scheduled multimedia content to be delivered within a scheduled lead-time; and
the system controller further delivers the multiplexed broadcast multimedia content together with the scheduled multimedia content delivered within the scheduled lead-time.

17. The apparatus according to claim 1, wherein a subscriber content price for at least one of the unavailable other content and the multimedia content is based on a time/date the multimedia content is scheduled to be viewed with the particular customer premise equipment from the plurality of customer premises equipment.

18. The apparatus according to claim 1, wherein at least one of the unavailable other content and the multimedia content is particular multimedia content:
the system processor further to update a subscriber content price for the particular multimedia content based on at least one of selecting the particular multimedia content for viewing, selecting a time/date for viewing of the particular multimedia content, modifying at least one of a time/date the particular multimedia content is scheduled to be viewed, a scheduled lead-time of electronic delivery of the particular multimedia content, a maximum price for a billing period, an allowed amount of advertising to be inserted in the particular multimedia content, a multimedia content resolution, and targeted, non-targeted, and subscriber requested advertising types to be inserted into the particular multimedia content; and
the system controller further to transmit, to the particular customer premise equipment from the plurality of customer premises equipment, the updated subscriber content price for the particular multimedia content based on the modification.

19. The apparatus according to claim 1, wherein the apparatus is at least partially implemented with at least one of a local computing, mobile computing, distributed computing, and cloud-based computing.

20. A method, comprising:
multiplexing, by a video aggregator, multimedia content, the multiplexed multimedia content being directed to a plurality of customer premises equipment;
aggregating, by the video aggregator, the multiplexed multimedia content into a reduced number of broadcast channels to release at least one of bandwidth and radio frequency spectrum, not included in the reduced number of broadcast channels, for other applications;
electronically controlling, by a system controller, delivery of the aggregated and multiplexed multimedia content to the plurality of customer premises equipment within the reduced number of broadcast channels;
receiving, by the system controller, a request for unavailable other content;
determining, by a system processor, whether other content is unavailable, the other content being determined to be not currently being broadcast via the aggregated and multiplexed multimedia content into a reduced number of broadcast channels and determined to be not stored by a particular customer premises equipment, to the particular customer premises equipment to determine the unavailable other content;
formulating, by the system processor, the request for the unavailable other content if the other content is determined to be unavailable; and
electronically controlling, by the system controller, delivery of the unavailable other content.

21. The method according to claim 20, wherein the aggregated and multiplexed multimedia content further includes an advertisement, the method further comprising:
multiplexing, by the video aggregator, multimedia content and the advertisement, the multiplexed multimedia and the advertisement being directed to the plurality of customer premises equipment;
aggregating, by the video aggregator, the multiplexed multimedia content and the advertisement into a reduced number of broadcast channels to release at least one of bandwidth and radio frequency spectrum, not included in the reduced number of broadcast channels, for other applications;
electronically controlling, by the system controller, delivery of the aggregated and multiplexed multimedia content and the advertisement to the plurality of customer premises equipment within the reduced number of broadcast channels;
determining, by the system processor, whether the other content, the other content being at least one of not currently being broadcast via the aggregated and multiplexed multimedia content and advertisement into a reduced number of broadcast channels and not stored by the particular customer premises equipment, is unavailable to the particular customer premises equipment to determine the unavailable other content; and formulating, by the system processor, the request for the unavailable other content if the other content is determined to be unavailable.

22. The method according to claim 21, wherein the video aggregator further eliminates repetition of at least one of the advertisement within the reduced number of broadcast channels and repetition of the multimedia content within the reduced number of broadcast channels.

23. The method according to claim 21, further comprising electronically delivering, by the system controller, an advertisement insertion instruction to at least one of the plurality of customer premises equipment instructing the at least one of plurality of customer premises equipment where to insert the advertisement into the multimedia content.

24. The method according to claim 21, wherein the advertisement is a first advertisement and the multimedia content is a first multimedia content, at least one of the unavailable other content and the multimedia content is at least one of formulated recommended content and subscriber requested content, the at least one of formulated recommended content and subscriber requested content being at least one of a second multimedia content and a second advertisement.

25. The method according to claim 24, wherein the recommended content is formulated by at least one of a non-linear manifold, collaborative filtering, content-based filtering, demographic recommendation, knowledge-based recommendation, and neural network recommendation.

26. The method according to claim 21, further comprising scheduling the advertisement for delivery to the plurality of customer premises equipment at least one of prior to presentation of the advertisement by at least one of the plurality of customer premises equipment and currently with a broadcast of the advertisement to at least one of the plurality of customer premises equipment.

27. The method according to claim 21, wherein at least one of the multimedia content, the advertisement, and the unavailable other content is at least one of recommended content for a subscriber and subscriber requested content, the method further comprising selecting at least one of the recommended content and the subscriber requested content together with the multiplexed multimedia content and advertisement being received over the reduced number of broadcast channels and the unavailable other content, to select a best transport available to an apparatus.

28. The method according to claim 21, wherein at least one of the multimedia content, the advertisement, and the unavailable other content is particular multimedia content, the method further comprising:

transmitting, by the system controller, the particular multimedia content to the particular customer premise equipment from the plurality of customer premises equipment, decryption information and unique re-encryption information associated with the particular customer premises equipment and particular multimedia content to allow the particular customer premises equipment to decrypt and uniquely re-encrypt the particular multimedia content; and in response to a subscriber request to play the particular multimedia content, transmitting a unique decryption key to the particular customer premise equipment to allow the particular customer premises equipment to decrypt and present the particular multimedia content to the subscriber.

29. The method according to claim 21, further comprising optimizing, by the system processor, at least one of use of and amount of storage available to another apparatus for at least one of the multimedia content, the advertisement, the available other content, and the other applications, based on at least one of recommendation, intelligent aggregation, marginal cost of storage on the another apparatus, transport cost, multimedia lost opportunity cost, and advertising lost opportunity cost.

30. The method according to claim 20, wherein the reduced number of broadcast channels are broadcast over and the unavailable other content is received by at least one of the plurality of customer premises equipment via at least one of over-the-air, wired, wireless, optical, satellite, cellular, and the Internet.

31. The method according to claim 20, wherein the storage includes at least one of internal storage and external storage that is coupled to at least one of the plurality of customer premises equipment.

32. The method according to claim 20, further comprising:

receiving, by the system controller, the request for the unavailable other content from at least one of the plurality of customer premises equipment; and electronically controlling, by the system controller, delivery of the unavailable other content to the at least one of the plurality of customer premises equipment.

33. The method according to claim 20, further comprising automatically generating the request based on at least one of viewing history, a subscriber account profile, advertiser requests and parameters, and interactions of a subscriber with at least one of the plurality of customer premises equipment.

34. The method according to claim 20, wherein method is implemented by a first apparatus, the method further comprising electronically controlling delivery of the unavailable other content from at least one of the first apparatus and a second apparatus.

35. The method according to claim 20, further comprising:

multiplexing, by the video aggregator, broadcast multimedia content together with scheduled multimedia content to be delivered within a scheduled lead-time; and delivering, by the system controller, the multiplexed broadcast multimedia content together with the scheduled multimedia content delivered within the scheduled lead-time.

36. The method according to claim 20, wherein a subscriber content price at least one of the unavailable other content and the multimedia content is based on a time/date the multimedia content is scheduled to be viewed with the particular customer premise equipment from the plurality of customer premises equipment.

37. The method according to claim 20, wherein at least one of the unavailable other content and the multimedia content is particular multimedia content, the method further comprising:

updating, by the system processor, a subscriber content price for the particular multimedia content based on at least one of selecting the particular multimedia content for viewing, selecting a time/date for viewing of the particular multimedia content, modifying at least one of a time/date the particular multimedia content is scheduled to be viewed, a scheduled lead-time of electronic delivery of the particular multimedia content, a maximum price for a billing period, an allowed amount of advertising to be inserted in the particular multimedia content, a multimedia content resolution, and targeted, non-targeted, and subscriber requested advertising types to be inserted into the particular multimedia content; and transmitting, by the system controller, to the particular customer premise equipment from the plurality of customer premises equipment, the updated subscriber content price for the particular multimedia content based on the modification.

38. The method according to claim 20, further comprising at least partially implementing the method with at least one of a local computing, mobile computing, distributed computing, and cloud-based computing.

* * * * *